United States Patent
Iribe et al.

(10) Patent No.: US 7,366,587 B2
(45) Date of Patent: *Apr. 29, 2008

(54) LEGGED MOBILE ROBOT

(75) Inventors: Masatsugu Iribe, Tokyo (JP); Jinichi Yamaguchi, 5-14-38, Tamadaira, Hino-shi, Tokyo (JP)

(73) Assignees: Sony Corporation, Tokyo (JP); Jinichi Yamaguchi, Tokyo (JP)

( * ) Notice: Subject to any disclaimer, the term of this patent is extended or adjusted under 35 U.S.C. 154(b) by 808 days.

This patent is subject to a terminal disclaimer.

(21) Appl. No.: 10/726,597

(22) Filed: Dec. 4, 2003

(65) Prior Publication Data

US 2004/0172165 A1  Sep. 2, 2004

(30) Foreign Application Priority Data

| Dec. 5, 2002 | (JP) | ............................ P2002-354260 |
| Dec. 5, 2002 | (JP) | ............................ P2002-354262 |
| Dec. 5, 2002 | (JP) | ............................ P2002-354263 |
| Nov. 28, 2003 | (JP) | ............................ P2003-398452 |

(51) Int. Cl.
G06F 19/00 (2006.01)

(52) U.S. Cl. ................... 700/245; 700/247; 700/249; 700/250; 700/252; 700/253; 700/258; 700/260; 700/264; 318/568.1; 318/568.11; 318/568.12; 318/568.16; 318/568.17; 318/568.22; 318/568.25; 901/1; 901/2; 901/9; 901/46; 180/8.1; 180/8.6

(58) Field of Classification Search ................ 700/245, 700/247, 249, 250, 252, 253, 258, 260, 264; 901/1, 2, 9, 46; 180/8.1, 8.6; 318/568.1, 318/568.11, 568.12, 568.16, 568.17, 568.22, 318/568.25

See application file for complete search history.

(56) References Cited

U.S. PATENT DOCUMENTS 7,072,740 B2 * 7/2006 Iribe et al. ................. 700/245

FOREIGN PATENT DOCUMENTS

| JP | 5-245780 | 9/1993 |
| JP | 05-245780 | 9/1993 |
| JP | 05-337849 | 12/1993 |
| JP | 5-337849 | 12/1993 |
| JP | 10-309684 | 11/1998 |

(Continued)

OTHER PUBLICATIONS

Naoki Kondo, et al., "Control of Direct Drive Manipulator using Ultrasonic Motor", Bulletin of Aichi Institute of Technology, vol. 31, Part B, Mar. 1996, (With English Abstract) pp. 29-34 and 2 cover pages.

*Primary Examiner*—Khoi H. Tran
*Assistant Examiner*—McDieunel Marc
(74) *Attorney, Agent, or Firm*—Oblon, Spivak, McClelland, Maier & Neustadt, P.C.

(57) ABSTRACT

The characteristics of actuators themselves and the characteristics of controllers for the actuators are dynamically or statically controlled to achieve stable and highly efficient movements. In a stage in which a leg in the flight state is uplifted such that the reactive force from the floor received by the foot sole of the leg is zero, the characteristics of the respective actuators for the knee joint pitch axis and the ankle pitch and roll axes of the leg in the flight state are set for decreasing the low range gain, increasing the quantity of phase lead and for decreasing the viscous resistance of the actuators, in order to impart mechanical passiveness and fast response characteristics. The followup control for the high frequency range may be achieved as the force of impact at the instant of touchdown is buffered.

28 Claims, 51 Drawing Sheets

FOREIGN PATENT DOCUMENTS

| | | |
|---|---|---|
| JP | 11-300661 | 11/1999 |
| JP | 2001-198870 | 7/2001 |
| JP | 2002-283276 | 10/2002 |
| JP | 2004-174652 | 6/2004 |
| JP | 2004-174653 | 6/2004 |
| JP | 2004-181599 | 7/2004 |
| JP | 2004-181600 | 7/2004 |
| JP | 2004-181601 | 7/2004 |

* cited by examiner

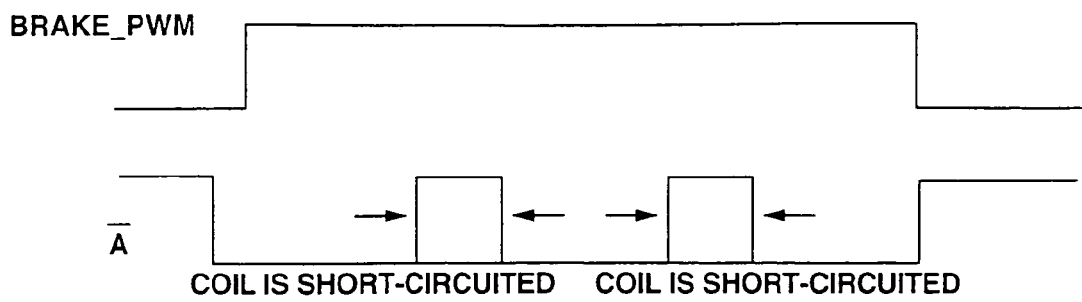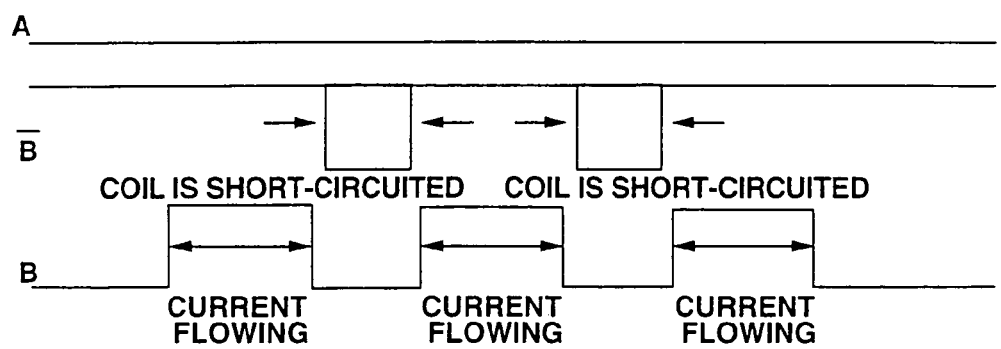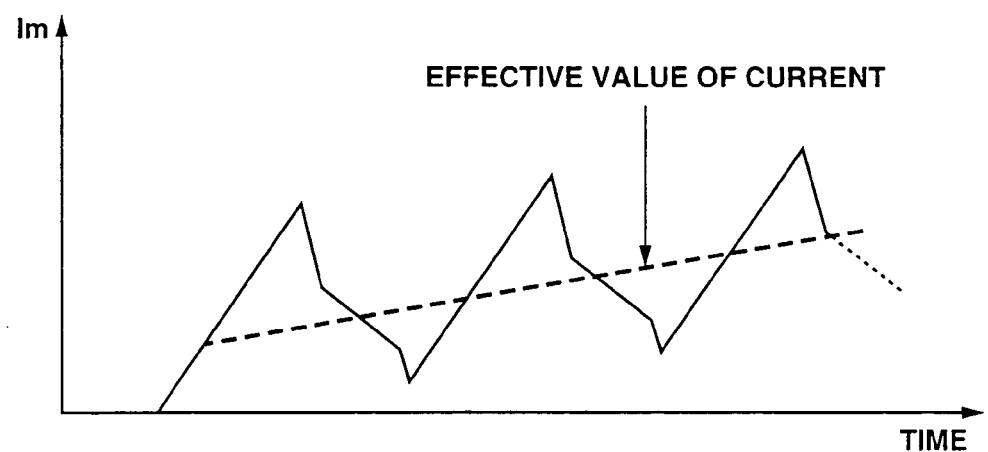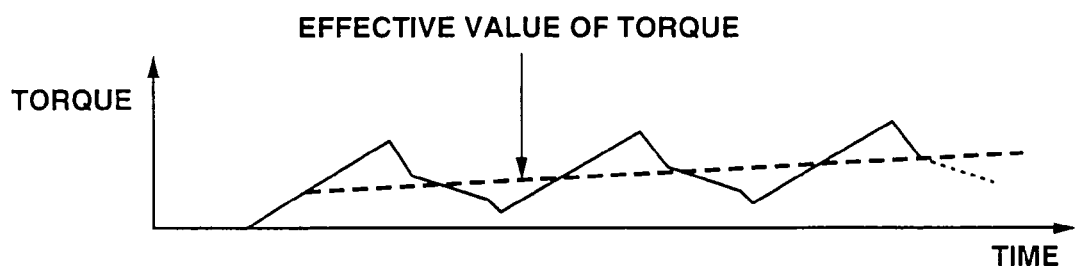
FIG.16

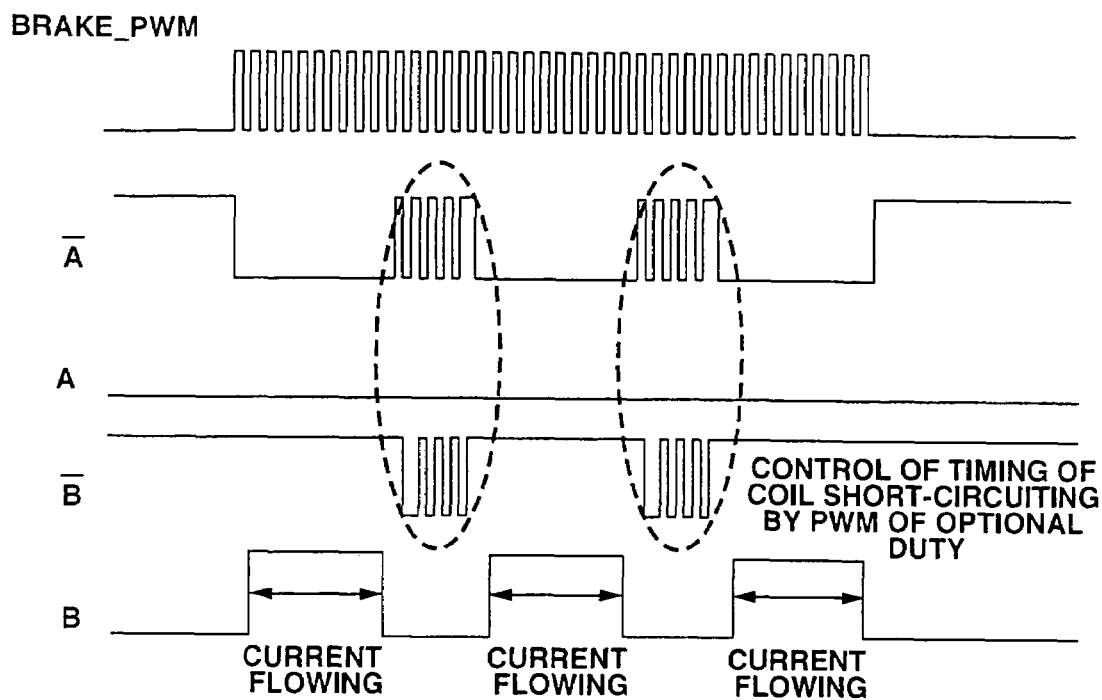
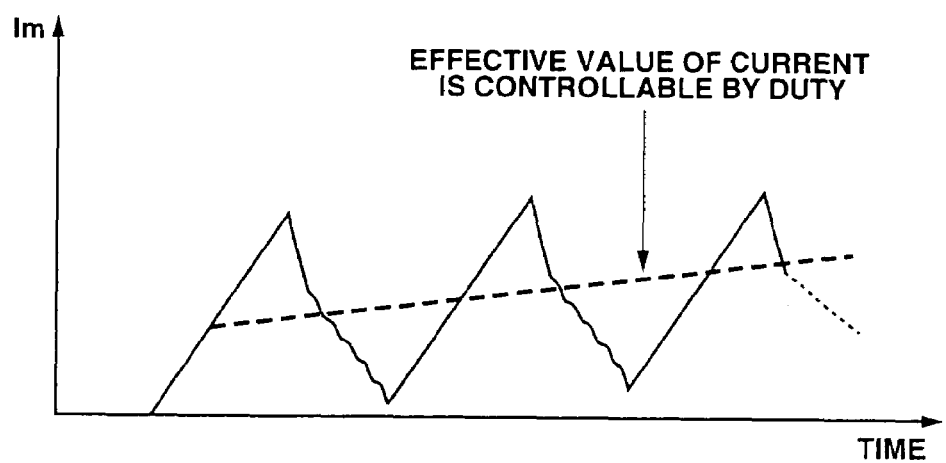
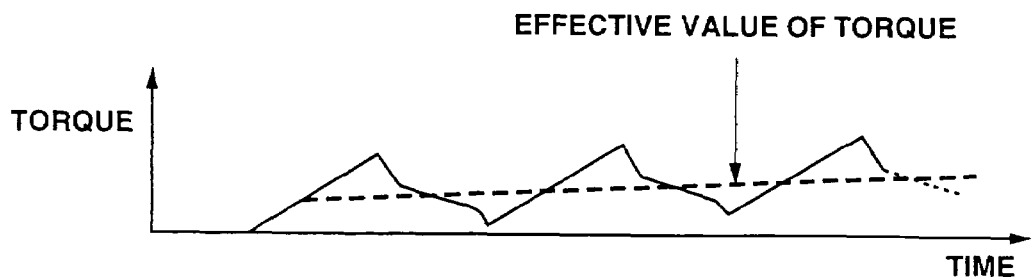
FIG.17

STIFF JOINT
CHARACTERISTICS
  SERVO CHARACTERISTICS
  (FIG.12)
  JOINT VISCOSITY
  (FIG.18A)

INTERMEDIATE JOINT
CHARACTERISTICS
  SERVO CHARACTERISTICS
  (FIG.13)
  JOINT VISCOSITY
  (FIG.18A)

SOFT JOINT
CHARACTERISTICS
  SERVO CHARACTERISTICS
  (FIG.13)
  JOINT VISCOSITY
  (FIG.18B)

| TIME PERIOD WHEN BOTH LEGS ARE IN STANCE |
| --- |
| LOWER LIMBS FORM A CLOSED LINK SYSTEM WITH FLOOR SURFACE |
| 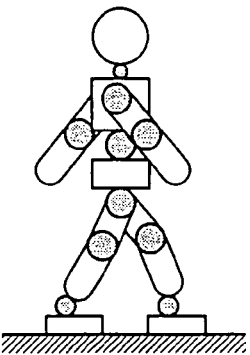 |

| | | | |
| --- | --- | --- | --- |
| RIGHT | SHOULDER PITCH | STIFF JOINT CHARACTERISTICS | |
| | ELBOW PITCH | STIFF JOINT CHARACTERISTICS | |
| | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | INTERMEDIATE JOINT CHARACTERISTICS |
| | ANKLE PITCH | LEG IN STANCE | INTERMEDIATE JOINT CHARACTERISTICS |
| LEFT | SHOULDER PITCH | STIFF JOINT CHARACTERISTICS | |
| | ELBOW PITCH | STIFF JOINT CHARACTERISTICS | |
| | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | INTERMEDIATE JOINT CHARACTERISTICS |
| | ANKLE PITCH | LEG IN STANCE | INTERMEDIATE JOINT CHARACTERISTICS |
| OTHER JOINT SITES | | STIFF JOINT CHARACTERISTICS | |

FIG.23

STIFF JOINT
CHARACTERISTICS
  SERVO CHARACTERISTICS
  (FIG.12)
  JOINT VISCOSITY
  (FIG.18A)

INTERMEDIATE JOINT
CHARACTERISTICS
  SERVO CHARACTERISTICS
  (FIG.13)
  JOINT VISCOSITY
  (FIG.18A)

SOFT JOINT
CHARACTERISTICS
  SERVO CHARACTERISTICS
  (FIG.13)
  JOINT VISCOSITY
  (FIG.18B)

| | | INSTANT OF CLEARING THE FLOOR | |
|---|---|---|---|
| | | ROBOT BODY (LEGS, BODY TRUNK AND ARMS) FORMS A CLOSED LINK SYSTEM WITH FLOOR SURFACE | |
| | | 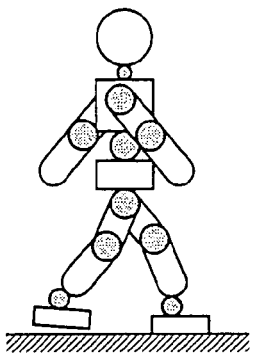 | |
| RIGHT | SHOULDER PITCH | STIFF JOINT CHARACTERISTICS | |
| | ELBOW PITCH | STIFF JOINT CHARACTERISTICS | |
| | THIGH ROLL | LEG IN FLIGHT | INTERMEDIATE JOINT CHARACTERISTICS |
| | THIGH PITCH | LEG IN FLIGHT | INTERMEDIATE JOINT CHARACTERISTICS |
| | KNEE PITCH | LEG IN FLIGHT | INTERMEDIATE JOINT CHARACTERISTICS |
| | ANKLE ROLL | LEG IN FLIGHT | INTERMEDIATE JOINT CHARACTERISTICS |
| | ANKLE PITCH | LEG IN FLIGHT | INTERMEDIATE JOINT CHARACTERISTICS |
| LEFT | SHOULDER PITCH | STIFF JOINT CHARACTERISTICS | |
| | ELBOW PITCH | STIFF JOINT CHARACTERISTICS | |
| | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | INTERMEDIATE JOINT CHARACTERISTICS |
| | ANKLE PITCH | LEG IN STANCE | INTERMEDIATE JOINT CHARACTERISTICS |
| OTHER JOINT SITES | | STIFF JOINT CHARACTERISTICS | |

FIG.24

STIFF JOINT
CHARACTERISTICS
   SERVO CHARACTERISTICS
   (FIG.12)
   JOINT VISCOSITY
   (FIG.18A)

INTERMEDIATE JOINT
CHARACTERISTICS
   SERVO CHARACTERISTICS
   (FIG.13)
   JOINT VISCOSITY
   (FIG.18A)

SOFT JOINT
CHARACTERISTICS
   SERVO CHARACTERISTICS
   (FIG.13)
   JOINT VISCOSITY
   (FIG.18B)

TIME PERIOD WHEN A SOLE LEG IS IN STANCE (ANOTHER LEG BEING LIFTED)

ROBOT BODY (LEGS, BODY TRUNK AND ARMS) FORMS A CLOSED LINK SYSTEM WITH FLOOR SURFACE

| | | | |
|---|---|---|---|
| RIGHT | SHOULDER PITCH | | SOFT JOINT CHARACTERISTICS |
| | ELBOW PITCH | | SOFT JOINT CHARACTERISTICS |
| | THIGH ROLL | LEG IN FLIGHT | STIFF JOINT CHARACTERISTICS |
| | THIGH PITCH | LEG IN FLIGHT | STIFF JOINT CHARACTERISTICS |
| | KNEE PITCH | LEG IN FLIGHT | INTERMEDIATE JOINT CHARACTERISTICS |
| | ANKLE ROLL | LEG IN FLIGHT | SOFT JOINT CHARACTERISTICS |
| | ANKLE PITCH | LEG IN FLIGHT | SOFT JOINT CHARACTERISTICS |
| LEFT | SHOULDER PITCH | | STIFF JOINT CHARACTERISTICS |
| | ELBOW PITCH | | STIFF JOINT CHARACTERISTICS |
| | THIGH ROLL | LEG IN STANCE | STIFF JOINT CHARACTERISTICS |
| | THIGH PITCH | LEG IN STANCE | STIFF JOINT CHARACTERISTICS |
| | KNEE PITCH | LEG IN STANCE | STIFF JOINT CHARACTERISTICS |
| | ANKLE ROLL | LEG IN STANCE | STIFF JOINT CHARACTERISTICS |
| | ANKLE PITCH | LEG IN STANCE | STIFF JOINT CHARACTERISTICS |
| OTHER JOINT SITES | | | STIFF JOINT CHARACTERISTICS |

FIG.25

STIFF JOINT
CHARACTERISTICS
  SERVO CHARACTERISTICS
  (FIG.12)
  JOINT VISCOSITY
  (FIG.18A)

INTERMEDIATE JOINT
CHARACTERISTICS
  SERVO CHARACTERISTICS
  (FIG.13)
  JOINT VISCOSITY
  (FIG.18A)

SOFT JOINT
CHARACTERISTICS
  SERVO CHARACTERISTICS
  (FIG.13)
  JOINT VISCOSITY
  (FIG.18B)

TIME PERIOD WHEN A SOLE LEG IS IN STANCE (ANOTHER LEG BEING SWUNG DOWN)

ROBOT BODY (LEGS, BODY TRUNK AND ARMS) FORMS A CLOSED LINK SYSTEM WITH FLOOR SURFACE

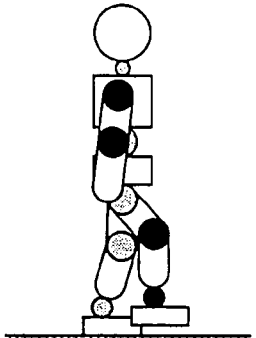

| | | | |
|---|---|---|---|
| RIGHT | SHOULDER PITCH | | SOFT JOINT CHARACTERISTICS |
| | ELBOW PITCH | | SOFT JOINT CHARACTERISTICS |
| | THIGH ROLL | LEG IN FLIGHT | STIFF JOINT CHARACTERISTICS |
| | THIGH PITCH | LEG IN FLIGHT | STIFF JOINT CHARACTERISTICS |
| | KNEE PITCH | LEG IN FLIGHT | SOFT JOINT CHARACTERISTICS |
| | ANKLE ROLL | LEG IN FLIGHT | SOFT JOINT CHARACTERISTICS |
| | ANKLE PITCH | LEG IN FLIGHT | SOFT JOINT CHARACTERISTICS |
| LEFT | SHOULDER PITCH | | STIFF JOINT CHARACTERISTICS |
| | ELBOW PITCH | | STIFF JOINT CHARACTERISTICS |
| | THIGH ROLL | LEG IN STANCE | STIFF JOINT CHARACTERISTICS |
| | THIGH PITCH | LEG IN STANCE | STIFF JOINT CHARACTERISTICS |
| | KNEE PITCH | LEG IN STANCE | STIFF JOINT CHARACTERISTICS |
| | ANKLE ROLL | LEG IN STANCE | STIFF JOINT CHARACTERISTICS |
| | ANKLE PITCH | LEG IN STANCE | STIFF JOINT CHARACTERISTICS |
| OTHER JOINT SITES | | | STIFF JOINT CHARACTERISTICS |

FIG.26

STIFF JOINT
CHARACTERISTICS
  SERVO CHARACTERISTICS
  (FIG.12)
  JOINT VISCOSITY
  (FIG.18A)

INTERMEDIATE JOINT
CHARACTERISTICS
  SERVO CHARACTERISTICS
  (FIG.13)
  JOINT VISCOSITY
  (FIG.18A)

SOFT JOINT
CHARACTERISTICS
  SERVO CHARACTERISTICS
  (FIG.13)
  JOINT VISCOSITY
  (FIG.18B)

| | | INSTANT OF TOUCHDOWN | |
|---|---|---|---|
| | | LOWER LIMBS FORM A CLOSED LINK SYSTEM WITH FLOOR SURFACE | |
| | SHOULDER PITCH | SOFT JOINT CHARACTERISTICS | |
| | ELBOW PITCH | SOFT JOINT CHARACTERISTICS | |
| RIGHT | THIGH ROLL | LEG IN FLIGHT | STIFF JOINT CHARACTERISTICS |
| | THIGH PITCH | LEG IN FLIGHT | STIFF JOINT CHARACTERISTICS |
| | KNEE PITCH | LEG IN FLIGHT | SOFT JOINT CHARACTERISTICS |
| | ANKLE ROLL | LEG IN FLIGHT | SOFT JOINT CHARACTERISTICS |
| | ANKLE PITCH | LEG IN FLIGHT | SOFT JOINT CHARACTERISTICS |
| LEFT | SHOULDER PITCH | STIFF JOINT CHARACTERISTICS | |
| | ELBOW PITCH | STIFF JOINT CHARACTERISTICS | |
| | THIGH ROLL | LEG IN STANCE | STIFF JOINT CHARACTERISTICS |
| | THIGH PITCH | LEG IN STANCE | STIFF JOINT CHARACTERISTICS |
| | KNEE PITCH | LEG IN STANCE | STIFF JOINT CHARACTERISTICS |
| | ANKLE ROLL | LEG IN STANCE | STIFF JOINT CHARACTERISTICS |
| | ANKLE PITCH | LEG IN STANCE | STIFF JOINT CHARACTERISTICS |
| OTHER JOINT SITES | | STIFF JOINT CHARACTERISTICS | |

FIG.27

STIFF JOINT
CHARACTERISTICS
  SERVO CHARACTERISTICS
  (FIG.12)
  JOINT VISCOSITY
  (FIG.18A)

INTERMEDIATE JOINT
CHARACTERISTICS
  SERVO CHARACTERISTICS
  (FIG.13)
  JOINT VISCOSITY
  (FIG.18A)

SOFT JOINT
CHARACTERISTICS
  SERVO CHARACTERISTICS
  (FIG.13)
  JOINT VISCOSITY
  (FIG.18B)

| | | | |
|---|---|---|---|
| | | TIME PERIOD WHEN BOTH LEGS ARE IN STANCE | |
| | | LOWER LIMBS FORM A CLOSED LINK SYSTEM WITH FLOOR SURFACE | |
| | | 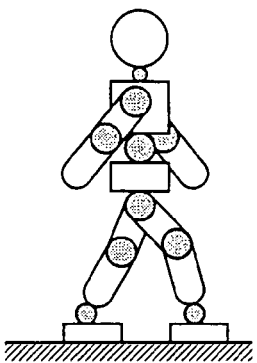 | |
| RIGHT | SHOULDER PITCH | STIFF JOINT CHARACTERISTICS | |
| | ELBOW PITCH | STIFF JOINT CHARACTERISTICS | |
| | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | INTERMEDIATE JOINT CHARACTERISTICS |
| | ANKLE PITCH | LEG IN STANCE | INTERMEDIATE JOINT CHARACTERISTICS |
| LEFT | SHOULDER PITCH | STIFF JOINT CHARACTERISTICS | |
| | ELBOW PITCH | STIFF JOINT CHARACTERISTICS | |
| | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | INTERMEDIATE JOINT CHARACTERISTICS |
| | ANKLE PITCH | LEG IN STANCE | INTERMEDIATE JOINT CHARACTERISTICS |
| OTHER JOINT SITES | | STIFF JOINT CHARACTERISTICS | |

FIG.28

STIFF JOINT
CHARACTERISTICS
  SERVO CHARACTERISTICS
  (FIG.12)
  JOINT VISCOSITY
  (FIG.18A)

INTERMEDIATE JOINT
CHARACTERISTICS
  SERVO CHARACTERISTICS
  (FIG.13)
  JOINT VISCOSITY
  (FIG.18A)

SOFT JOINT
CHARACTERISTICS
  SERVO CHARACTERISTICS
  (FIG.13)
  JOINT VISCOSITY
  (FIG.18B)

| TIME PERIOD WHEN BOTH LEGS ARE IN STANCE |
|---|
| LOWER LIMBS FORM A CLOSED LINK SYSTEM WITH FLOOR SURFACE |

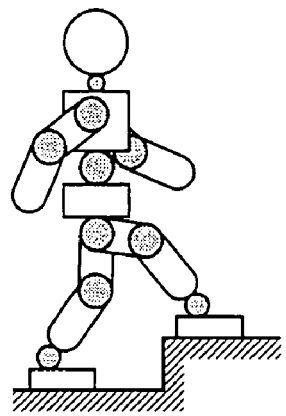

| | | | |
|---|---|---|---|
| RIGHT | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | INTERMEDIATE JOINT CHARACTERISTICS |
| | ANKLE PITCH | LEG IN STANCE | INTERMEDIATE JOINT CHARACTERISTICS |
| LEFT | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | INTERMEDIATE JOINT CHARACTERISTICS |
| | ANKLE PITCH | LEG IN STANCE | INTERMEDIATE JOINT CHARACTERISTICS |
| OTHER JOINT SITES | | | STIFF JOINT CHARACTERISTICS |

FIG.29

STIFF JOINT CHARACTERISTICS
   SERVO CHARACTERISTICS (FIG.12)
   JOINT VISCOSITY (FIG.18A)

INTERMEDIATE JOINT CHARACTERISTICS
   SERVO CHARACTERISTICS (FIG.13)
   JOINT VISCOSITY (FIG.18A)

SOFT JOINT CHARACTERISTICS
   SERVO CHARACTERISTICS (FIG.13)
   JOINT VISCOSITY (FIG.18B)

| | | | INSTANT OF CLEARING THE FLOOR |
| | | | TRANSITION FROM CLOSED LINK SYSTEM TO OPEN LINK SYSTEM |

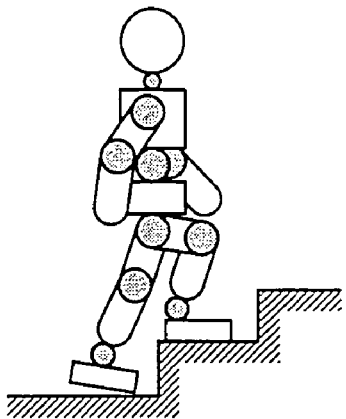

| | | | |
|---|---|---|---|
| RIGHT | THIGH ROLL | LEG IN STANCE | STIFF JOINT CHARACTERISTICS |
| | THIGH PITCH | LEG IN STANCE | STIFF JOINT CHARACTERISTICS |
| | KNEE PITCH | LEG IN STANCE | STIFF JOINT CHARACTERISTICS |
| | ANKLE ROLL | LEG IN STANCE | STIFF JOINT CHARACTERISTICS |
| | ANKLE PITCH | LEG IN STANCE | STIFF JOINT CHARACTERISTICS |
| LEFT | THIGH ROLL | LEG IN FLIGHT | INTERMEDIATE JOINT CHARACTERISTICS |
| | THIGH PITCH | LEG IN FLIGHT | INTERMEDIATE JOINT CHARACTERISTICS |
| | KNEE PITCH | LEG IN FLIGHT | INTERMEDIATE JOINT CHARACTERISTICS |
| | ANKLE ROLL | LEG IN FLIGHT | INTERMEDIATE JOINT CHARACTERISTICS |
| | ANKLE PITCH | LEG IN FLIGHT | INTERMEDIATE JOINT CHARACTERISTICS |
| OTHER JOINT SITES | | | STIFF JOINT CHARACTERISTICS |

FIG.30

STIFF JOINT CHARACTERISTICS
  SERVO CHARACTERISTICS (FIG.12)
  JOINT VISCOSITY (FIG.18A)

INTERMEDIATE JOINT CHARACTERISTICS
  SERVO CHARACTERISTICS (FIG.13)
  JOINT VISCOSITY (FIG.18A)

SOFT JOINT CHARACTERISTICS
  SERVO CHARACTERISTICS (FIG.13)
  JOINT VISCOSITY (FIG.18B)

| | | TIME PERIOD WHEN A SOLE LEG IS IN STANCE (ANOTHER LEG BEING LIFTED) | |
|---|---|---|---|
| | | ROBOT BODY (LEGS, BODY TRUNK AND ARMS) FORMS AN OPEN LINK SYSTEM WITH FLOOR SURFACE | |
| | | 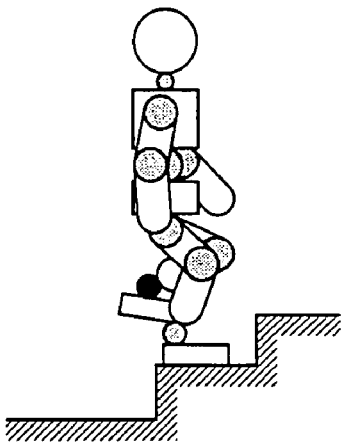 | |
| RIGHT | THIGH ROLL | LEG IN STANCE | STIFF JOINT CHARACTERISTICS |
| | THIGH PITCH | LEG IN STANCE | STIFF JOINT CHARACTERISTICS |
| | KNEE PITCH | LEG IN STANCE | STIFF JOINT CHARACTERISTICS |
| | ANKLE ROLL | LEG IN STANCE | STIFF JOINT CHARACTERISTICS |
| | ANKLE PITCH | LEG IN STANCE | STIFF JOINT CHARACTERISTICS |
| LEFT | THIGH ROLL | LEG IN FLIGHT | INTERMEDIATE JOINT CHARACTERISTICS |
| | THIGH PITCH | LEG IN FLIGHT | INTERMEDIATE JOINT CHARACTERISTICS |
| | KNEE PITCH | LEG IN FLIGHT | INTERMEDIATE JOINT CHARACTERISTICS |
| | ANKLE ROLL | LEG IN FLIGHT | SOFT JOINT CHARACTERISTICS |
| | ANKLE PITCH | LEG IN FLIGHT | SOFT JOINT CHARACTERISTICS |
| OTHER JOINT SITES | | | STIFF JOINT CHARACTERISTICS |

FIG.31

STIFF JOINT
CHARACTERISTICS
   SERVO CHARACTERISTICS
   (FIG.12)
   JOINT VISCOSITY
   (FIG.18A)

INTERMEDIATE JOINT
CHARACTERISTICS
   SERVO CHARACTERISTICS
   (FIG.13)
   JOINT VISCOSITY
   (FIG.18A)

SOFT JOINT
CHARACTERISTICS
   SERVO CHARACTERISTICS
   (FIG.13)
   JOINT VISCOSITY
   (FIG.18B)

| TIME PERIOD WHEN A SOLE LEG IS IN STANCE (ANOTHER LEG BEING SWUNG DOWN) |
| --- |
| ROBOT BODY (LEGS, BODY TRUNK AND ARMS) FORMS AN OPEN LINK SYSTEM WITH FLOOR SURFACE |

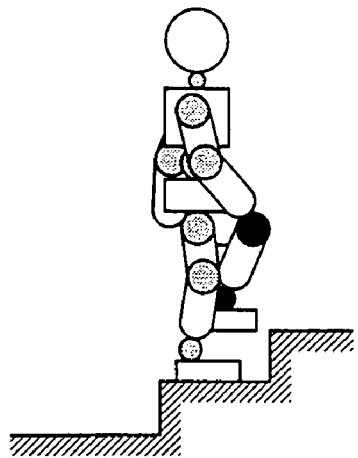

| | | | |
| --- | --- | --- | --- |
| RIGHT | THIGH ROLL | LEG IN STANCE | STIFF JOINT CHARACTERISTICS |
| | THIGH PITCH | LEG IN STANCE | STIFF JOINT CHARACTERISTICS |
| | KNEE PITCH | LEG IN STANCE | STIFF JOINT CHARACTERISTICS |
| | ANKLE ROLL | LEG IN STANCE | STIFF JOINT CHARACTERISTICS |
| | ANKLE PITCH | LEG IN STANCE | STIFF JOINT CHARACTERISTICS |
| LEFT | THIGH ROLL | LEG IN FLIGHT | INTERMEDIATE JOINT CHARACTERISTICS |
| | THIGH PITCH | LEG IN FLIGHT | INTERMEDIATE JOINT CHARACTERISTICS |
| | KNEE PITCH | LEG IN FLIGHT | SOFT JOINT CHARACTERISTICS |
| | ANKLE ROLL | LEG IN FLIGHT | SOFT JOINT CHARACTERISTICS |
| | ANKLE PITCH | LEG IN FLIGHT | SOFT JOINT CHARACTERISTICS |
| OTHER JOINT SITES | | | STIFF JOINT CHARACTERISTICS |

FIG.32

STIFF JOINT
CHARACTERISTICS
  SERVO CHARACTERISTICS
  (FIG.12)
  JOINT VISCOSITY
  (FIG.18A)

INTERMEDIATE JOINT
CHARACTERISTICS
  SERVO CHARACTERISTICS
  (FIG.13)
  JOINT VISCOSITY
  (FIG.18A)

SOFT JOINT
CHARACTERISTICS
  SERVO CHARACTERISTICS
  (FIG.13)
  JOINT VISCOSITY
  (FIG.18B)

| INSTANT OF TOUCHDOWN |
|---|
| LOWER LIMBS FORM A CLOSED LINK SYSTEM WITH FLOOR SURFACE |

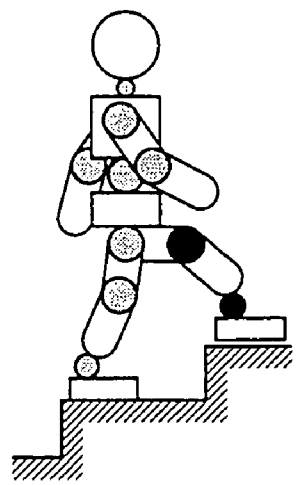

| | | | |
|---|---|---|---|
| RIGHT | THIGH ROLL | LEG IN STANCE | STIFF JOINT CHARACTERISTICS |
| | THIGH PITCH | LEG IN STANCE | STIFF JOINT CHARACTERISTICS |
| | KNEE PITCH | LEG IN STANCE | STIFF JOINT CHARACTERISTICS |
| | ANKLE ROLL | LEG IN STANCE | STIFF JOINT CHARACTERISTICS |
| | ANKLE PITCH | LEG IN STANCE | STIFF JOINT CHARACTERISTICS |
| LEFT | THIGH ROLL | LEG IN FLIGHT | INTERMEDIATE JOINT CHARACTERISTICS |
| | THIGH PITCH | LEG IN FLIGHT | INTERMEDIATE JOINT CHARACTERISTICS |
| | KNEE PITCH | LEG IN FLIGHT | SOFT JOINT CHARACTERISTICS |
| | ANKLE ROLL | LEG IN FLIGHT | SOFT JOINT CHARACTERISTICS |
| | ANKLE PITCH | LEG IN FLIGHT | SOFT JOINT CHARACTERISTICS |
| OTHER JOINT SITES | | | STIFF JOINT CHARACTERISTICS |

FIG.33

STIFF JOINT
CHARACTERISTICS
  SERVO CHARACTERISTICS
  (FIG.12)
  JOINT VISCOSITY
  (FIG.18A)

INTERMEDIATE JOINT
CHARACTERISTICS
  SERVO CHARACTERISTICS
  (FIG.13)
  JOINT VISCOSITY
  (FIG.18A)

SOFT JOINT
CHARACTERISTICS
  SERVO CHARACTERISTICS
  (FIG.13)
  JOINT VISCOSITY
  (FIG.18B)

| TIME PERIOD WHEN BOTH LEGS ARE IN STANCE |
|---|
| LOWER LIMBS FORM A CLOSED LINK SYSTEM WITH FLOOR SURFACE |
| 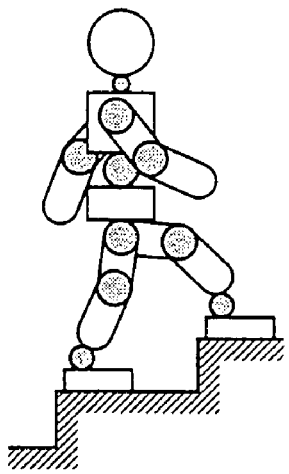 |

| | | | |
|---|---|---|---|
| RIGHT | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | INTERMEDIATE JOINT CHARACTERISTICS |
| | ANKLE PITCH | LEG IN STANCE | INTERMEDIATE JOINT CHARACTERISTICS |
| LEFT | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | INTERMEDIATE JOINT CHARACTERISTICS |
| | ANKLE PITCH | LEG IN STANCE | INTERMEDIATE JOINT CHARACTERISTICS |
| OTHER JOINT SITES | | | STIFF JOINT CHARACTERISTICS |

FIG.34

| | | TIME PERIOD WHEN BOTH LEGS ARE IN STANCE |
|---|---|---|
| STIFF JOINT CHARACTERISTICS<br>　SERVO CHARACTERISTICS (FIG.12)<br>　JOINT VISCOSITY (FIG.18A)<br><br>INTERMEDIATE JOINT CHARACTERISTICS<br>　SERVO CHARACTERISTICS (FIG.13)<br>　JOINT VISCOSITY (FIG.18A)<br><br>SOFT JOINT CHARACTERISTICS<br>　SERVO CHARACTERISTICS (FIG.13)<br>　JOINT VISCOSITY (FIG.18B) | | LOWER LIMBS FORM A CLOSED LINK SYSTEM WITH FLOOR SURFACE<br>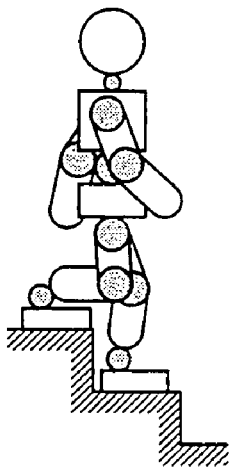 |
| RIGHT | THIGH ROLL | LEG IN STANCE | INTERMEDIATE JOINT CHARACTERISTICS |
| RIGHT | THIGH PITCH | LEG IN STANCE | INTERMEDIATE JOINT CHARACTERISTICS |
| RIGHT | KNEE PITCH | LEG IN STANCE | INTERMEDIATE JOINT CHARACTERISTICS |
| RIGHT | ANKLE ROLL | LEG IN STANCE | INTERMEDIATE JOINT CHARACTERISTICS |
| RIGHT | ANKLE PITCH | LEG IN STANCE | INTERMEDIATE JOINT CHARACTERISTICS |
| LEFT | THIGH ROLL | LEG IN STANCE | INTERMEDIATE JOINT CHARACTERISTICS |
| LEFT | THIGH PITCH | LEG IN STANCE | INTERMEDIATE JOINT CHARACTERISTICS |
| LEFT | KNEE PITCH | LEG IN STANCE | INTERMEDIATE JOINT CHARACTERISTICS |
| LEFT | ANKLE ROLL | LEG IN STANCE | INTERMEDIATE JOINT CHARACTERISTICS |
| LEFT | ANKLE PITCH | LEG IN STANCE | INTERMEDIATE JOINT CHARACTERISTICS |
| OTHER JOINT SITES | | STIFF JOINT CHARACTERISTICS |

FIG.36

STIFF JOINT CHARACTERISTICS

SERVO CHARACTERISTICS (FIG.12)
  JOINT VISCOSITY (FIG.18A)

INTERMEDIATE JOINT CHARACTERISTICS

SERVO CHARACTERISTICS (FIG.13)
  JOINT VISCOSITY (FIG.18A)

SOFT JOINT CHARACTERISTICS

SERVO CHARACTERISTICS (FIG.13)
  JOINT VISCOSITY (FIG.18B)

| | | | |
|---|---|---|---|
| | | INSTANT OF CLEARING THE FLOOR | |
| | | ROBOT BODY (LEGS, BODY TRUNK AND ARMS) FORMS AN OPEN LINK SYSTEM WITH FLOOR SURFACE | |

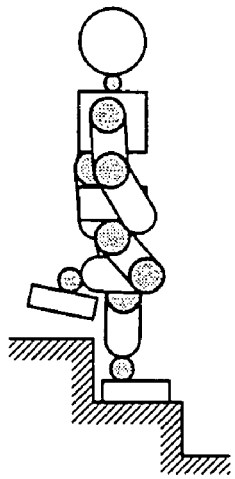

| | | | |
|---|---|---|---|
| RIGHT | THIGH ROLL | LEG IN STANCE | STIFF JOINT CHARACTERISTICS |
| | THIGH PITCH | LEG IN STANCE | STIFF JOINT CHARACTERISTICS |
| | KNEE PITCH | LEG IN STANCE | STIFF JOINT CHARACTERISTICS |
| | ANKLE ROLL | LEG IN STANCE | STIFF JOINT CHARACTERISTICS |
| | ANKLE PITCH | LEG IN STANCE | STIFF JOINT CHARACTERISTICS |
| LEFT | THIGH ROLL | LEG IN FLIGHT | INTERMEDIATE JOINT CHARACTERISTICS |
| | THIGH PITCH | LEG IN FLIGHT | INTERMEDIATE JOINT CHARACTERISTICS |
| | KNEE PITCH | LEG IN FLIGHT | INTERMEDIATE JOINT CHARACTERISTICS |
| | ANKLE ROLL | LEG IN FLIGHT | INTERMEDIATE JOINT CHARACTERISTICS |
| | ANKLE PITCH | LEG IN FLIGHT | INTERMEDIATE JOINT CHARACTERISTICS |
| OTHER JOINT SITES | | | STIFF JOINT CHARACTERISTICS |

FIG.37

STIFF JOINT
CHARACTERISTICS
  SERVO CHARACTERISTICS
  (FIG.12)
  JOINT VISCOSITY
  (FIG.18A)

INTERMEDIATE JOINT
CHARACTERISTICS
  SERVO CHARACTERISTICS
  (FIG.13)
  JOINT VISCOSITY
  (FIG.18A)

SOFT JOINT
CHARACTERISTICS
  SERVO CHARACTERISTICS
  (FIG.13)
  JOINT VISCOSITY
  (FIG.18B)

TIME PERIOD WHEN A SOLE LEG IS IN STANCE (ANOTHER LEG BEING LIFTED)

ROBOT BODY (LEGS, BODY TRUNK AND ARMS) FORMS A CLOSED LINK SYSTEM WITH FLOOR SURFACE

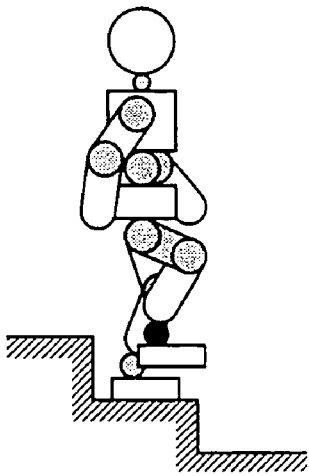

| | | | |
|---|---|---|---|
| RIGHT | THIGH ROLL | LEG IN FLIGHT | STIFF JOINT CHARACTERISTICS |
| | THIGH PITCH | LEG IN FLIGHT | STIFF JOINT CHARACTERISTICS |
| | KNEE PITCH | LEG IN FLIGHT | INTERMEDIATE JOINT CHARACTERISTICS |
| | ANKLE ROLL | LEG IN FLIGHT | SOFT JOINT CHARACTERISTICS |
| | ANKLE PITCH | LEG IN FLIGHT | SOFT JOINT CHARACTERISTICS |
| LEFT | THIGH ROLL | LEG IN STANCE | STIFF JOINT CHARACTERISTICS |
| | THIGH PITCH | LEG IN STANCE | STIFF JOINT CHARACTERISTICS |
| | KNEE PITCH | LEG IN STANCE | STIFF JOINT CHARACTERISTICS |
| | ANKLE ROLL | LEG IN STANCE | STIFF JOINT CHARACTERISTICS |
| | ANKLE PITCH | LEG IN STANCE | STIFF JOINT CHARACTERISTICS |
| OTHER JOINT SITES | | | STIFF JOINT CHARACTERISTICS |

FIG.38

- STIFF JOINT CHARACTERISTICS
  - SERVO CHARACTERISTICS (FIG.12)
  - JOINT VISCOSITY (FIG.18A)
- INTERMEDIATE JOINT CHARACTERISTICS
  - SERVO CHARACTERISTICS (FIG.13)
  - JOINT VISCOSITY (FIG.18A)
- SOFT JOINT CHARACTERISTICS
  - SERVO CHARACTERISTICS (FIG.13)
  - JOINT VISCOSITY (FIG.18B)

| TIME PERIOD WHEN A SOLE LEG IS IN STANCE (ANOTHER LEG BEING SWUNG DOWN) |
|---|
| ROBOT BODY (LEGS, BODY TRUNK AND ARMS) FORMS AN OPEN LINK SYSTEM WITH FLOOR SURFACE |

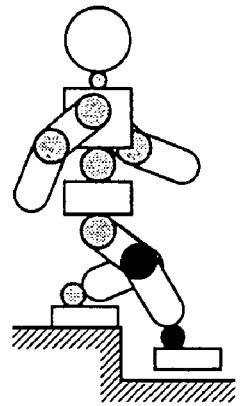

| | | | |
|---|---|---|---|
| RIGHT | THIGH ROLL | LEG IN FLIGHT | STIFF JOINT CHARACTERISTICS |
| | THIGH PITCH | LEG IN FLIGHT | STIFF JOINT CHARACTERISTICS |
| | KNEE PITCH | LEG IN FLIGHT | SOFT JOINT CHARACTERISTICS |
| | ANKLE ROLL | LEG IN FLIGHT | SOFT JOINT CHARACTERISTICS |
| | ANKLE PITCH | LEG IN FLIGHT | SOFT JOINT CHARACTERISTICS |
| LEFT | THIGH ROLL | LEG IN STANCE | STIFF JOINT CHARACTERISTICS |
| | THIGH PITCH | LEG IN STANCE | STIFF JOINT CHARACTERISTICS |
| | KNEE PITCH | LEG IN STANCE | STIFF JOINT CHARACTERISTICS |
| | ANKLE ROLL | LEG IN STANCE | STIFF JOINT CHARACTERISTICS |
| | ANKLE PITCH | LEG IN STANCE | STIFF JOINT CHARACTERISTICS |
| OTHER JOINT SITES | | | STIFF JOINT CHARACTERISTICS |

FIG.39

STIFF JOINT
CHARACTERISTICS
  SERVO CHARACTERISTICS
  (FIG.12)
  JOINT VISCOSITY
  (FIG.18A)

INTERMEDIATE JOINT
CHARACTERISTICS
  SERVO CHARACTERISTICS
  (FIG.13)
  JOINT VISCOSITY
  (FIG.18A)

SOFT JOINT
CHARACTERISTICS
  SERVO CHARACTERISTICS
  (FIG.13)
  JOINT VISCOSITY
  (FIG.18B)

| INSTANT OF TOUCHDOWN |
| --- |
| LOWER LIMBS FORM A CLOSED LINK SYSTEM WITH FLOOR SURFACE |

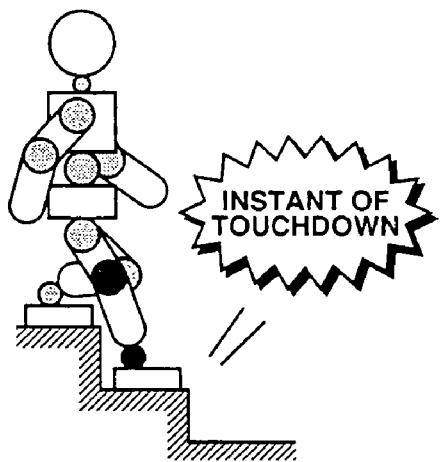

| | | | |
| --- | --- | --- | --- |
| RIGHT | THIGH ROLL | LEG IN FLIGHT | STIFF JOINT CHARACTERISTICS |
| | THIGH PITCH | LEG IN FLIGHT | STIFF JOINT CHARACTERISTICS |
| | KNEE PITCH | LEG IN FLIGHT | SOFT JOINT CHARACTERISTICS |
| | ANKLE ROLL | LEG IN FLIGHT | SOFT JOINT CHARACTERISTICS |
| | ANKLE PITCH | LEG IN FLIGHT | SOFT JOINT CHARACTERISTICS |
| LEFT | THIGH ROLL | LEG IN STANCE | STIFF JOINT CHARACTERISTICS |
| | THIGH PITCH | LEG IN STANCE | STIFF JOINT CHARACTERISTICS |
| | KNEE PITCH | LEG IN STANCE | STIFF JOINT CHARACTERISTICS |
| | ANKLE ROLL | LEG IN STANCE | STIFF JOINT CHARACTERISTICS |
| | ANKLE PITCH | LEG IN STANCE | STIFF JOINT CHARACTERISTICS |
| OTHER JOINT SITES | | | STIFF JOINT CHARACTERISTICS |

FIG.40

STIFF JOINT
CHARACTERISTICS
  SERVO CHARACTERISTICS
  (FIG.12)
  JOINT VISCOSITY
  (FIG.18A)

INTERMEDIATE JOINT
CHARACTERISTICS
  SERVO CHARACTERISTICS
  (FIG.13)
  JOINT VISCOSITY
  (FIG.18A)

SOFT JOINT
CHARACTERISTICS
  SERVO CHARACTERISTICS
  (FIG.13)
  JOINT VISCOSITY
  (FIG.18B)

| | | TIME PERIOD WHEN BOTH LEGS ARE IN STANCE | |
|---|---|---|---|
| | | LOWER LIMBS FORM A CLOSED LINK SYSTEM WITH FLOOR SURFACE | |
| | | 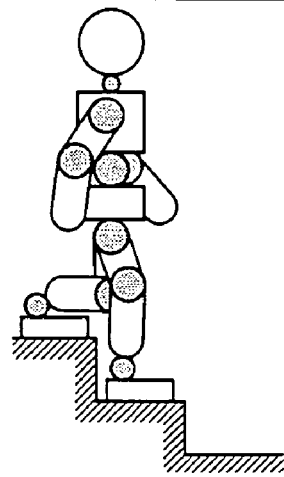 | |
| RIGHT | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | INTERMEDIATE JOINT CHARACTERISTICS |
| | ANKLE PITCH | LEG IN STANCE | INTERMEDIATE JOINT CHARACTERISTICS |
| LEFT | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | INTERMEDIATE JOINT CHARACTERISTICS |
| | ANKLE PITCH | LEG IN STANCE | INTERMEDIATE JOINT CHARACTERISTICS |
| OTHER JOINT SITES | | STIFF JOINT CHARACTERISTICS | |

FIG.41

| STIFF JOINT CHARACTERISTICS<br>  SERVO CHARACTERISTICS (FIG.12)<br>  JOINT VISCOSITY (FIG.18A)<br>INTERMEDIATE JOINT CHARACTERISTICS<br>  SERVO CHARACTERISTICS (FIG.13)<br>  JOINT VISCOSITY (FIG.18A)<br>SOFT JOINT CHARACTERISTICS<br>  SERVO CHARACTERISTICS (FIG.13)<br>  JOINT VISCOSITY (FIG.18B) | TIME PERIOD WHEN BOTH LEGS ARE IN STANCE |
|---|---|
| | LOWER LIMBS FORM A CLOSED LINK SYSTEM WITH FLOOR SURFACE |
| | 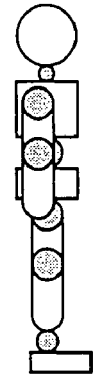 |

| | | | |
|---|---|---|---|
| RIGHT | THIGH YAW | LEG IN STANCE | INTERMEDIATE JOINT CHARACTERISTICS |
| | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | INTERMEDIATE JOINT CHARACTERISTICS |
| | ANKLE PITCH | LEG IN STANCE | INTERMEDIATE JOINT CHARACTERISTICS |
| LEFT | THIGH YAW | LEG IN STANCE | INTERMEDIATE JOINT CHARACTERISTICS |
| | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | INTERMEDIATE JOINT CHARACTERISTICS |
| | ANKLE PITCH | LEG IN STANCE | INTERMEDIATE JOINT CHARACTERISTICS |
| OTHER JOINT SITES | | | STIFF JOINT CHARACTERISTICS |

FIG.44

STIFF JOINT
CHARACTERISTICS
  SERVO CHARACTERISTICS
  (FIG.12)
  JOINT VISCOSITY
  (FIG.18A)

INTERMEDIATE JOINT
CHARACTERISTICS
  SERVO CHARACTERISTICS
  (FIG.13)
  JOINT VISCOSITY
  (FIG.18A)

SOFT JOINT
CHARACTERISTICS
  SERVO CHARACTERISTICS
  (FIG.13)
  JOINT VISCOSITY
  (FIG.18B)

| TIME PERIOD WHEN A SOLE LEG IS IN STANCE (ANOTHER LEG BEING LIFTED) |
|---|
| ROBOT BODY (LEGS, BODY TRUNK AND ARMS) FORMS AN OPEN LINK SYSTEM WITH FLOOR SURFACE |
| 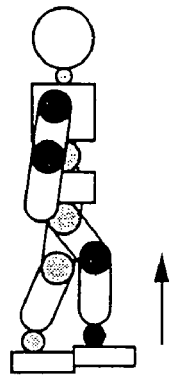 |

| | | | |
|---|---|---|---|
| RIGHT | THIGH YAW | LEG IN FLIGHT | STIFF JOINT CHARACTERISTICS |
| | THIGH ROLL | LEG IN FLIGHT | STIFF JOINT CHARACTERISTICS |
| | THIGH PITCH | LEG IN FLIGHT | STIFF JOINT CHARACTERISTICS |
| | KNEE PITCH | LEG IN FLIGHT | SOFT JOINT CHARACTERISTICS |
| | ANKLE ROLL | LEG IN FLIGHT | SOFT JOINT CHARACTERISTICS |
| | ANKLE PITCH | LEG IN FLIGHT | SOFT JOINT CHARACTERISTICS |
| LEFT | THIGH YAW | LEG IN STANCE | STIFF JOINT CHARACTERISTICS |
| | THIGH ROLL | LEG IN STANCE | STIFF JOINT CHARACTERISTICS |
| | THIGH PITCH | LEG IN STANCE | STIFF JOINT CHARACTERISTICS |
| | KNEE PITCH | LEG IN STANCE | STIFF JOINT CHARACTERISTICS |
| | ANKLE ROLL | LEG IN STANCE | STIFF JOINT CHARACTERISTICS |
| | ANKLE PITCH | LEG IN STANCE | STIFF JOINT CHARACTERISTICS |
| OTHER JOINT SITES | | | STIFF JOINT CHARACTERISTICS |

FIG.45

STIFF JOINT
CHARACTERISTICS
 SERVO CHARACTERISTICS
 (FIG.12)
 JOINT VISCOSITY
 (FIG.18A)

INTERMEDIATE JOINT
CHARACTERISTICS
 SERVO CHARACTERISTICS
 (FIG.13)
 JOINT VISCOSITY
 (FIG.18A)

SOFT JOINT
CHARACTERISTICS
 SERVO CHARACTERISTICS
 (FIG.13)
 JOINT VISCOSITY
 (FIG.18B)

TIME PERIOD WHEN A SOLE LEG IS IN STANCE

ROBOT BODY (LEGS, BODY TRUNK AND ARMS) FORMS AN OPEN LINK SYSTEM WITH FLOOR SURFACE

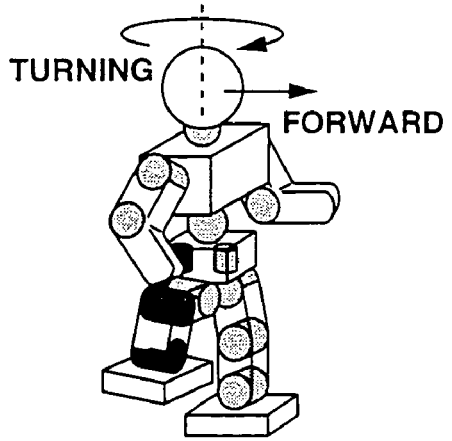

| | | | |
|---|---|---|---|
| RIGHT | THIGH YAW | LEG IN FLIGHT | STIFF JOINT CHARACTERISTICS |
| | THIGH ROLL | LEG IN FLIGHT | STIFF JOINT CHARACTERISTICS |
| | THIGH PITCH | LEG IN FLIGHT | STIFF JOINT CHARACTERISTICS |
| | KNEE PITCH | LEG IN FLIGHT | SOFT JOINT CHARACTERISTICS |
| | ANKLE ROLL | LEG IN FLIGHT | SOFT JOINT CHARACTERISTICS |
| | ANKLE PITCH | LEG IN FLIGHT | SOFT JOINT CHARACTERISTICS |
| LEFT | THIGH YAW | LEG IN STANCE | STIFF JOINT CHARACTERISTICS |
| | THIGH ROLL | LEG IN STANCE | STIFF JOINT CHARACTERISTICS |
| | THIGH PITCH | LEG IN STANCE | STIFF JOINT CHARACTERISTICS |
| | KNEE PITCH | LEG IN STANCE | STIFF JOINT CHARACTERISTICS |
| | ANKLE ROLL | LEG IN STANCE | STIFF JOINT CHARACTERISTICS |
| | ANKLE PITCH | LEG IN STANCE | STIFF JOINT CHARACTERISTICS |
| OTHER JOINT SITES | | | STIFF JOINT CHARACTERISTICS |

FIG.46

STIFF JOINT
CHARACTERISTICS
   SERVO CHARACTERISTICS
   (FIG.12)
   JOINT VISCOSITY
   (FIG.18A)

INTERMEDIATE JOINT
CHARACTERISTICS
   SERVO CHARACTERISTICS
   (FIG.13)
   JOINT VISCOSITY
   (FIG.18A)

SOFT JOINT
CHARACTERISTICS
   SERVO CHARACTERISTICS
   (FIG.13)
   JOINT VISCOSITY
   (FIG.18B)

| | | | |
|---|---|---|---|
| | | TIME PERIOD WHEN BOTH LEGS ARE IN STANCE | |
| | | LOWER LIMBS FORM A CLOSED LINK SYSTEM WITH FLOOR SURFACE | |
| | | 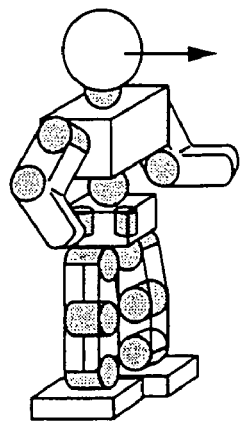 | |
| RIGHT | THIGH YAW | LEG IN STANCE | INTERMEDIATE JOINT CHARACTERISTICS |
| | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | INTERMEDIATE JOINT CHARACTERISTICS |
| | ANKLE PITCH | LEG IN STANCE | INTERMEDIATE JOINT CHARACTERISTICS |
| LEFT | THIGH YAW | LEG IN STANCE | INTERMEDIATE JOINT CHARACTERISTICS |
| | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | INTERMEDIATE JOINT CHARACTERISTICS |
| | ANKLE PITCH | LEG IN STANCE | INTERMEDIATE JOINT CHARACTERISTICS |
| OTHER JOINT SITES | | STIFF JOINT CHARACTERISTICS | |

FIG.47

STIFF JOINT
CHARACTERISTICS
  SERVO CHARACTERISTICS
  (FIG.12)
  JOINT VISCOSITY
  (FIG.18A)

INTERMEDIATE JOINT
CHARACTERISTICS
  SERVO CHARACTERISTICS
  (FIG.13)
  JOINT VISCOSITY
  (FIG.18A)

SOFT JOINT
CHARACTERISTICS
  SERVO CHARACTERISTICS
  (FIG.13)
  JOINT VISCOSITY
  (FIG.18B)

| TIME PERIOD WHEN A SOLE LEG IS IN STANCE |
|---|
| ROBOT BODY (LEGS, BODY TRUNK AND ARMS) FORMS AN OPEN LINK SYSTEM WITH FLOOR SURFACE |

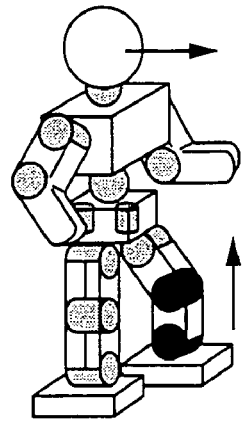

| | | | |
|---|---|---|---|
| RIGHT | THIGH YAW | LEG IN STANCE | STIFF JOINT CHARACTERISTICS |
| | THIGH ROLL | LEG IN STANCE | STIFF JOINT CHARACTERISTICS |
| | THIGH PITCH | LEG IN STANCE | STIFF JOINT CHARACTERISTICS |
| | KNEE PITCH | LEG IN STANCE | STIFF JOINT CHARACTERISTICS |
| | ANKLE ROLL | LEG IN STANCE | STIFF JOINT CHARACTERISTICS |
| | ANKLE PITCH | LEG IN STANCE | STIFF JOINT CHARACTERISTICS |
| LEFT | THIGH YAW | LEG IN FLIGHT | STIFF JOINT CHARACTERISTICS |
| | THIGH ROLL | LEG IN FLIGHT | STIFF JOINT CHARACTERISTICS |
| | THIGH PITCH | LEG IN FLIGHT | STIFF JOINT CHARACTERISTICS |
| | KNEE PITCH | LEG IN FLIGHT | SOFT JOINT CHARACTERISTICS |
| | ANKLE ROLL | LEG IN FLIGHT | SOFT JOINT CHARACTERISTICS |
| | ANKLE PITCH | LEG IN FLIGHT | SOFT JOINT CHARACTERISTICS |
| OTHER JOINT SITES | | | STIFF JOINT CHARACTERISTICS |

FIG.48

STIFF JOINT
CHARACTERISTICS
   SERVO CHARACTERISTICS
   (FIG.12)
   JOINT VISCOSITY
   (FIG.18A)

INTERMEDIATE JOINT
CHARACTERISTICS
   SERVO CHARACTERISTICS
   (FIG.13)
   JOINT VISCOSITY
   (FIG.18A)

SOFT JOINT
CHARACTERISTICS
   SERVO CHARACTERISTICS
   (FIG.13)
   JOINT VISCOSITY
   (FIG.18B)

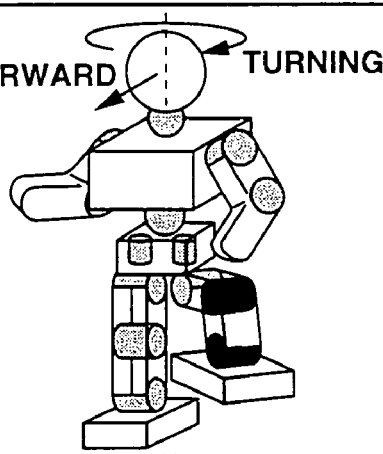

TIME PERIOD WHEN A SOLE LEG IS IN STANCE

ROBOT BODY (LEGS, BODY TRUNK AND ARMS) FORMS AN OPEN LINK SYSTEM WITH FLOOR SURFACE

| | | | |
|---|---|---|---|
| RIGHT | THIGH YAW | LEG IN STANCE | STIFF JOINT CHARACTERISTICS |
| | THIGH ROLL | LEG IN STANCE | STIFF JOINT CHARACTERISTICS |
| | THIGH PITCH | LEG IN STANCE | STIFF JOINT CHARACTERISTICS |
| | KNEE PITCH | LEG IN STANCE | STIFF JOINT CHARACTERISTICS |
| | ANKLE ROLL | LEG IN STANCE | STIFF JOINT CHARACTERISTICS |
| | ANKLE PITCH | LEG IN STANCE | STIFF JOINT CHARACTERISTICS |
| LEFT | THIGH YAW | LEG IN FLIGHT | STIFF JOINT CHARACTERISTICS |
| | THIGH ROLL | LEG IN FLIGHT | STIFF JOINT CHARACTERISTICS |
| | THIGH PITCH | LEG IN FLIGHT | STIFF JOINT CHARACTERISTICS |
| | KNEE PITCH | LEG IN FLIGHT | SOFT JOINT CHARACTERISTICS |
| | ANKLE ROLL | LEG IN FLIGHT | SOFT JOINT CHARACTERISTICS |
| | ANKLE PITCH | LEG IN FLIGHT | SOFT JOINT CHARACTERISTICS |
| OTHER JOINT SITES | | | STIFF JOINT CHARACTERISTICS |

FIG.49

STIFF JOINT CHARACTERISTICS
  SERVO CHARACTERISTICS (FIG.12)
  JOINT VISCOSITY (FIG.18A)

INTERMEDIATE JOINT CHARACTERISTICS
  SERVO CHARACTERISTICS (FIG.13)
  JOINT VISCOSITY (FIG.18A)

SOFT JOINT CHARACTERISTICS
  SERVO CHARACTERISTICS (FIG.13)
  JOINT VISCOSITY (FIG.18B)

| TIME PERIOD WHEN A SOLE LEG IS IN STANCE |
|---|
| ROBOT BODY (LEGS, BODY TRUNK AND ARMS) FORMS AN OPEN LINK SYSTEM WITH FLOOR SURFACE |

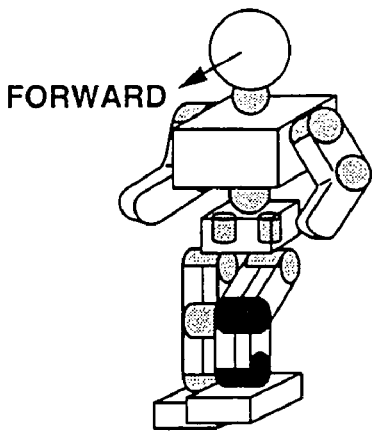

FORWARD

| | | | |
|---|---|---|---|
| RIGHT | THIGH YAW | LEG IN STANCE | STIFF JOINT CHARACTERISTICS |
| | THIGH ROLL | LEG IN STANCE | STIFF JOINT CHARACTERISTICS |
| | THIGH PITCH | LEG IN STANCE | STIFF JOINT CHARACTERISTICS |
| | KNEE PITCH | LEG IN STANCE | STIFF JOINT CHARACTERISTICS |
| | ANKLE ROLL | LEG IN STANCE | STIFF JOINT CHARACTERISTICS |
| | ANKLE PITCH | LEG IN STANCE | STIFF JOINT CHARACTERISTICS |
| LEFT | THIGH YAW | LEG IN FLIGHT | STIFF JOINT CHARACTERISTICS |
| | THIGH ROLL | LEG IN FLIGHT | STIFF JOINT CHARACTERISTICS |
| | THIGH PITCH | LEG IN FLIGHT | STIFF JOINT CHARACTERISTICS |
| | KNEE PITCH | LEG IN FLIGHT | SOFT JOINT CHARACTERISTICS |
| | ANKLE ROLL | LEG IN FLIGHT | SOFT JOINT CHARACTERISTICS |
| | ANKLE PITCH | LEG IN FLIGHT | SOFT JOINT CHARACTERISTICS |
| OTHER JOINT SITES | | | STIFF JOINT CHARACTERISTICS |

FIG.50

STIFF JOINT
CHARACTERISTICS
   SERVO CHARACTERISTICS
   (FIG.12)
   JOINT VISCOSITY
   (FIG.18A)

INTERMEDIATE JOINT
CHARACTERISTICS
   SERVO CHARACTERISTICS
   (FIG.13)
   JOINT VISCOSITY
   (FIG.18A)

SOFT JOINT
CHARACTERISTICS
   SERVO CHARACTERISTICS
   (FIG.13)
   JOINT VISCOSITY
   (FIG.18B)

| | | | |
|---|---|---|---|
| | | TIME PERIOD WHEN BOTH LEGS ARE IN STANCE | |
| | | LOWER LIMBS FORM A CLOSED LINK SYSTEM WITH FLOOR SURFACE | |
| | | 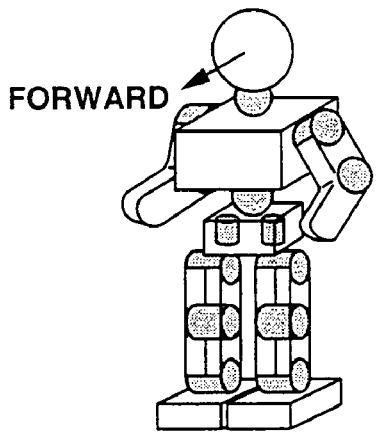 | |
| RIGHT | THIGH YAW | LEG IN STANCE | INTERMEDIATE JOINT CHARACTERISTICS |
| | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | INTERMEDIATE JOINT CHARACTERISTICS |
| | ANKLE PITCH | LEG IN STANCE | INTERMEDIATE JOINT CHARACTERISTICS |
| LEFT | THIGH YAW | LEG IN STANCE | INTERMEDIATE JOINT CHARACTERISTICS |
| | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | INTERMEDIATE JOINT CHARACTERISTICS |
| | ANKLE PITCH | LEG IN STANCE | INTERMEDIATE JOINT CHARACTERISTICS |
| OTHER JOINT SITES | | STIFF JOINT CHARACTERISTICS | |

FIG.51

LEGGED MOBILE ROBOT

BACKGROUND OF THE INVENTION

Field of the Invention

This invention relates to a mechanical apparatus of a multi-axial driving system, such as a robot, universal assembling equipment, robot handling equipment and the like multi-axial controlling apparatus. More particularly, this invention relates to a robot the respective joint sites of which are made up by servo controllers of actuators forming a position controlling system composed of serial compensation proportional gain and phase compensation elements.

Still more particularly, this invention relates to a legged mobile robot, walking on two legs, and having axial links controlled by high gain PD control and in particular to a legged mobile robot in which stable highly efficient operations may be achieved by dynamically or statically controlling the characteristics of the controllers for the actuators and the actuators themselves in executing various movements, to say nothing of walking, of the robot.

Still more particularly, this invention relates to a legged mobile robot in which stable highly efficient operations may be achieved by dynamically or statically controlling the characteristics of the controllers for the actuators and the actuators themselves in executing various movements, to say nothing of going up or down the stairs, of the robot.

Yet more particularly, this invention relates to a legged mobile robot in which stable highly efficient operations may be achieved by dynamically or statically controlling the characteristics of the controllers for the actuators and the actuators themselves in executing various movements, to say nothing of turning of the robot.

This application claims priority of the Japanese Patent Application No. 2002-354260, the Japanese Patent Application No. 2002-354262 and the Japanese Patent Application No. 2002-354263 filed on Dec. 5, 2002, as well as the Japanese Patent Application No. 2003-398452 filed on Nov. 28, 2003, the entireties of which are incorporated by reference herein.

A mechanical apparatus for performing movements simulating the movement of the human being, using electrical or magnetic operations, is termed a "robot". The etymology of the term robot is said to be "ROBOTA" (slave machine) of the Slavonic language. The robots started to be used extensively in this nation towards the end of the sixties. Most of the robots used were industrial robots, such as manipulators or transporting robots, aimed at automating or performing unmanned operations in plants A standstill type robot, installed and used at a fixed place, such as armed robot, is in operation only in a stationary or local working space, such as for assembling or sorting of component parts. On the other hand, the mobile robot is not limited as to a working space and is movable on a preset or undefined path in an unrestricted fashion to perform operations such as to take the place of human operators or to render variegated services to take the place of the human beings, dogs or other living creatures. The legged mobile robots, while being unstable and difficult to control as to its orientation or walking, as compared to crawler or tired robots, are superior in going up and down a ladder or a staircase, in riding over obstacles or walking or running flexibly on leveled or unleveled terrain.

In recent years, researches and developments in the legged mobile robots, including pet type robots, simulating the bodily mechanism or movements of animals, such as quadruples, e.g. dogs or cats, or so-called humanoid robots, simulating the bodily mechanism or movements of animals walking on two feet, such as human beings, are progressing, and expectations may be made of practical use of these types of robots.

These legged mobile robots are generally provided with a large number of joint freedoms, and the movements of the joints are realized by actuator motors. Moreover, the rotational positions and quantities of rotation of the respective motors are taken out and servo controlled to regenerate desired movement patterns as well as to exercise adaptive control.

In a mechanical apparatus of the multi-axial driving system, it is necessary to detect the rotational positions of the respective axes in order to execute precise movements under position control. In particular, in the legged mobile robot of the type walking on two legs, such as humanoid robots, it is necessary for the robot to confirm its own orientation and location autonomously as from the time of power up of the robot body to cause the respective axes to be moved to stable orientation and location. Thus, it is necessary for the servo actuators, responsible for imparting the degree(s) of freedom of the respective joints, to perform positioning control at a higher speed to higher precision and to provide a high torque output at low power consumption.

Basically, the legged mobile robot has a plural number of "legs" made up by rotational joints. In performing stable walking on two legs and stable operations using both arms, in order to act on the outer world or a subject of working, the robot has to perform switching between the closed link state and the open link state at an elevated speed.

For example, the legged mobile robot is able to perform a variety of operations on legs, such as walking, going up and down the stairs, turning of the robot body and a variety of operations on legs, by alternately repeating the operation during the time one of left and right movable legs is in a supporting or stance position and the operation during the time both left and right movable legs are in a supporting or stance position. It is a frequent occurrence that, when the legged mobile robot transfers from the open link mechanism to the closed link mechanism with respect to the floor or wall surface, as when the legged mobile robot transfers from the operation during the time one of left and right movable legs is in a supporting or stance position to the operation during the time both left and right movable legs are in a supporting or stance position, a gap is produced between the predicted control value and the measured value at e.g. the tip end of the foot touching the floor surface.

Due to this gap between the predicted and measured values, so-called "peeling" in which the tip end of the foot does not get to the floor surface at a time point when the foot is predicted to touch the floor surface, or so-called "collision" in which the tip end of the foot gets to the floor surface at a time earlier than the time point when the foot is predicted to touch the floor surface. Such peeling or collision seriously affects the stable adaptive control of the robot body, such as causing falldown of the robot body.

Up to now, attempts have been made to effect switching from the open link state to the closed link state, at an elevated speed, under feedback control by software, using the force information as obtained from a sensor provided at the end of the foot or the torque information from the actuator driving the joint. However, it is technically extremely difficult to realize stable movements by this method because it entails high-speed feedback, high joint driving resolution and a high joint actuating velocity ands acceleration, which may be said to be unrealistic.

On the other hand, in a multi-axial robot, to say nothing of the robot walking on two feet (humanoid robot), it is customary that the respective links of the joint from the theory of kinematic control are controlled with high gain PD control and are in operation with constant characteristics.

In the notion of the present inventors, it is crucial to locally increase or decrease the force or the compliance (mechanical passiveness) at the respective joint sites, if it is desired to realize stable and highly efficient movements, as may be understood from the results of the researches in the movements of the human beings.

When the movements of the respective joint axes are comprehended as a position control system, it is more advisable to motion control such as to diminish the control offset, using a high-gain high-range servo controller. However, when the movements of the respective joint axes are comprehended as a mechanical model, it is advisable to lower the gain or increase/decrease the frequency range being phase-compensated, in consideration of the action the potential energy or of the kinetic energy.

However, if such control is to be implemented on the robot body, such a function is necessary in which the characteristics of the actuators themselves and those of the controllers for the actuators are controlled dynamically and statically, respectively.

For example, there has been made a proposal in connection with a walking control apparatus for a legged mobile robot capable of walking on a known or unknown walking road surface in stability. That is, if, in a legged mobile robot of a structure similar to the human body, walking on two legs, and having arms in an upper body portion, the frictional force is lowered on the walking floor surface such that stability is lowered, the upper body portion may be actuated to assure or recover the stability (see for example the cited reference 1). However, this may be realized by controlling the feedforward gain, while no reference is made to the viscosity of the joint or to the frequency response, while there lacks the concept of the presence or absence of compliance.

There has also been made a proposal as to a walking control apparatus for a mobile robot which, despite its simple structure, is able to permit the robot to go up and down the stairs and to be moved at a high speed. The control apparatus for the mobile robot detects an error between a target landing position and an actual landing position to correct the walking style only at a time point in the course of walking, for example, at the time the support leg clears the surface, when the robot is moved in an environment, such as on a staircase, where constraint is placed on the landing location (see for example the cited reference 2). However, this technique is directed to generation of the walking style for the next one step from the position information of the landing site, as when the robot is going up the stairs, while there lacks the reference to characteristics of the respective joint sites during the time the robot goes up or down the stairs.

There has also been made a proposal as to a legged mobile robot realizing a preset sequence of actions using a basic operating unit composed of chronological operations of the respective joints and a decoding operating unit composed of a combination of basic operations. In this case, the robot's operating mode inclusive of walking is classified into operating units and one or more of these operating units may be combined to realize complex and variegated robot body operations (see for example cited reference 3). However, there lacks particular reference to characteristics to be demonstrated by the joint actuators and servo controllers thereof during turning movements of the robot body.

References Cited
1. Japanese Patent Application Laid-Open Publication No. H7-205069
2. Japanese Patent Application Laid-Open Publication No. H6-63876
3. Japanese Patent Application Laid-Open Publication No. 2002-210680

SUMMARY OF THE INVENTION

It is an object of the present invention to provide a legged mobile robot in which stable and highly efficient movements may be achieved by dynamically or statically controlling the characteristics of the actuators themselves and those of the controllers for the actuators during the time of execution of various movements including the robot's walking first of all.

It is another object of the present invention to provide a legged mobile robot of the type walking on two legs, in which stable and highly efficient movements may be achieved by dynamically or statically controlling the characteristics of the actuators themselves and those of the controllers for the actuators during the time of execution of various movements including the robot's going up and down the stairs.

It is another object of the present invention to provide a legged mobile robot, in which stable and highly efficient movements may be achieved by dynamically or statically controlling the characteristics of the actuators themselves and those of the controllers for the actuators during the time of execution of various movements including the turning movement of the robot body.

In one aspect, the present invention provides a legged mobile robot made up by a plurality of joint sites including a plurality of mobile legs, in which the legged mobile robot comprises means for controlling characteristics of an actuator for carrying out, in combination, the control of gain and phase compensation of a servo controller of the actuator at each of the joint sites and the control of viscous resistance of an actuator motor.

According to the present invention, the positioning accuracy, mechanical passiveness (compliance) and the operating speed, as needed in the respective joint sites of the legged mobile robot, can be optionally set by adjusting the proportional gain and the phase compensation element in the servo controller of the actuator forming the respective joint sites of the legged mobile robot.

Moreover, by intermittently switching the coils of the actuator motors to a short-circuited state or to the open-circuited state, during the time of absence of the current supplied to the coils, the viscous resistance of the motors can be adjusted to change robustness against disturbances, such as oscillations.

By combining the gain and phase compensation control in the servo controllers of these actuators with the control of the viscous resistance of the actuator motors, it is possible to obtain the frequency response of the actuators that can be applied to the portions of the robot body for which the positioning accuracy is crucial, or the frequency response of the actuators that can be applied to the portions of the robot body for which fast response characteristics and compliance are crucial.

By the control means for the actuator characteristics setting the actuator characteristics to "a large low range gain", "a small quantity of phase lead in the high frequency range" and to "a large value of the viscous resistance of the joint", positioning control to high accuracy becomes possible to increase the orientation stability.

On the other hand, by the control means for the actuator characteristics setting the actuator characteristics to "a small value of the low range gain", "a large quantity of phase lead" and to "a small value of the viscous resistance of the joint", mechanical passiveness and fast response characteristics may be imparted to assure followup control for the high range as the impact at the instant of touchdown is buffered.

By applying these actuator characteristics to the legs in the flight state, mechanical passiveness can be imparted to the leg. Thus, the potential energy generated when the leg has been swung up during the walking movement can readily be used as the movement assisting energy during the next leg swingdown movement. This diminishes the energy consumption to decrease battery consumption for driving the robot body.

In each step of a movement operation on legs, the means for controlling the actuator characteristics switches between first actuator characteristics in which the actuator of each joint site is of a large value of the low range gain, a small quantity of the phase lead, and of a large value of the viscous resistance of the joint, and second actuator characteristics in which the low range gain is of a small value, the quantity of the phase lead is large, and the viscous resistance of the joint is of a small value.

The means for controlling the actuator characteristics sets, at a stage of commencing the walking movement, the characteristics of actuators for respective joint sites of the knee joint pitch axis, ankle roll and pitch axes, body trunk roll, pitch and yaw axes, hip joint roll and pitch axes and the neck pitch axis to a large value of the low range gain, a small quantity of phase lead in the high frequency range and to a large value of the viscous resistance of the joint, to enable high precision positioning control of these joint sites as well as to increase orientation stability. The means for controlling the actuator characteristics also sets the characteristics of actuators for respective joints of the shoulder pitch axis and the elbow pitch axis to a small value of the low range gain, a large quantity of the phase lead and to a small value of the viscous resistance of the joint, in order to impart mechanical passiveness and fast response characteristics.

The means for controlling the actuator characteristics sets, at a stage when the leg in a flight state is uplifted and the reactive force from the floor, received by the foot sole thereof, is equal to zero, for characteristics of actuators for the knee joint pitch axis, ankle roll axis and the ankle pitch axis of the leg in the flight state, a small value of the low range gain, a large quantity of the phase lead and a small value of the viscous resistance of the joint, such that mechanical passiveness and fast response characteristics may be imparted to followup control for high range as the impact at the instant of touchdown is buffered.

The means for controlling the actuator characteristics sets, at a stage when the walking movement of the leg in a flight state proceeds and the leg touches the floor, with the reactive force from the floor, received by the foot sole thereof, being approximately equal to that during the time when both legs are in the stance position, the characteristics of actuators for the knee joint pitch axis, ankle roll axis and the ankle pitch axis of the leg in the flight state to a large value of the low range gain, a small quantity of the phase lead in the high frequency range and to a large value of the viscous resistance of the joint, in order that high precision positioning control at the time the flight leg touches the tread becomes possible.

By applying these actuator characteristics to the shoulder as far as the leg in the flight state, mechanical passiveness can be imparted to the leg, and hence the potential energy produced when the leg has been swung up during the walking movement can readily be used at the next swingdown movement as the energy for assisting the movement. This diminishes the energy consumption to suppress the consumption of the battery used for driving the robot body.

By the control means for actuator characteristics controlling the setting of the actuator characteristics to "a large low-range gain", "a small quantity of the phase lead in the high frequency range" and to "a large viscous resistance of the joint", high precision positioning control becomes possible to increase the orientation stability. Thus, the characteristics of the actuators for driving the respective joints, in which emphasis is placed on the positioning accuracy, are preferably set, during each stage of the walking movement, to a large low-range gain, a small quantity of the phase lead and to a large viscous resistance of the joint.

By the control means for actuator characteristics setting the actuator characteristics to "a small low-range gain", "a large quantity of the phase lead" and to "a small viscous resistance of the joint", mechanical passiveness and fast response characteristics may be imparted and hence the followup control to a high frequency range may be made as the impact at the instant of touchdown is buffered. Thus, in each stage of the walking movement, the characteristics of the actuators for driving the respective joints, for which emphasis is placed on mechanical passiveness and fast response characteristics, are preferably set to the second actuator characteristics in which the low range gain is decreased, the quantity of phase lead is increased and in which the viscous resistance of the joint is decreased.

The robot body of the legged mobile robot is made up by a multi-link structure comprised of an interconnection of plural joint axes having substantially parallel degrees of joint freedom along the lengthwise direction. During the walking movement, the link state defined by the floor touch site of the multi-link structure and the floor surface is switched several times between the open link state and the closed link state. In each stage of the switching of the link states, the preferential characteristics of the actuators driving the respective joints are changed over between the positioning accuracy, mechanical passiveness and fast response characteristics. It is therefore sufficient to switch between the first and second actuator characteristics accordingly.

In a stage when both legs are in the stance position prior to going up or down the stairs, in the course of the operation of going up or down the stairs, the means for controlling the actuator characteristics sets the characteristics of the actuators of all of the joint sites to the first actuator characteristics in which the low range gain is of a large value, the quantity of the phase lead in the high frequency range is of a small value and the viscous resistance of the joint is of a large value.

In a stage when a first step is made for going up or down the stairs, in the course of the operation of going up or down the stairs, the means for controlling the actuator characteristics sets the characteristics of the actuators of the knee joint pitch axis and the ankle roll and pitch axes of the leg in the flight condition to the second actuator characteristics in which the low range gain is of a small value, the quantity of the phase lead is of a large value and the viscous resistance of the joint is of a small value.

In a stage when the leg of the first step has touched the tread face one step higher or lower, the means for controlling the actuator characteristics sets the characteristics of the actuators of all of the joint sites so that the low range gain is of a large value, the quantity of the phase lead in the high frequency range is of a small value and the viscous resistance of the joint is of a large value In a stage when the leg which touches the tread one step higher or lower becomes a leg in the stance state, and the leg which has so far been the leg in the stance position is uplifted, the means for controlling the actuator characteristics sets the characteristics of the actuators of the ankle roll axis and the ankle pitch axis of the leg in the flight condition so that the low range gain is of a small value, the quantity of the phase lead is of a large value and the viscous resistance of the joint is of a small value.

In the next stage when the leg touching a tread one step higher or lower becomes the leg in the stance position, and the second step, which was the leg in the stance position, is uplifted, the characteristics of the respective actuators of the ankle roll and pitch axes of the leg in the flight position are set to a small value of the low range gain, a large quantity of the phase lead and to a small value of the viscous resistance of the joint.

By the control means for controlling the actuator characteristics setting the actuator characteristics to a large value of the low range gain, a small quantity of the phase lead in the high frequency range and to a large value of the viscous resistance of the joint, high precision positioning control becomes possible, thereby increasing the orientation stability. It is therefore sufficient that, for each stage of the movement of going up and down the stairs, the characteristics of the actuators for driving the respective joints, for which emphasis is placed on positioning accuracy, are set to the first actuator characteristics in which the low range gain is of a large value, the quantity of the phase lead is of a small value and the viscous resistance of the joint is of a large value.

By the control means for controlling the actuator characteristics setting the actuator characteristics to a small low range gain, a large quantity of the phase lead and to a small value of the viscous resistance of the joint, mechanical passiveness and fast response characteristics may be imparted, so that follow-up control to a high frequency range may be performed as the impact on touchdown is buffered. Thus, in each stage of the movement of going up and down the stairs, the characteristics of the actuators for driving the respective joints, for which emphasis is placed on mechanical passiveness or fast response characteristics, may be set to the second actuator characteristics in which the low range gain is of a small value, the quantity of the phase lead is of a large value and the viscous resistance of the joint is of a small value.

The robot body of the legged mobile robot is formed by a multi-link structure comprised of plural joint axes, having substantially parallel degrees of freedom of the joints, and which are interconnected in the lengthwise direction. During the movement of going up and down the stairs, the link state which the touchdown site of the multi-link structure forms with the floor surface is switched between the open link state and the closed link state. Since the preferential characteristics for the actuators for driving the respective joints are switched in this manner between the positioning accuracy, mechanical passiveness and fast response characteristics, in each stage of switching of the link states, it is sufficient to switch between the first and second actuator characteristics accordingly.

In the stage of commencing the turning movement of the robot body, the control means for controlling the actuator characteristics sets the actuators of all of the joint sites, making up the robot body, to a large value of the low range gain, a small quantity of the phase lead in the high frequency range and to a large value of the viscous resistance of the joint, in order to enable high precision positioning of the respective joint sites to increase the orientation stability.

In a stage when the leg in the flight state is uplifted and the reactive force from the floor received by the foot sole thereof is zero, said means for controlling the actuator characteristics sets the characteristics of the actuators of the knee joint pitch axis and the ankle roll and pitch axes of the leg in the flight state to a small value of the low range gain, a large quantity of phase lead and to a small value of the viscous resistance of the joint such that mechanical passiveness and fast response characteristics may be imparted, and followup control to a high range may be performed as the impact at the instant of touchdown is buffered.

In a stage when the turning movement of the robot body progresses such that the leg in the flight state touches the floor and the reactive force from the floor received by the foot sole thereof is approximately equal to the reactive force during the time when both legs are in the stance state, the means for controlling the actuator characteristics sets the characteristics of the actuators of the knee joint pitch axis and the ankle roll and pitch axes of the leg in the flight state to a large low range gain, a small quantity of phase lead in the high frequency range and to a large viscous resistance of the joint, so that high precision positioning control may become possible.

By applying these actuator characteristics to the leg in the flight state, mechanical passiveness can be imparted to the leg, so that the potential energy generated when the leg is swung up during the turning movement may readily be used as movement assisting energy during the next swing-down operation. This reduces the energy consumption to suppress consumption of the battery power used for driving the robot body.

By the control means for the actuator characteristics setting the actuator characteristics to a large value of the low range gain, a small quantity of phase lead in the high frequency range and to a large value of the viscous resistance of the joint, positioning control to high accuracy becomes possible to increase the orientation stability. Thus, during each stage of the turning operation, the characteristics of the actuators, driving the respective joints, for which emphasis is placed on the positioning accuracy, may preferably be set to first actuator characteristics in which the low range gain is of a large value, the quantity of the phase lead is small and the viscous resistance of the joint is of a large value.

Moreover, by the control means for controlling the actuator characteristics setting the actuator characteristics to a small low-range gain, a large quantity of phase lead and to a small viscous resistance of the joint, mechanical passiveness and fast response characteristics may be imparted, so that followup control to a high frequency range may be performed as the impact at the instant of touchdown is buffered. Thus, in each stage of the turning movement, the characteristics of the actuators driving the respective joints, for which emphasis is placed on mechanical passiveness or fast response characteristics, are preferably set to second actuator characteristics in which the low-range gain is of a small value, the quantity of the phase lead is large and the viscous resistance of the joint is of a small value.

The robot body of the legged mobile robot is formed by a multi-link structure comprised of plural joint axes, having substantially parallel degrees of freedom of the joints, and which are interconnected in the lengthwise direction. During the turning movement, the link state which the touchdown site of the multi-link structure forms with the floor surface is switched several times between the open link state and the closed link state. In each stage of switching of the link states, the preferential characteristics of the actuators for driving the joints are switched between the positioning accuracy, mechanical passiveness and the fast response characteristics. It is therefore sufficient to switch correspondingly between the first and second characteristics.

Thus, it is possible with the present invention to provide a legged mobile robot in which stable and highly efficient movements may be realized by dynamically or statically controlling the characteristics of the actuators themselves or the controllers of the actuators in carrying out a variety of operations, including, first of all, the walking of the robots.

According to the present invention, the characteristics of the actuators of the respective joint sites are dynamically switched, in each stage of the robot's walking movement, between the first actuator characteristics in which the low range gain is of a large value, the quantity of the phase lead is small and the viscous resistance of the joints is large and second actuator characteristics in which the low range gain is of a small value, the quantity of the phase lead is large and the viscous resistance of the joints is small, such that the potential energy developed when the leg is swung up during walking may readily be used as the movement assisting energy during the next swing-down movement. As a result, the energy consumption is diminished to decrease the consumption of the battery as a power supply for driving the robot body.

Moreover, according to the present invention, the characteristics of the actuators of the respective joint sites are dynamically switched, in each stage of the robot's going up or down the stairs, between the first actuator characteristics in which the low range gain is of a large value, the quantity of the phase lead is small and the viscous resistance of the joints is large and second actuator characteristics in which the low range gain is of a small value, the quantity of the phase lead is large and the viscous resistance of the joints is small, such that the potential energy developed when the leg is swung up during the robot's going up or down the stairs, may readily be used as the movement assisting energy during the next swing-down movement. As a result, the energy consumption is diminished to decrease the consumption of the battery as a power supply for driving the robot body.

Furthermore, according to the present invention, the characteristics of the actuators of the respective joint sites are dynamically switched, in each stage of the robot's turning movement, between the first actuator characteristics in which the low range gain is of a large value, the quantity of the phase lead is small and the viscous resistance of the joints is large and second actuator characteristics in which the low range gain is of a small value, the quantity of the phase lead is large and the viscous resistance of the joints is small, such that the potential energy developed when the leg is swung up during the robot's turning movement may readily be used as the movement assisting energy during the next swing-down movement. As a result, the energy consumption is diminished to decrease the consumption of the battery as a power supply for driving the robot body.

Other objects, features and advantages of the present invention will become apparent from the embodiments of the present invention as now explained and from the drawings.

BRIEF DESCRIPTION OF THE DRAWINGS

FIG. 16 shows output characteristics of each transistor controlling signal of the additional logic circuit, when a high-level BRAKE_PWM control signal has been supplied, along with coil current waveform characteristics and torque output characteristics.

FIG. 17 shows output characteristics of each transistor controlling signal of the additional logic circuit, when a BRAKE_PWM control signal having a predetermined duty ratio has been supplied, under PWM control, along with coil current waveform characteristics and torque output characteristics.

FIGS. 23 to 28 show the process of the robot performing the walking movement.

FIGS. 29 to 34 show the process of the robot performing the movement of going up the stairs.

FIGS. 36 to 41 show the process of the robot performing the movement of going down the stairs.

FIGS. 44 to 51 show the process of the robot performing the turning movement.

DESCRIPTION OF THE PREFERRED EMBODIMENTS

Figure 1:
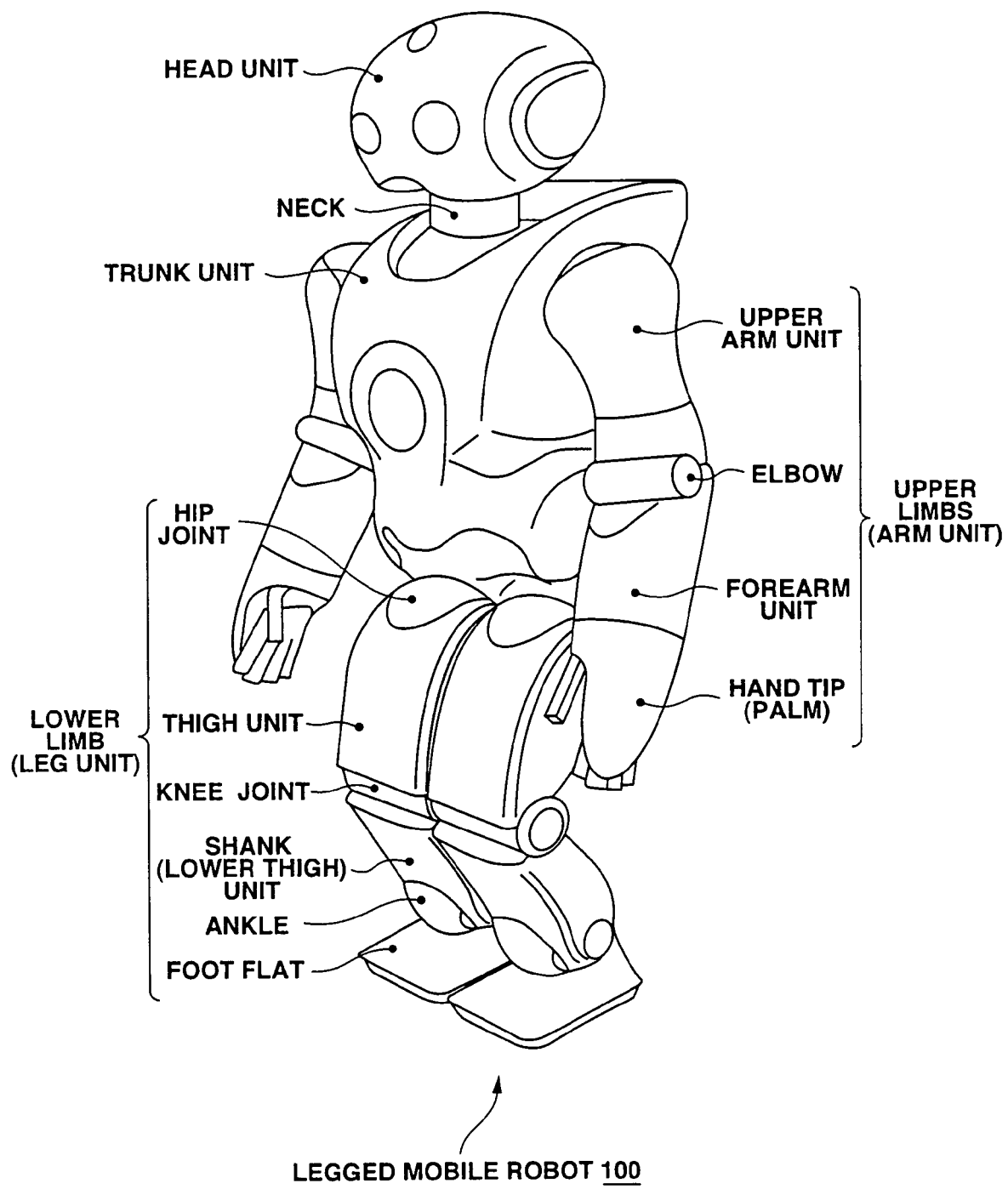
FIG. 1 shows a legged mobile robot, embodying the present invention, in the erected state, as the robot is viewed from the front side.

Referring to the drawings, certain preferred embodiments of the present invention will be explained in detail.

A. Mechanical Structure of Legged Mobile Robot

Figure 2:
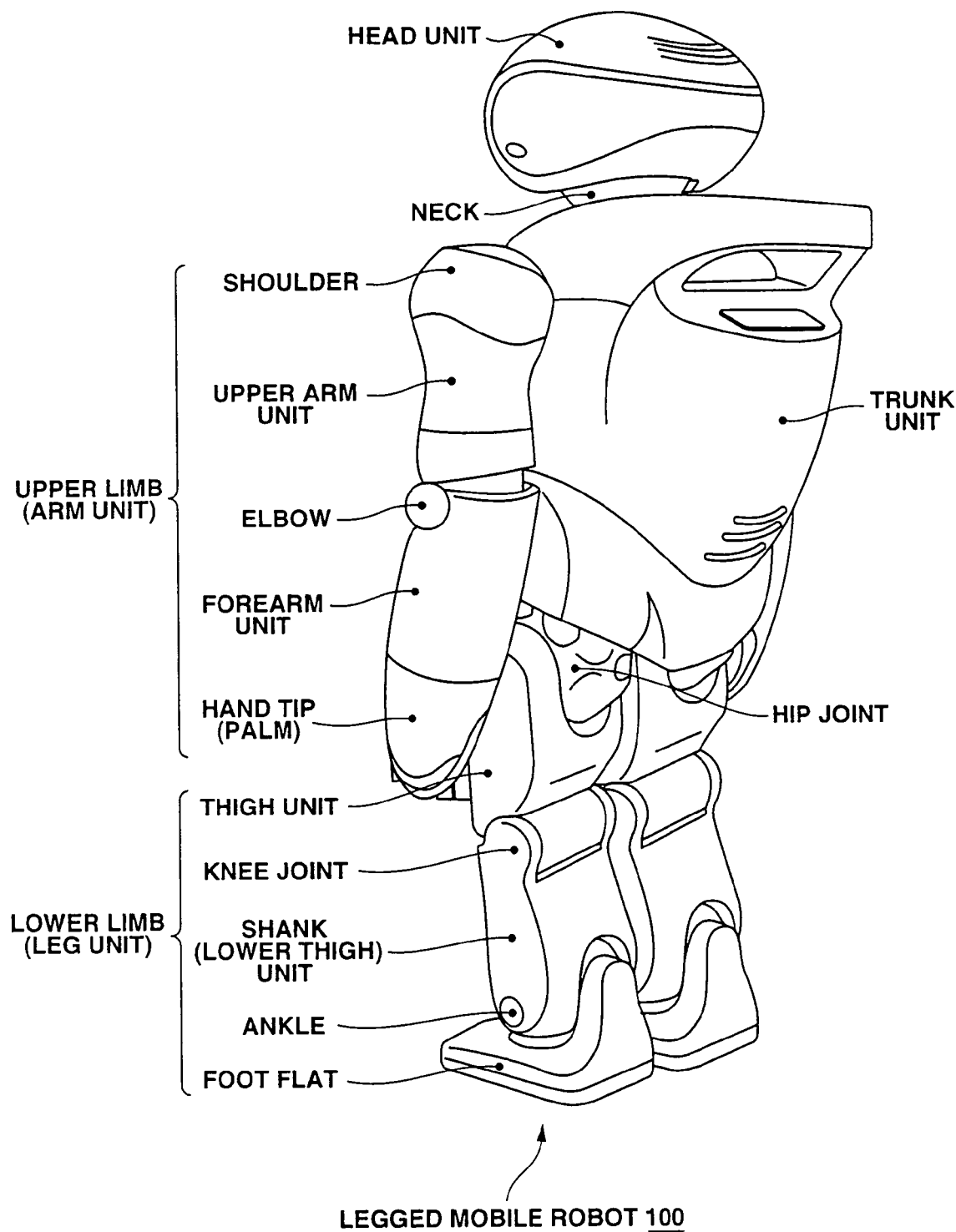
FIG. 2 shows the legged mobile robot, embodying the present invention, in the erected state, as the robot is viewed from the back side.

FIGS. 1 and 2 show the erected state of a "humanoid" robot, according to the present invention, as the robot is viewed from the front side and from the back side, respectively. As shown, the legged mobile robot is composed of a body trunk unit, a head unit, left and right upper limbs and left and right lower limbs, responsible for performing the legged movement, and has the movements comprehensively controlled by a controller enclosed e.g. in the body trunk unit, although such controller is not shown.

Each of the left and right lower limbs is made up by a thigh unit, a knee joint, a shank unit, an ankle unit and a foot flat, and is connected to approximately the lowermost end of the body trunk unit by the hip joint. Each of the left and right upper limbs is made up by an upper arm unit, an elbow joint and a forearm unit, and is connected to upper left and right side edges of the body trunk unit by the shoulder joint. The head unit is connected by the neck joint to approximately the uppermost mid point of the body trunk unit.

The controller is a casing carrying a driving controller for respective joint actuators making up the legged mobile robot, a control unit (main control unit) for processing external inputs from respective sensors, as later explained, and a power supply circuit or the other peripheral devices. The controller may also include a communication interface or a communication device for remote control. It is noted that the driving controller herein means a controller for controlling the actuator servo gain or viscosity in addition to controlling the angular positions or angular accelerations of the joint angles.

The legged mobile robot, constructed as described above, is able to walk on both feet by concerted motion control for the whole body by a controller. Such walking on both feet may be achieved in general by repetition of a walking period divided into the following operating time intervals:
(1) the time interval when the robot is supported on its left foot, with its right foot being in a flight state;
(2) the time interval when the robot is supported on its both feet, with the right foot touching the floor;
(3) the time interval when the robot is supported on its right foot, with its left foot being in a flight state; and
(4) the time interval when the robot is supported on its both feet, with the left foot then touching the floor.

The walking control in the legged mobile robot is realized by scheduling a target trajectory for the lower limbs at the outset and by correcting the scheduled trajectory during the aforementioned respective operating time intervals. That is, during the time interval when the robot is supported on its both legs, the correction of the trajectory for the lower limbs is halted to correct the height of the waist part to a predetermined value with use of a total correction quantity for the scheduled trajectory. On the other hand, during the time interval when the robot is supported on its sole foot, a correction trajectory is generated for restoring the position relationships of the ankle unit of the leg being corrected and the waist part to the scheduled trajectory.

For stabilized adaptive control of the robot body, including, first of all, the correction of the trajectory of the walking movement, a ZMP (zero moment point) is used in general as criteria for verifying the walking stability. To this end, interpolation calculations, employing a five-degree polynominal, are carried out for assuring the continuity in the positions, velocities and accelerations for reducing the offset with respect to the ZMP. The criteria for verifying the stability by ZMP are based on the "d'Alembert's principle" which states that the gravitational force and the inertial force operating from a walking system to a floor surface are counterbalanced by the force of reaction from the floor surface to the walking system and the moment thereof. As a conclusion of the mechanical deduction, there exists a point for which the pitch axis moment and the roll axis moment become zero, that is, the zero moment point (ZMP), in an inner side of a supporting triangle defined by the floor touchdown points of the foot soles and the floor surface.

Figure 3:
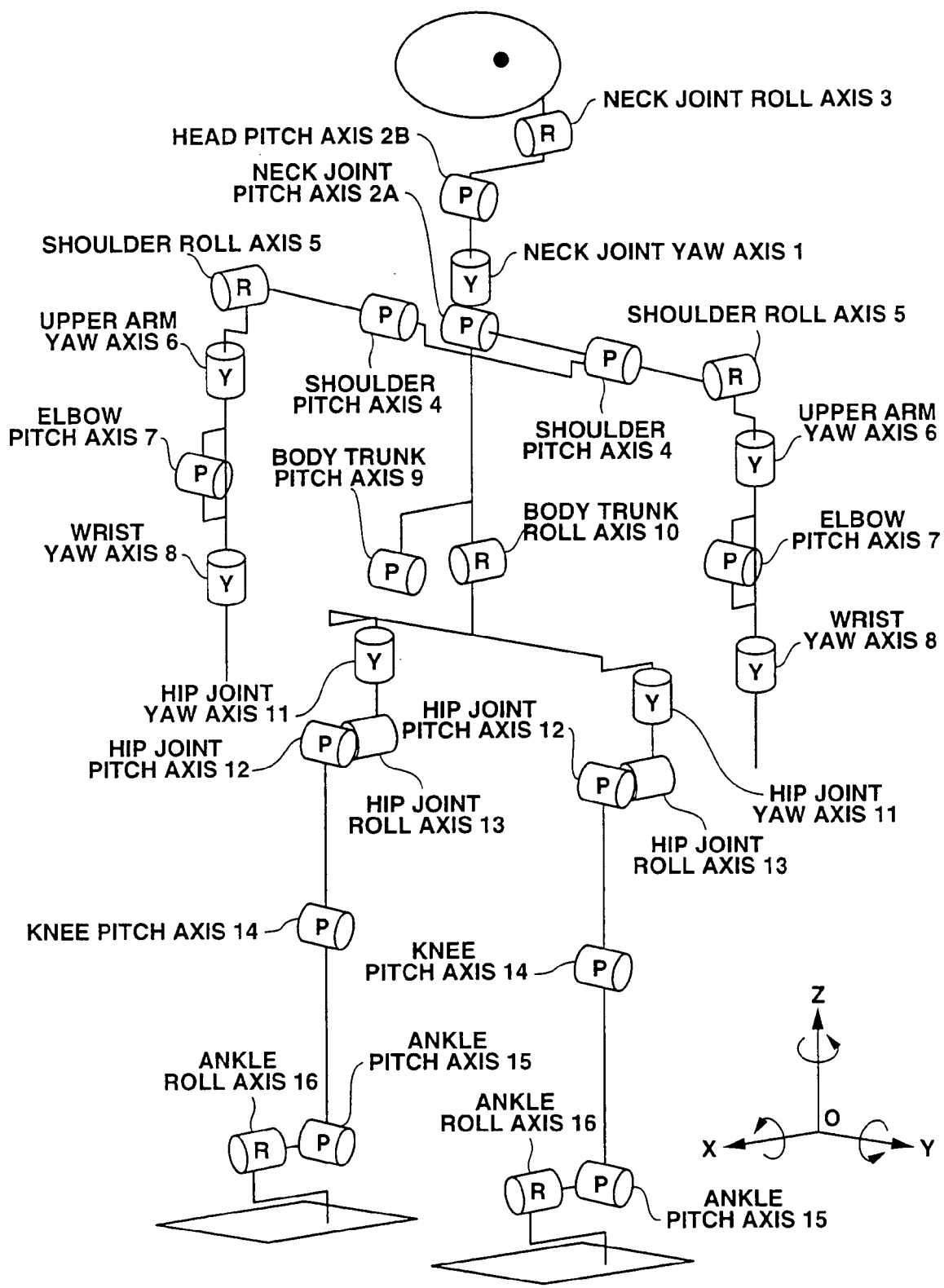
FIG. 3 schematically shows the degree of freedom structure provided to the legged mobile robot.

FIG. 3 schematically shows an illustrative structure of the degrees of the joint freedom owned by this legged mobile robot. As shown in this figure, the legged mobile robot 100 is a structural unit including plural limbs, more specifically, a structural unit made up by upper limbs, inclusive of two arm units and a head unit, lower limbs, made up by two legs, responsible for movement operations, and a body trunk unit interconnecting the upper and lower limbs.

The neck joint, carrying the head unit, has four degrees of freedom, namely a neck joint yaw axis 1, first and second neck joint pitch axes 2A and 2B and a neck joint roll axis 3.

Each arm unit has, as its degrees of freedom, a shoulder joint pitch axis 4 in a shoulder, a shoulder joint roll axis 5, an upper arm yaw axis 6, an elbow joint pitch axis 7 in an elbow, a wrist joint yaw axis 8 in a wrist, and a hand unit.

In actuality, the hand unit is a multi-joint multi-degree-of-freedom structure, including plural fingers.

The body trunk unit 2 has two degrees of freedom, namely a body trunk pitch axis 9 and a body trunk roll axis 10.

The respective legs, making up the lower limbs, are made up by a hip joint yaw axis 11 in a hip, a hip joint pitch axis 12, a hip joint roll axis 13, a knee joint pitch axis 14 in a knee, an ankle joint pitch axis 15 in an ankle, an ankle joint roll axis 16 in the ankle, and a foot unit.

The site in the vicinity of the waist part, corresponding to the pelvis, interconnecting the left and right hip joints, is termed a "basic body portion". The basic body portion has a large weight mass to act upon and consequently is a crucial control target point in controlling the orientation stability in the legged mobile robot.

B. Control System Configuration of the Legged Mobile Robot

Figure 4:
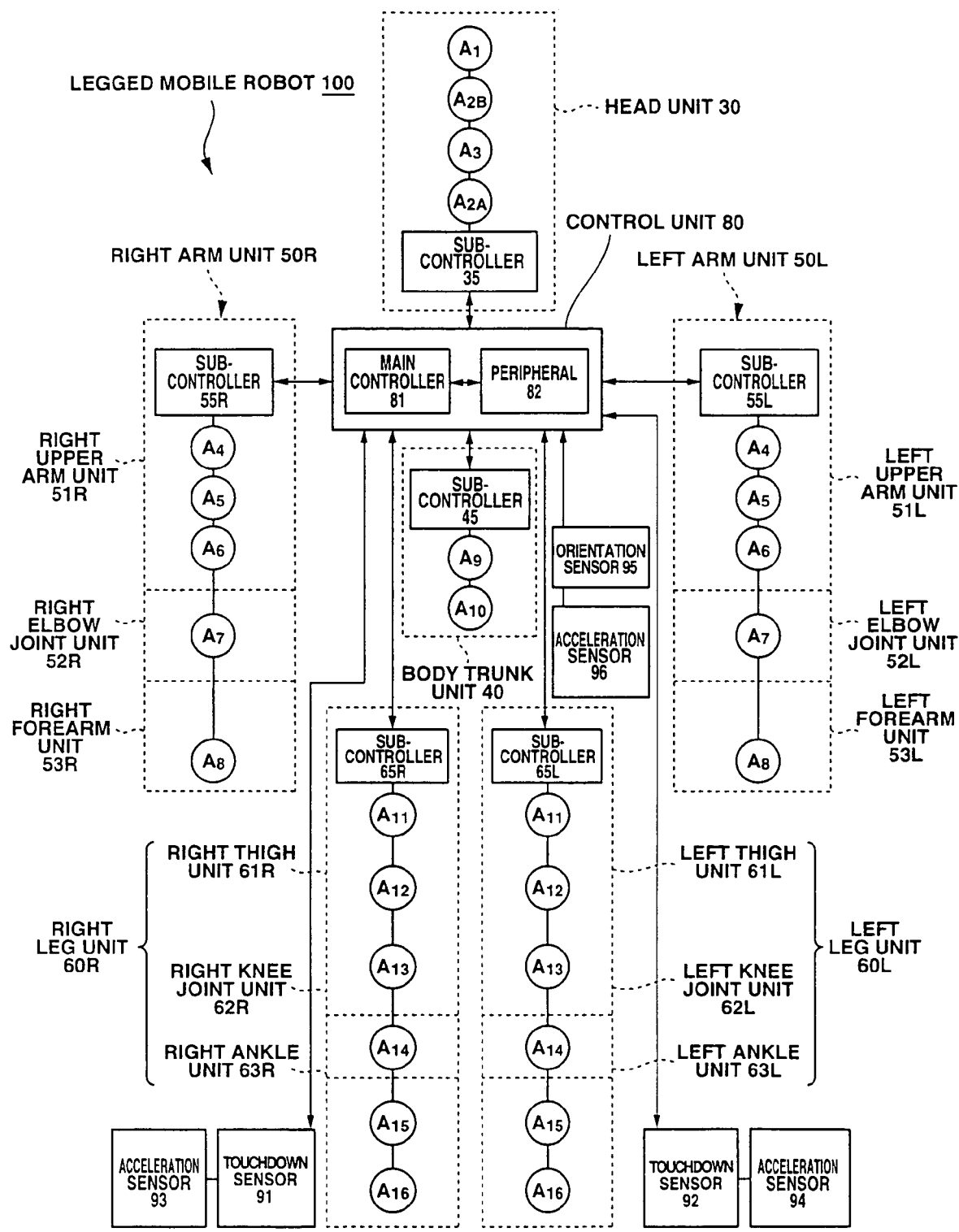
FIG. 4 schematically shows the control system configuration of the legged mobile robot 100.

FIG. 4 schematically shows a control system configuration of the legged mobile robot 100. As shown in this figure, the legged mobile robot 100 is made up by mechanical units 30, 40, 50R/L and 60R/L, representing the four limbs of the human being, and a control unit 80, performing adaptive control for realizing concerted movements among the respective mechanical units of the robot. It is noted that R and L denote suffixes indicating right and left, respectively.

The overall movements of the legged mobile robot 100 are comprehensively controlled by the control unit 80. The control unit 80 is made up by a main controller 81, formed by main circuit components, not shown, such as a central processing unit (CPU) or a memory, and a peripheral circuit 82, including a power supply unit, not shown, and an interface, also not shown, for exchanging data or commands with the respective component elements of the robot 100.

In working out the present invention, there is no particular limitation to mounting sites for the control unit 80. Although the control unit is mounted in the body trunk unit 40 in the embodiment shown in FIG. 4, the control unit may also be mounted to the head unit 30. Or, the control unit 80 may be mounted outside the legged mobile robot 100 for wired or wireless communication with the body member of the legged mobile robot 100.

The degrees of freedom of the respective joints of the legged mobile robot 100, shown in FIG. 3, are implemented by relevant electrical motors or other types of the actuators. That is, the head unit 30 is provided with a neck joint yaw axis actuator $A_1$, first and second neck joint pitch axis actuators $A_{2A}$, $A_{2B}$ and a neck joint roll axis actuator $A_3$, representing the neck joint yaw axis 1, first and second neck joint pitch axes 2A, 2B and a neck joint roll axis 3, respectively.

The body trunk unit 40 is provided with a body trunk pitch axis actuator $A_9$ and a body trunk roll axis actuator $A_{10}$ representing a body trunk pitch axis 9 and a body trunk roll axis 10, respectively.

The arm units 50R/L, subdivided into upper arm units 51R/L, elbow joint units 52R/L and forearm units 53R/L, are provided with shoulder joint pitch axis actuators $A_4$, shoulder joint roll axis actuators $A_5$, upper arm yaw axis actuators $A_6$, elbow joint pitch axis actuators $A_7$, and wrist joint yaw axis actuators $A_8$, representing the degrees of freedom of the shoulder joint pitch axis 4, shoulder joint roll axis 5, upper arm yaw axis 6, elbow joint pitch axes 7 and the wrist joint yaw axis 8, respectively.

The leg units 60R/L, subdivided into thigh units 61R/L, knee units 62R/L and shank units 63R/L, are provided with a hip joint yaw axis actuator $A_{11}$, a hip joint pitch axis actuator $A_{12}$, a hip joint roll axis actuator $A_{13}$, a knee joint pitch axis actuator $A_{14}$, an ankle joint pitch axis actuator $A_{15}$ and an ankle joint roll axis actuator $A_{16}$, representing the degrees of freedom of a hip joint yaw axis 11, a hip joint pitch axis 12, a hip joint roll axis 13, a knee joint pitch axis 14, an ankle joint pitch axis 15 and an ankle joint roll axis 16, respectively.

The actuators $A_1$, $A_2$, $A_3$, . . . , used for the respective joints, may preferably be each constructed by a small-sized AC servo actuator of the type in which the actuator is directly coupled by a gearing and including a servo control system arranged as a one-chip device and loaded in this form in the motor unit. This sort of the AC servo actuator is disclosed for example in the Japanese Patent Application Laid-Open Publication No. 2000-299970 (Japanese Patent Application No. H11-33386) already assigned to the present Assignee.

For respective structural units, such as head unit 30, body trunk unit 40, leg unit 50 and leg unit 60, sub-controllers 35, 45, 55 and 65 are provided for driving controlling the respective actuators.

Within the body trunk unit 40 of the robot body, there are provided an acceleration sensor 95 and an orientation sensor 96. The acceleration sensor 95 is arranged in each of the X-axis, Y-axis and Z-axis directions. By providing the acceleration sensor 95 to the waist part of the robot body, it is possible to set the waist part, having a large weight mass to act on, that is a basic body portion, as a control target point, in order to directly measure the orientation or acceleration on the site, so as to perform orientation stabilizing control on the basis of the ZMP.

The respective legs 60R, 60L are provided with floor touchdown check sensors 91, 92 and acceleration sensors 93, 94, respectively. The floor touchdown check sensors 91, 92 are formed by mounting a pressure sensor on each foot sole, such that, by the presence or absence of the force of reaction from the floor, it can be detected whether or not the foot sole has touched the floor. The acceleration sensors 93, 94 are mounted at least in the directions along the X and Y axes, respectively. By mounting the acceleration sensors 93, 94 at the left and right feet, the ZMP equation can be directly set at the feet closest to the ZMP position.

If the acceleration sensor is provided only at the waist part having a large weight mass to act on, the waist part, that is, the basic body portion, becomes a direct control target point. The state of the feet then needs to be relatively determined on the basis of the results of calculations of this control target point, such that the following conditions between the foot parts and the floor surface:

(1) that the floor surface is not moved under any load or torque applied; and
(2) that the frictional coefficient against translational movement on the floor surface is sufficiently large such that slip is not likely to be produced; need to be satisfied as a premise.

Conversely, with the present embodiment, a reaction force sensor system, such as a floor reaction force sensor, for directly measuring the ZMP and the force, a local coordinate used for control and an acceleration sensor for directly measuring the coordinate, are arranged in the foot unit, which is the site of contact with the floor surface. As a consequence, the ZMP equilibrium equation can be directly set at the foot unit closest to the ZMP position, and hence more strict stable adaptive control, independent of the aforementioned premises, may be achieved at a higher speed. The result is that stable walking (movements) of the robot body may be assured even on a gravel or on a thick carpet, where the floor surface tends to be moved under application of a force or torque, or on a tile of a residence where the frictional coefficient of translational movement cannot be sufficiently procured such that slip is likely to be produced.

The main controller 80 is able to respond to the outputs of the sensors 91 to 96 so as to dynamically correct the control target. More specifically, each of the sub-controllers 35, 45, 55 and 65 can be adaptively controlled to realize a general body movement in which the upper limbs, body trunk unit and the lower limbs of the legged mobile robot 100 are actuated in concert.

For achieving the general body movements of the robot body of the robot 100, the movement of the foot units, ZMP trajectory, movement of the body trunk unit, movement of the upper limbs and the height of the waist part, are set, and a command for instructing the movements conforming to the setting contents is transmitted to each of the sub-controllers 35, 45, 55 and 65. These sub-controllers 35, 45, . . . construe the commands received from the main controller 81 to output a driving control signal to each of the actuator $A_1, A_2, A_3, \ldots$ . It should be noted that ZMP is the point on the floor surface where the moment due to the force of reaction from the floor during the walking becomes zero, and that the "ZMP trajectory" herein means a trajectory along which the ZMP moves during the walking period of the robot 100.

C. Control of Actuator Characteristics

C-1. Operating Speed and Mechanical Passiveness of Actuator

The robot body of the legged mobile robot 100 may be grasped as a structure in which plural joint axes having substantially parallel degrees of the joint freedom are interconnected along the lengthwise direction. During the legged movements, such as walking, falldown, or the stand-up movement from the falldown posture, the linking state which the floor-touchdown site of the multi-link structure makes with the floor surface is changed over several times from the open-link state to the closed-link state and vice versa.

In the specification of the Japanese Patent Application No. 2001-233691, already transferred to the present Assignee, there is disclosed a legged mobile robot which performs high-speed switching operations from the open-link state to the closed-link state and vice versa against the external field and a subject of action. Specifically, in a robot having limbs constituted by one or more rotational joints, each of which may be provided with two or more degrees of freedom, each leg of the robot is provided with a minimum number of degrees of passive freedom, such as backlash of a speed reducing unit, necessary for removing dynamic closure errors. Moreover, the range of possible movements of each leg is supervised appropriately. Even in case the actuator driving the joints is not provided with means for acquiring the torque information, the high-speed switching operation from the open-link state to the closed-link state and vice versa may be realized in stability. This high-speed switching operations from the open-link state to the closed-link state and vice versa is realized in a robot walking on two legs by mounting a geared motor on a site with a small backlash in the vicinity of the reference coordinate for the waist part and by mounting a geared motor with a large backlash on a site close to the hand or foot tip to achieve optimum characteristics, thereby optimizing the robot design.

As a second method for optimizing the robot against switching of the link state during the operating period, the open loop gain of a position servo compensator in each joint axis actuator is optionally adjusted to control the amount of offset of position errors. That is, in case the quantity of the backlash is uniform, the servo offset due to a large or small value of the servo gain, presumed to correspond to the quantity of the backlash, is controlled to achieve the degree of passive freedom for removing the dynamic closure error.

In the present embodiment, the latter method for optimizing the robot is further expanded such that not only the proportional gain of a servo controller but also the phase compensation element is adjusted on each site of the joint.

Figure 5:
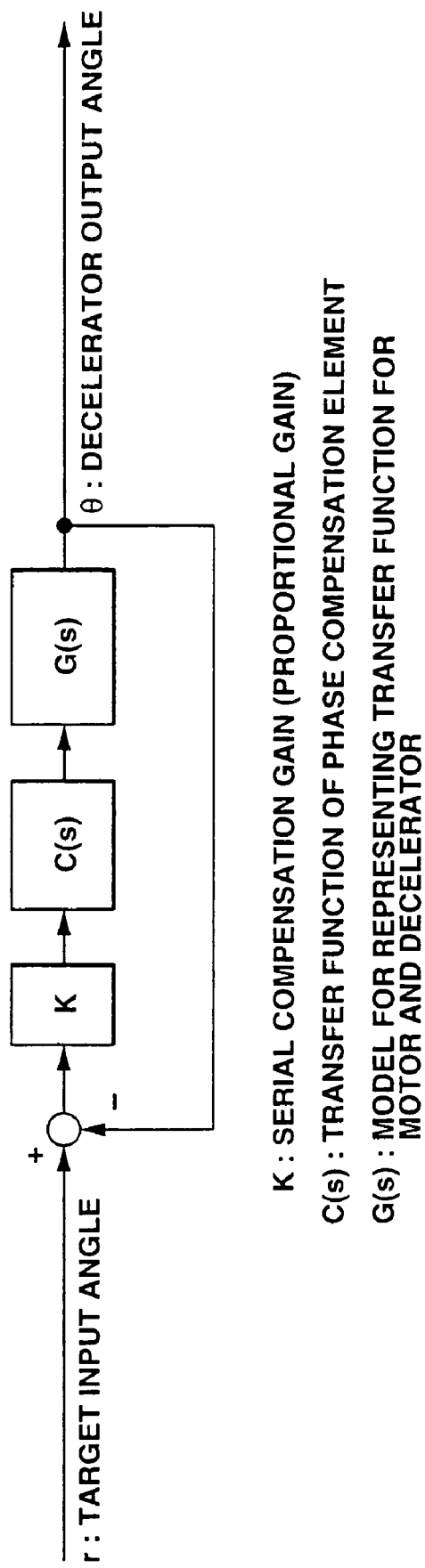
FIG. 5 shows the configuration of a servo controller of an actuator.
Figure 6:
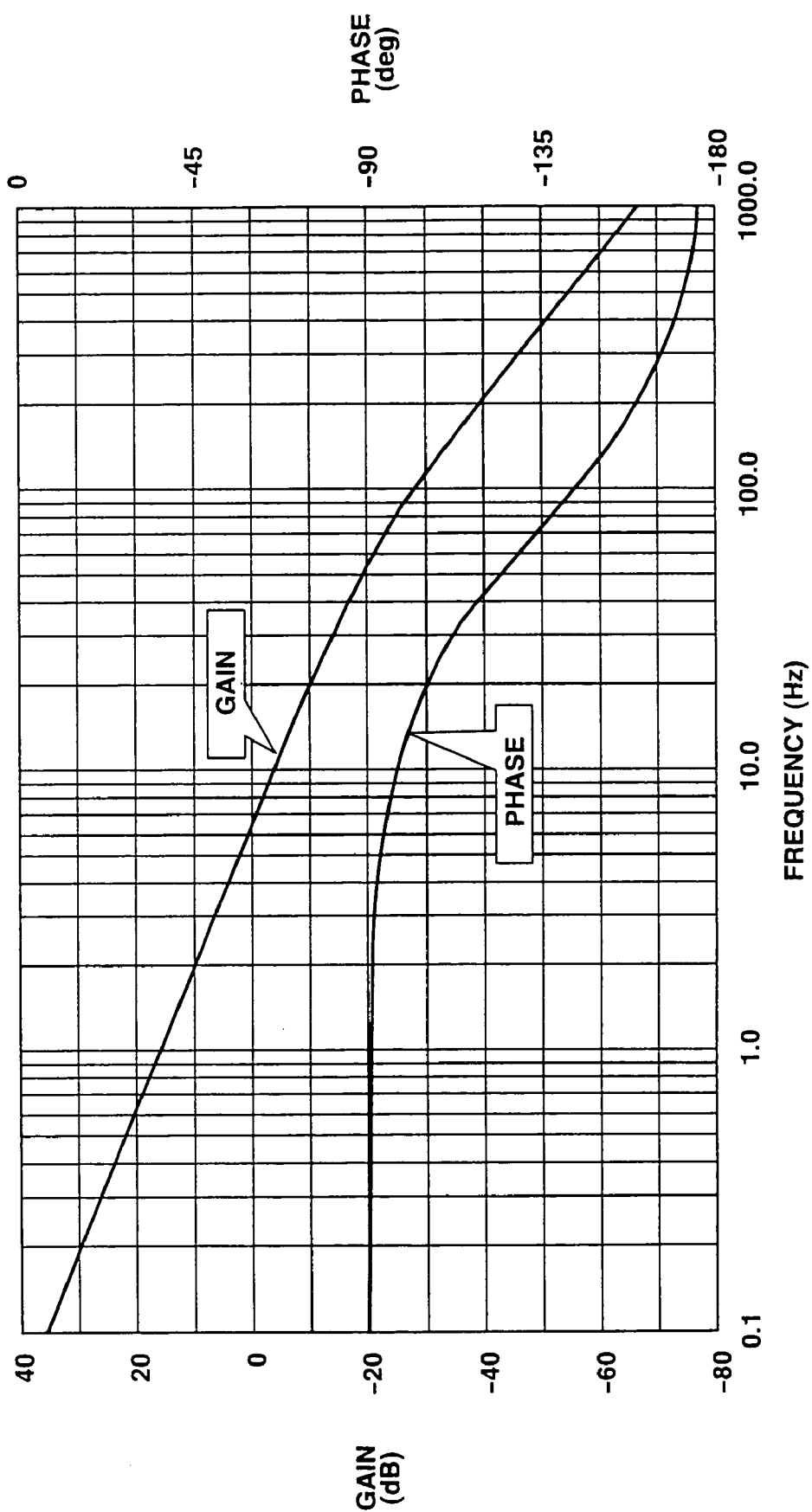
FIG. 6 shows the frequency response of the gain and the phase of a transfer function representing model of a motor and a speed reducing unit shown in FIG. 5.

FIG. 5 shows the structure of the servo controller of an actuator. As shown in this figure, the servo controller has two control elements, namely a proportional gain K of serial compensation and a phase compensation element C(s), such that not only the proportional gain but also the phase compensation element is adjusted on each joint site. FIG. 6 shows the frequency response of the gain and the phase of a model, expressed by a transfer function, as to a motor and a speed reducing unit shown in FIG. 5.

The phase compensation element is expressed by the following equation 1:

[Equation 1]

$$C(s) = \frac{\sum_{i=0}^{m} b_i \cdot s^i}{\sum_{i=0}^{n} a_i \cdot s^i} \quad (1)$$

where n and m are optional natural numbers, $a_i$ and $b_i$ are optional real numbers, which are equivalent to the feedback gain in case these numbers express status variables, and s is a Laplace operator.

The model G(s) of the motor and the speed reducing unit, expressed as a transfer function, may be expressed by the following equation 2:

[Equation 2]

$$G(s) = \frac{K}{Js^2 + Ds} \quad (2)$$

where K is a motor gain, J is an inertial moment of a motor and D is a viscous resistance coefficient of the motor.

First, an in the stance in which, in a servo controller shown in FIG. 5, a band of phase compensation type control is optionally selected as a designing example of the phase compensation type control, is explained with reference to FIG. 7. It is noted that the quantity of phase compensation is constant and the frequency range is selected to an optional value. In this figure, (1) C(s)-1: The gain amplification of approximately +5.6 dB and a phase lead of approximately +18 degrees are afforded in a band of 1.0 to 100 Hz;

(2) C(s)-2: The gain amplification of approximately +5.6 dB and a phase lead of approximately +18 degrees are afforded in a band of 0.1 to 10 Hz; and (3) C(s)-3: The gain amplification of approximately +5.6 dB and a phase lead of approximately +18 degrees are afforded in a band of 10 to 1 kHz.

Thus, by optional selecting the frequency range for applying phase compensation, the frequency response of the actuator may be set arbitrarily, and hence the frequency response of the joint axes of the robot, constituted by such actuator, may be dynamically adjusted in dependence upon the orientation or the operational aspects of the robot body.

Figure 7:
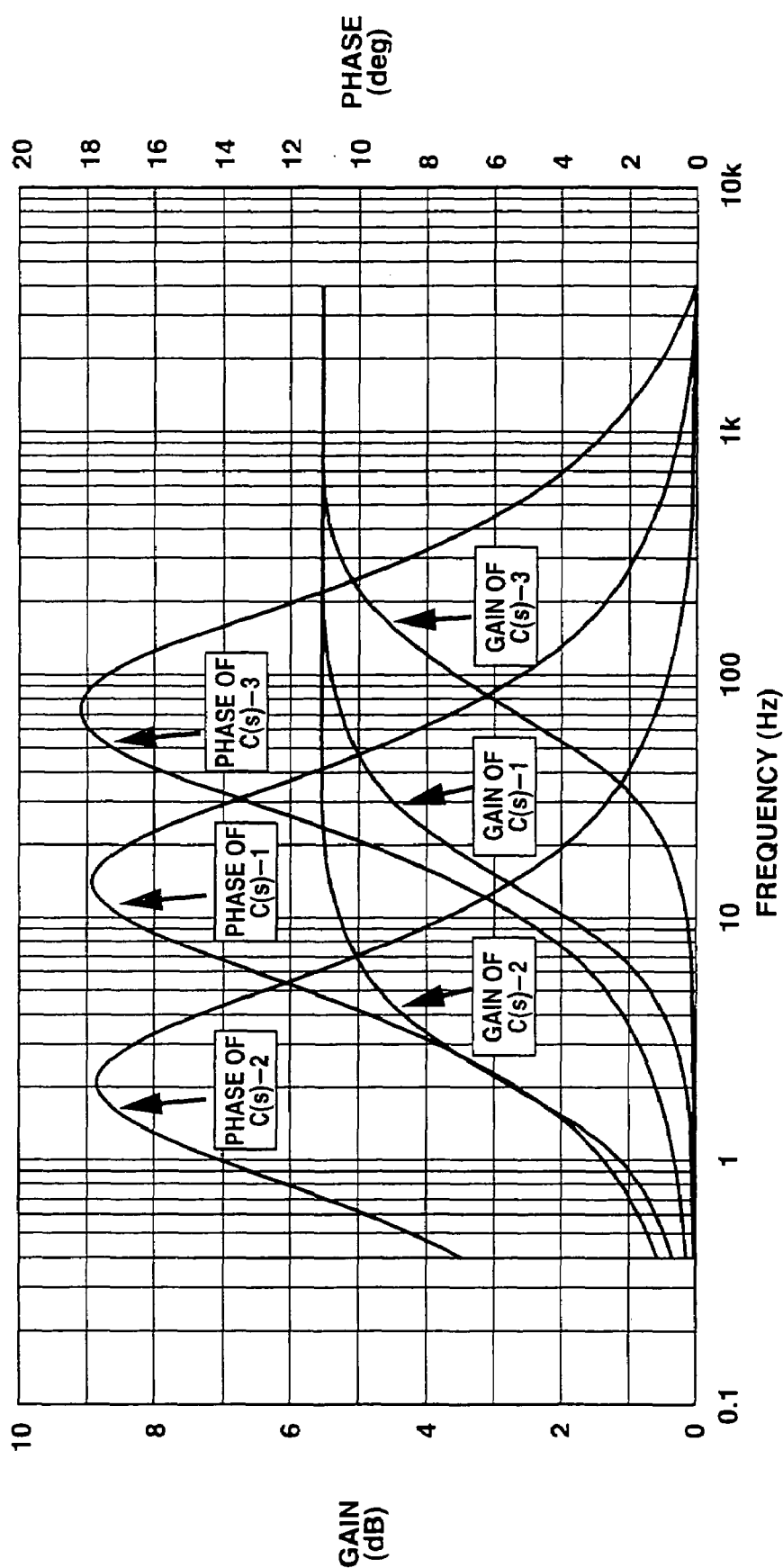
FIG. 7 illustrates an example of optionally selecting a phase compensation band as a designing example of the phase compensation control in the servo controller shown in FIG. 5.

Meanwhile, although an example of phase lead compensation is shown in the example shown in FIG. 7, any optional phase lag may be set in an optional frequency range in the case of phase lag compensation.

Figure 8:
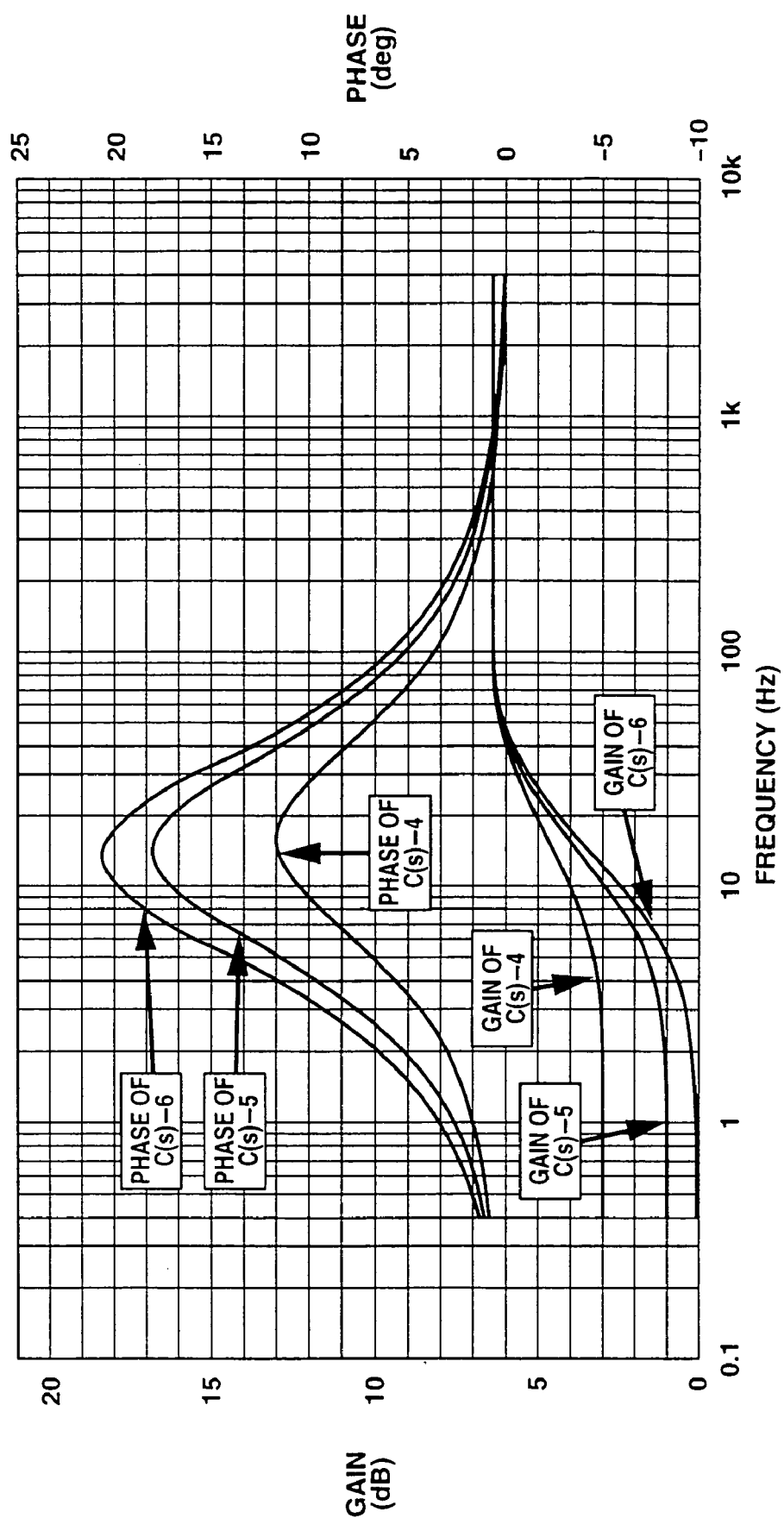
FIG. 8 illustrates an example of optionally selecting the quantity of phase compensation as a designing example of the phase compensation control in the servo controller shown in FIG. 5.

Referring to FIG. 8, an example in the case of optionally selecting the quantity of phase compensation (that is, optionally selecting the quantity of phase compensation for a constant frequency range) to be applied in the servo controller shown in FIG. 5, as a designing example of the phase compensation type control, is explained. In FIG. 8, (4) C(s)-4: The gain amplification of approximately +3.5 dB and a phase lead of approximately +12 degrees are afforded in a band of 4.0 to 70 Hz;

(5) C(s)-5: The gain amplification of approximately +5.6 dB and a phase lead of approximately +18 degrees are afforded in a band of 2.0 to 70 Hz; and (6) C(s)-6: The gain amplification of approximately +6.5 dB and a phase lead of approximately +21 degrees are afforded in a band of 1.0 to 70 Hz.

Thus, the frequency response of the actuator can be optionally set by optionally selecting the quantity of phase compensation. Consequently, with the joint axes of a robot, made up by these actuators, the frequency response can be adjusted dynamically responsive to the orientation or the operational aspects of the robot body.

Although the embodiment shown in FIG. 8 is concerned with the in the case of phase lead compensation, it is similarly possible, in the case of the phase delay compensation, to set any optional quantity of phase lag for any optional frequency range.

Figure 9:
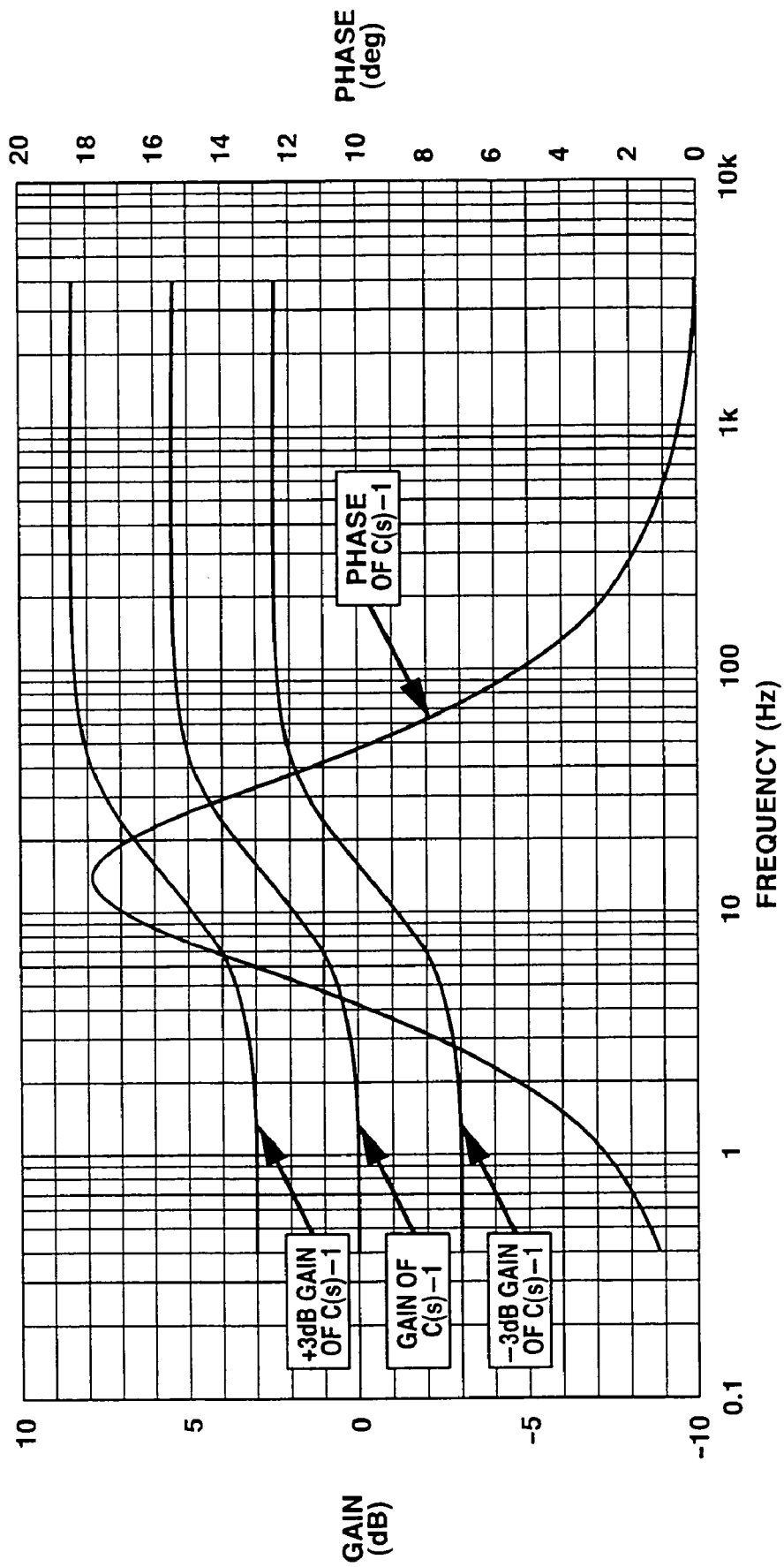
FIG. 9 illustrates a designing example of a controller for changing the magnitude of the serial compensation gain K in the servo controller shown in FIG. 5.

Referring to FIG. 9, a designing example of a controller for changing the magnitude of the serial compensation gain, indicated by K, in a servo controller shown in FIG. 5, is explained. FIG. 5 is equivalent to FIG. 9 except changing K by ±3 dB. As shown, the magnitude of the serial compensation gain can also be set optionally.

When desired to apply the contents shown in FIGS. 7 to 9 to the actuators for driving the joint axes of the robot, a communication protocol for dynamically or statically changing the parameters making up this type of the controller is mounted, whereby various characteristics may be imparted to the respective joint axes of the robot.

The characteristics of the actuators, in case of mounting the servo controller for the actuator, having these characteristics, are now explained.

Figure 10:
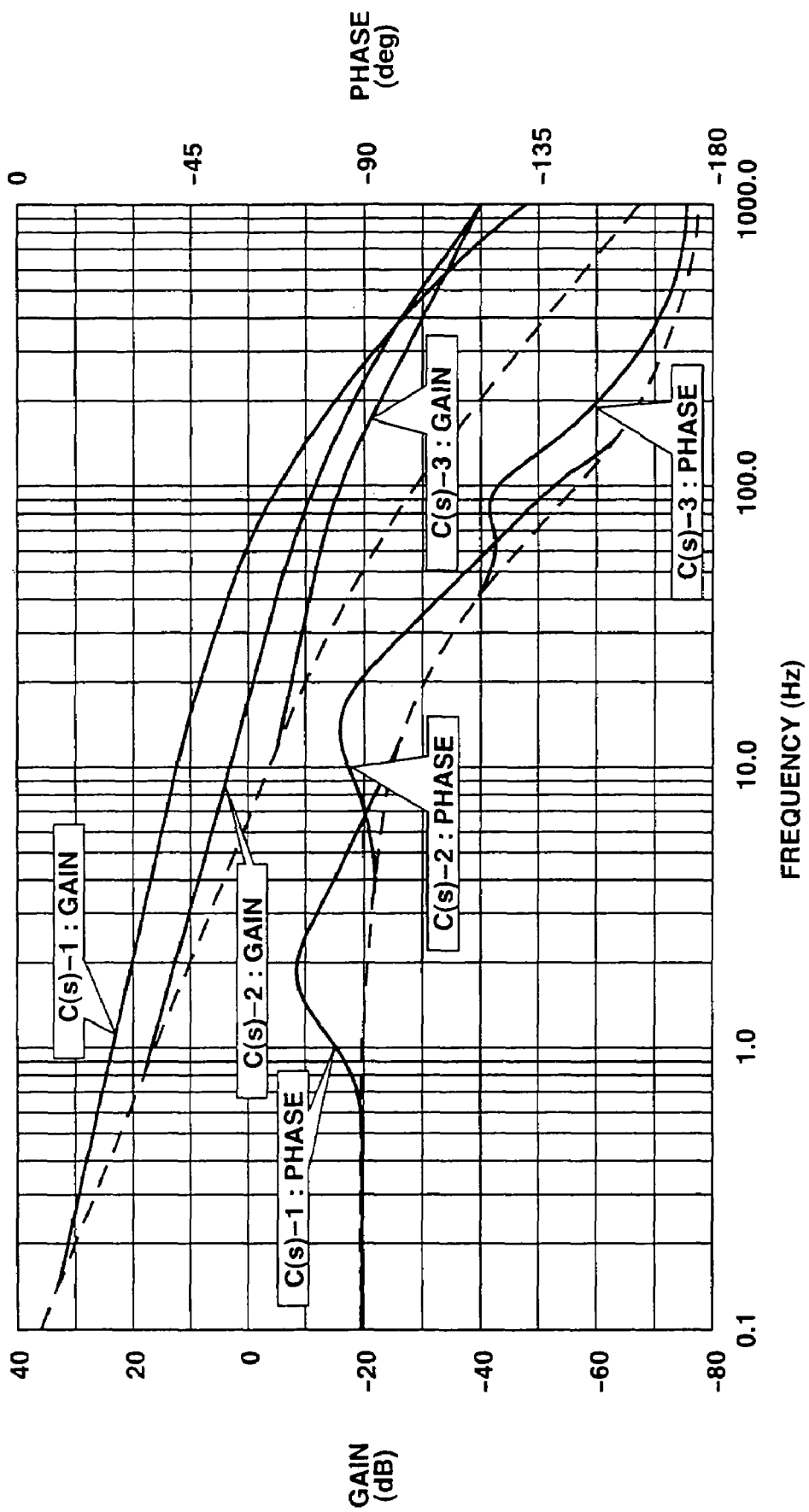
FIG. 10 is a graph showing open loop characteristics when the servo controller of the actuator is mounted such that the frequency range is optionally selected, with the quantity of phase compensation being constant, as shown in FIG. 7.

FIG. 10 shows open loop characteristics when the servo controller for the actuator is mounted in such a manner that the frequency band may be optionally selected for a constant quantity of phase compensation, as shown in FIG. 7.

(1) C(s)-1: The gain amplification of approximately +5.6 dB and a phase lead of approximately +18 degrees are afforded in a band of 1.0 to 100 Hz. This increases the gain on the whole, thus improving positioning accuracy and follow-up characteristics. However, the energy loss may be produced. On the other hand, an increasing load tends to give rise to instabilities.

(2) C(s)-2: The gain amplification of approximately +5.6 dB and a phase lead of approximately +18 degrees are afforded in a band of 0.1 to 10 Hz. In this case, characteristics intermediate between C(s)-1 and C(s)-2 are obtained.

(3) C(s)-3: The gain amplification of approximately +5.6 dB and a phase lead of approximately +18 degrees are afforded in a band of 10 to 1 k Hz. Since the phase lead compensation is made only in the high frequency range, the efficacy is not optimum during slow robot movements. However, certain efficacy may be noted in which robot motions, such as running, jumping or dancing.

Thus, by optionally selecting the frequency band for phase compensation, the frequency response of the actuators may be optionally set, and hence the frequency response for the joint axes of the robot, made up by these actuators, may be dynamically adjusted in dependence on the orientation or on operational aspects of the robot body.

Figure 11:
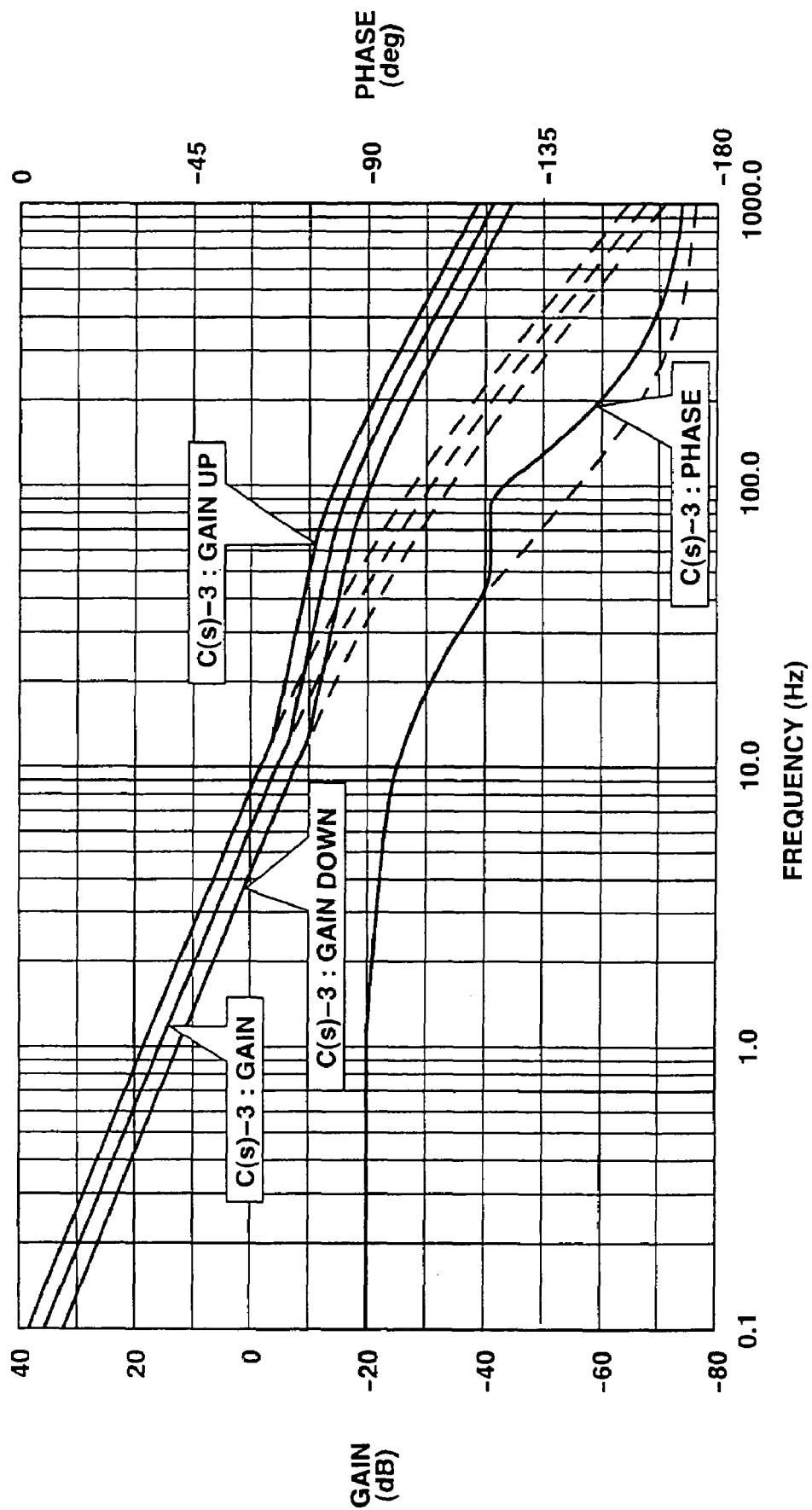
FIG. 11 is a graph showing the state in which control of the serial compensation gain has further been introduced in the example C(s)-3 in which, in FIG. 10, phase lead compensation is applied only in the high frequency range.

FIG. 11 show a case where serial compensation control gain is further applied in the example C(s)-3 where phase lead compensation is applied only to a high frequency range in FIG. 10. In the present case, the gain is increased or decreased for the same gain, in the same way as in the example shown in FIG. 5.

In the example shown in FIG. 10, the efficacy is not optimum for slow movements in the example C(s)-3 of phase compensation. However, control offset may be reduced in the low frequency range, by increasing the gain in the low frequency range, as shown in FIG. 11. As a consequence, it becomes possible to respond to a command value with a small lag even during the slow movements.

Figure 12:
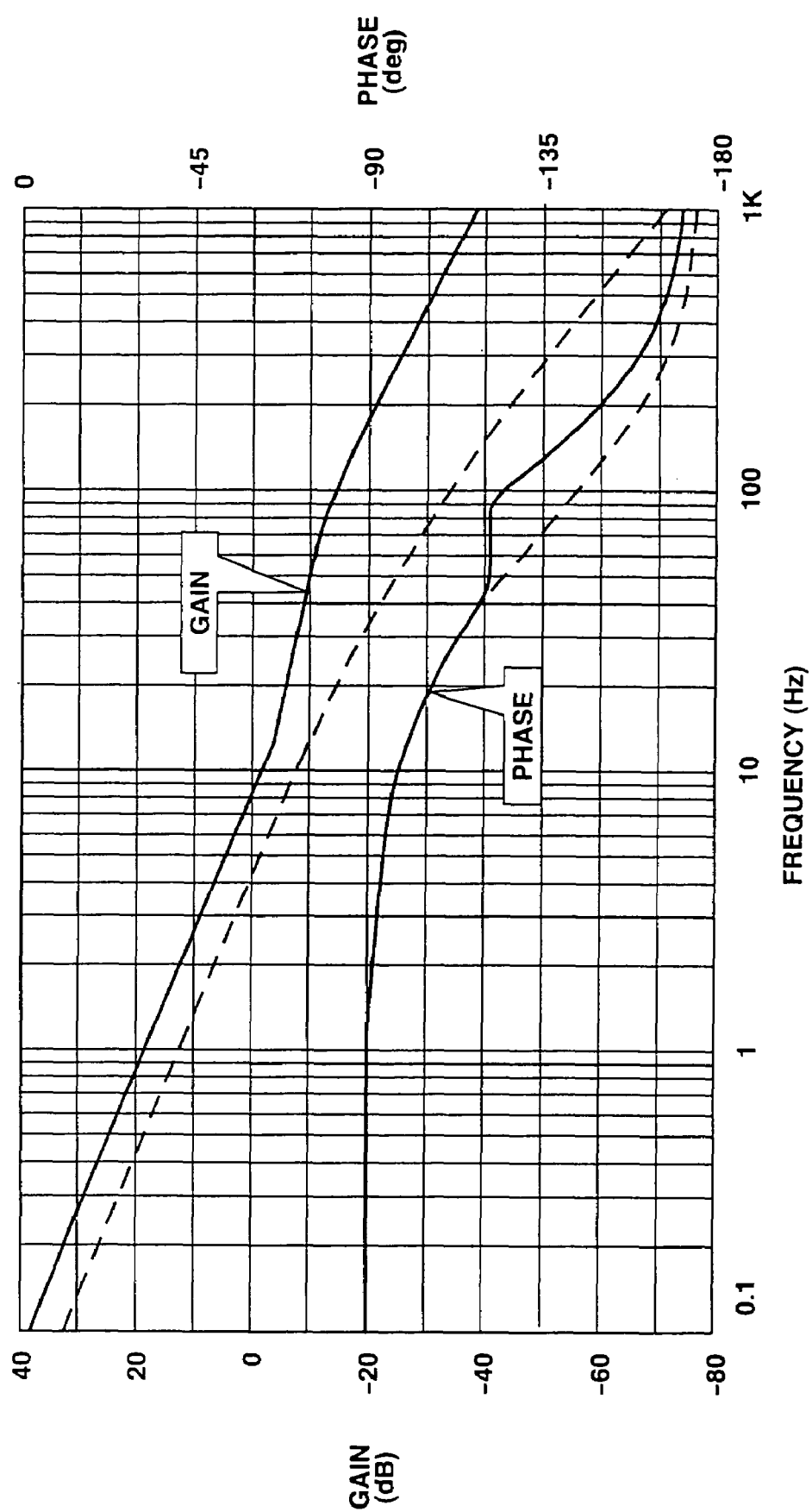
FIG. 12 is a graph showing a case in which open loop characteristics of the position control system of the actuator are set to such characteristics in which the gain is high for the entire range and the quantity of phase lead is decreased for the high range.

In sum, by setting open-loop characteristics of a position control system of the actuator so that the overall gain is increased and so that the quantity of phase lead is decreased in a high frequency range, as shown in FIG. 12, it is possible to increase the stiffness in the site or joint in need of high position accuracy, such as support leg, to eliminate the compliance.

Figure 13:
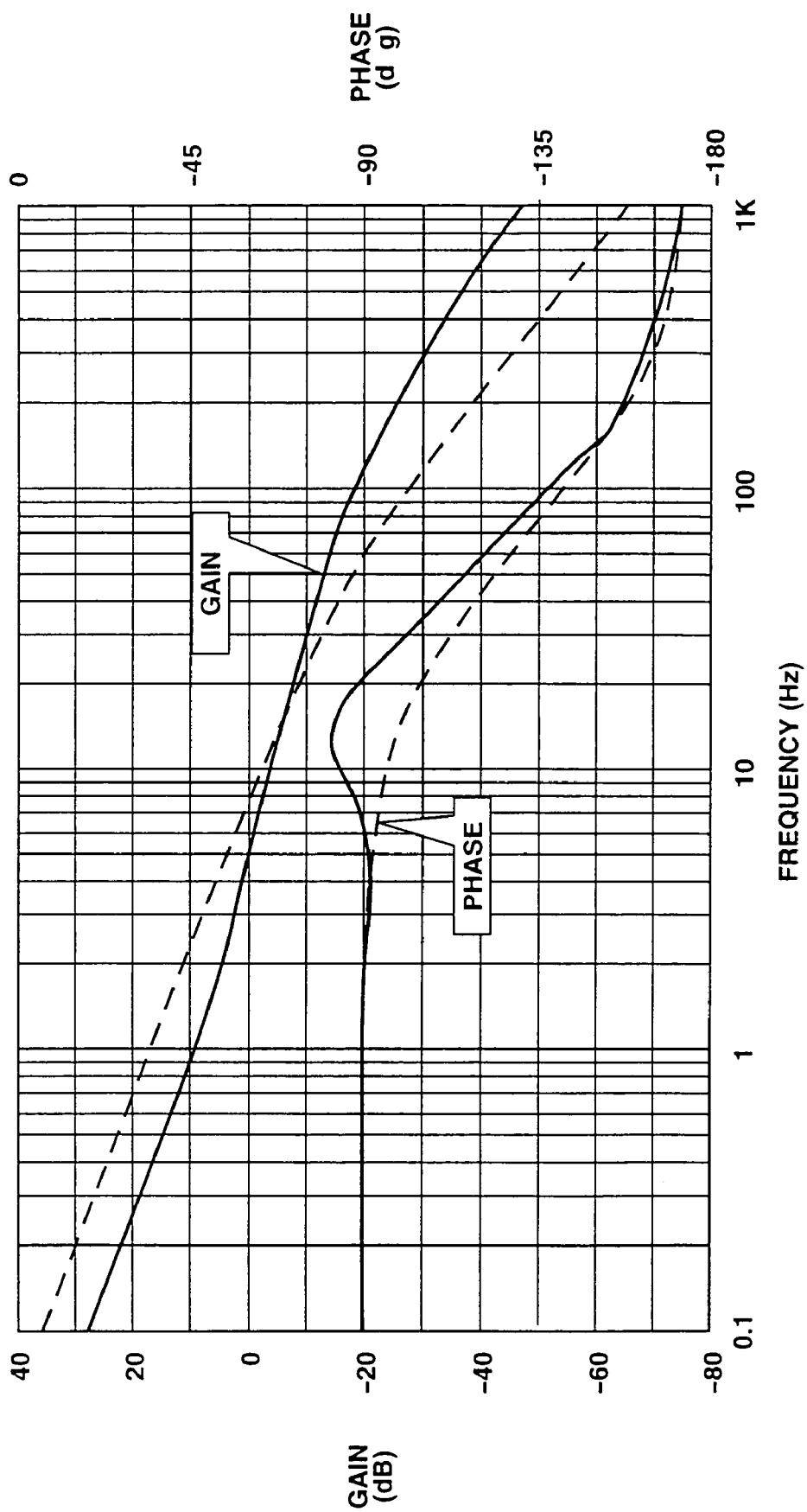
FIG. 13 is a graph showing a case in which open loop characteristics of the position control system of the actuator are set to such characteristics in which the gain is low for the low range and the quantity of phase lead is increased for the high range.

On the other hand, by setting open-loop characteristics of a position control system of the actuator so that the gain is decreased for the low frequency range and so that the quantity of phase lead is increased in a high frequency range, as shown in FIG. 13, it is possible to realize optimum characteristics for a joint site, such as a leg in the flight state, which is in need of constraint response, rather than position accuracy, or whenever a joint is in need of compliance.

The mechanism for adjusting not only the proportional gain of the servo controller in the actuator, but also the phase compensation element, in each of the respective joint sites, has so far been explained. Such mechanism renders it possible to increase or decrease the force for achieving stable highly efficient operations and to increase or decrease the compliance (mechanical passiveness) of the respective joint sites.

If the movements of the respective joint axes are comprehended as a position control system, for example, it is more advisable to motion control to reduce the control offset, by employing a high gain high frequency band servo controller. However, if the movements of the respective joint axes are comprehended as a mechanical model, it is advisable to lower the gain or to increase or decrease the frequency band, as a subject of phase compensation, in consideration of the potential energy or the action of the kinetic energy.

C-2 Viscous Resistance of Actuator Motor

Such a system may be used in which, in addition to the operating speed or the mechanical passiveness of the actuator, the viscous resistance of the actuator is variably controlled, during its operation, as explained in C-1 above.

For example, in a motor of a type in which the current to a coil is controlled to produce a predetermined magnetic flux distribution to generate rotational torque, a switching circuit made up of a first set of transistor switches, each having a coil terminal connected to a power supply terminal, and a second set of transistor switches, each having a coil terminal grounded, is actuated under PMW command to control the coil current to generate a desired torque, a rotational position or a rotational speed.

It is noted that, at a timing of the open state during the time the motor coil is not supplied with current, the current, more precisely the electrical charges, supplied to the motor coil, is lost, thus producing torque loss. Moreover, the effect of torque fluctuations due to cogging tends to be apparent.

In such case, it is possible to prevent the current, more precisely the electrical charges, supplied to the motor coil, from being lost, by setting a shorted state in which the coil is not in the open state even during the time the motor coil is not supplied with current. At this time, back-electromotive force is generated in the motor coil due to the magnetic flux density from a permanent magnet. This back-electromotive force causes the force to act in the opposite direction to the direction of the motor rotation, thus producing the viscous resistance against rotation caused by an external force, to give rise to an effect comparable to braking. Such viscous resistance to the motor reduces torque losses to decrease the effect of torque variations otherwise caused by cogging.

On the other hand, if such shorted state of the coil is produced during the time the motor is not supplied with current, a sort of viscous resistance may be afforded to the motor, as described above. However, if such motor is used for a robot, there is raised a problem that compliance (mechanical passiveness) is lost due to the effect of braking caused by coil shorting.

By adjusting the proportions between the open state of the motor coil during the time the motor coil is not supplied with the current, and the shorted state of the coil, in dependence on desired mechanical characteristics, it is possible to resolve simultaneously the problem of torque loss and torque fluctuations, caused by loss of current, more precisely, the electrical charges, supplied to the motor coil, at a timing of the open circuiting of the motor coil, and by cogging, and the problem of elimination of compliance (mechanical passiveness) under the effect of braking caused in turn by coil shorting during the time the motor coil is not supplied with current.

It is noted that the proportions between the current-conducting state and the non-current-conducting state to the motor coil can be implemented by PWM control, and that the proportions between time duration of the open-circuited state of the motor coil during the non-current-conducting state of the motor coil and that during its short-circuited state may similarly be implemented by PWM control.

Figure 14:
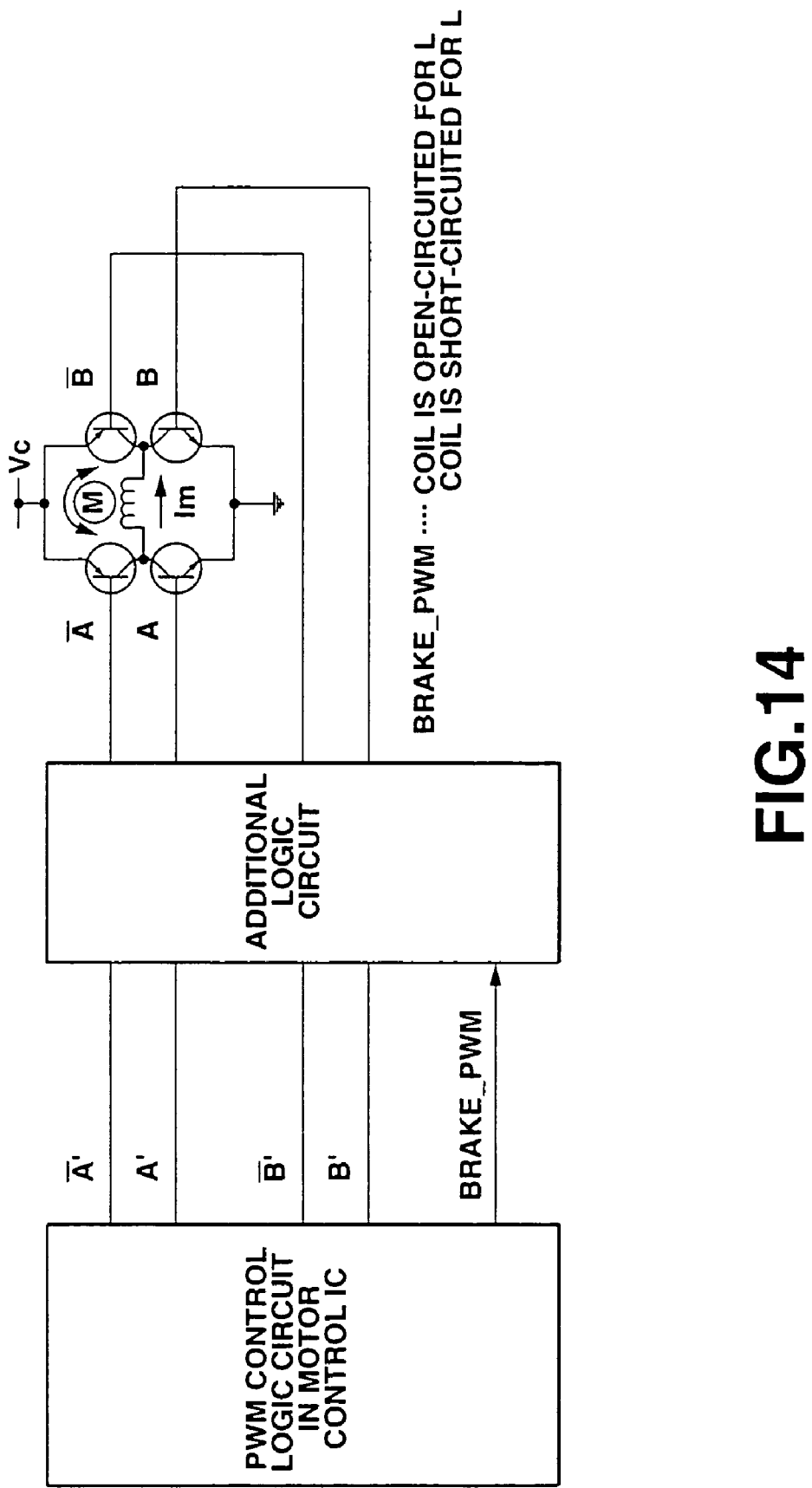
FIG. 14 shows an illustrative structure of an equivalent circuit of a current control circuit for supplying the coil current to a DC motor employing a coil current controlling mechanism.

FIG. 14 shows an illustrative structure of a current controlling circuit for supplying the coil current in a DC motor, implemented by employing a coil current controlling mechanism.

The current controlling circuit, shown in this figure, is of a full-bridge configuration, made up by a circuit composed of a forward connection of a pnp transistor A' and an npn transistor A and a circuit composed of a forward connection of a pnp transistor B' and an npn transistor B, with these two circuits being connected in parallel to each other across a power supply voltage Vcc and the ground GND, and by a single-phase stator coil connected across a junction point across the transistors A, A' and a junction point across the transistors B, B'.

By turning the transistors A', B on and turning the transistors A, B' off, the current Im flows through the motor coil in the direction of an arrow in the drawing. By turning the transistors A', B off, the motor coil is in the open-circuited state, with the flow of the current Im then ceasing.

On the other hand, by turning the transistors A', B off and turning the transistors A, B' on, the motor coil is in a shorted (electrically shorted) state.

A PWM control logic circuit generates a command for supplying the current to the motor coil, based on a current axis current command (or a torque command) from a central controller, not shown, in order to perform switching control for the respective transistors, based on this current supply command, in accordance with the PWM system. That is, the current-conducting state in which the transistors A', B are turned on and the transistors A, B' are turned off, to cause the coil current Im to flow, and the non-current-conducting state, in which the transistors A', B are turned off to cause cessation of the current flow through the motor coil, are generated alternatively.

In the present embodiment, there is further provided an auxiliary logic circuit for changing over a control signal, controlling the on/off operation of the transistors A, A' and B, B', output from the PWM control logic circuit, in accordance with an auxiliary logic.

Figure 15:
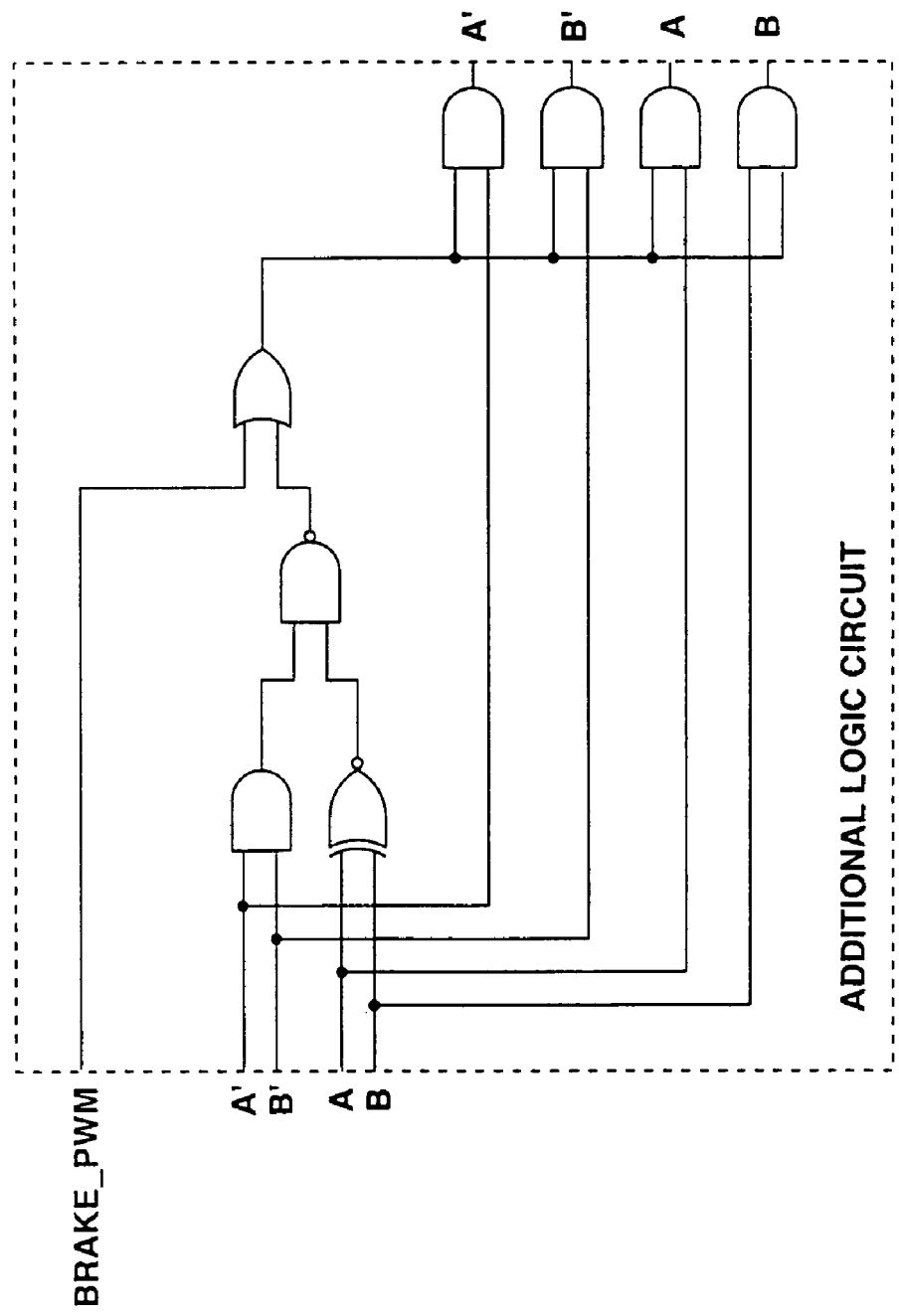
FIG. 15 shows a specified circuit structure of an additional logic circuit.

The auxiliary logic circuit changes over the control logic, controlling the on/off operations of signals $A_0$, $A_0'$ and $B_0$, $B_0'$, output from the PWM control logic circuit, based on a BRAKE_PWM control signal, output from the PWM control logic circuit, in accordance with the auxiliary logic. This switches the short-circuited state of the motor coil to the open-circuited state thereof and vice versa in the non-current-conducting state of the motor coil. FIG. 15 shows a specified circuit configuration of the auxiliary logic circuit.

The signal $A_0'$ for controlling the transistor A' is ANDed with the signal $B_0'$ for controlling the transistor B' from the PWM control logic circuit, while the signal $A_0$ for controlling the transistor A is Ex-ORed with the signal $B_0$ for controlling the transistor B. The resulting outputs are ANDed and then inverted and the resulting output is further ORed with an inverted signal of the BRAKE_PWM control signal. The resulting logical sum signal is ANDed with the original transistor control signals to give ultimate control signals for the respective transistors.

When supplied with the high level of the BRAKE_PWM control signal, the auxiliary logic circuit changes over the transistor control signals to short-circuit the motor coil during the non-current-conducting time. During the normal non-current-conducting time, the PWM control logic circuit outputs transistor controlling signals to cause the control signals $A_0'$, $A_0$ to go high and to cause the control signals $B_0'$, $B_0$ to go low. On the other hand, the auxiliary logic circuit when supplied with a high level of the BRAKE_PWM control signal causes the signals $A_1'$, $A_1$ to be changed from the high state to the low state to set the shorted state of the motor coil.

On the other hand, when the BRAKE_PWM control signal is low, the auxiliary logic circuit directly outputs the transistor control signals from the PWM control logic circuit, during the non-current-conducting time, so that the motor is in the open-circuited state during the non-current-conducting time.

FIG. 16 shows output characteristics for the respective transistor controlling signals by the auxiliary logic circuit, when the circuit is supplied with the BRAKE_PWM control signal having a predetermined duty ratio, under PWM control, along with coil current waveform characteristics and torque output characteristics.

If the motor coil is short-circuited during the non-current-conducting time, the time until zero-resetting of the coil current is prolonged, due to transient response. If the motor coil is open-circuited, the time becomes shorter. The transient response characteristics during the non-current-conducting time are a mixture of these characteristics, in accordance with the duty ratio of the BRAKE_PWM control signal.

Thus, if the switching operations of current conduction in the coil and the short-circuiting thereof are repeated, as shown in FIG. 16, the next current conduction commences before the coil current reverts to zero during the non-current-conducting time. Although the maximum current through the coil is increased progressively each time the current conduction in the coil and the short-circuiting thereof occur repeatedly alternately, the current rising tendency is approximately proportionate to the duty ratio, that is, the proportion of the BRAKE_PWM control signal going high. In similar manner, the effective value of the coil current rises progressively, as shown, with the rising tendency being approximately proportionate to the duty ratio, that is, the proportion of the BRAKE_PWM control signal going high.

On the other hand, the output torque T of the motor is the coil current multiplied with the torque constant $K_t$ of the motor ($T=K_t \cdot I$), so that, as may be seen from FIG. 16, when the current conduction in the coil and the short-circuiting thereof occur repeatedly alternately, the effective value of the motor torque is increased with the increase in the coil current. Thus, with the motor coil being short-circuited in the non-current-conducting state, there is no risk of the current, more precisely, the electrical charges, supplied to the motor coil, being lost, thus eliminating torque losses. Moreover, the effect of torque fluctuations due to cogging is not liable to be apparent.

The increasing tendency of the motor torque on repetition of the current conduction and non-current conduction through the coil is roughly proportionate to the duty ratio of the BRAKE_PWM control signal, that is, the proportion of the control signal going high. The motor torque output rising characteristics correspond to viscous coefficient of the motor.

When the aforementioned short-circuited state of the coil is produced during the non-current-conducting state of the motor, a sort of viscous resistance may be imparted to the motor, as discussed above. On the other hand, when such motor is used for a robot, there is raised a problem that, due to the braking, caused by coil short-circuiting, compliance (mechanical passiveness) of the robot is lost.

Thus, the PWM control logic circuit PWM-controls the BRAKE_PWM control signal, supplied to the auxiliary logic circuit, to control the proportion of the time duration of open-circuiting of the coil in the non-current-conducting state of the motor coil and that of the time duration of short-circuiting of the coil.

On PWM-controlling the time duration of open-circuiting of the coil in the non-current-conducting state of the motor coil and the time duration of short-circuiting of the coil, the characteristics of the coil current is a mixture, in accordance with the duty ratio, of the transient response characteristics of the coil current on open-circuiting the coil during the non-current-conducting time and the transient response characteristics of the coil current on short-circuiting the coil.

FIG. 17 shows output characteristics of the respective transistor control signals of the auxiliary logic circuit, supplied with the BRAKE_PWM control signal having a predetermined duty ratio under PWM control, along with coil current waveform characteristics and torque output characteristics.

If, during non-current-conducting time, the coil is short-circuited, the time until the coil current is reset to zero is prolonged, due to transient response. However, when the coil is open-circuited, the time becomes shorter. The transient response characteristics during the non-current-conducting time represent a mixture of these characteristics, in accordance with the duty ratio of the BRAKE_PWM control signal.

Thus, if the switching operations of current conduction in the coil and the short-circuiting thereof are repeated, as shown in FIG. 17, the next current conduction commences before the coil current reverts to zero during the non-current-conducting time. The maximum current through the coil is increased progressively each time the current conduction in the coil and the short-circuiting thereof occur repeatedly alternately, with the current rising tendency being approximately proportionate to the duty ratio, that is, the proportion of the BRAKE_PWM control signal going high. In similar manner, the effective value of the coil current rises progressively, as shown, with the rising tendency being approximately proportionate to the duty ratio, that is, the proportion of the BRAKE_PWM control signal going high.

On the other hand, the output torque T of the motor is the coil current multiplied with the torque constant $K_t$ of the motor ($T=K_t \cdot I$), so that, when the current conduction in the coil and the short-circuiting thereof occur repeatedly alternately, the effective value of the motor torque is increased with the increase in the coil current as may be seen from FIG. 17. The tendency of rise of the effective value of the motor torque is approximately proportionate to the duty ratio of the BRAKE_PWM control signal, that is, the proportion of the control signal going to a high level. The increasing tendency of the motor torque corresponds to the viscous coefficient of the motor. Stated differently, the viscous resistance of the motor may be dynamically controlled by the duty ratio of the BRAKE_PWM control signal.

Thus, by PWM-controlling the duty ratio of the BRAKE_PWM control signal, supplied by the PWM control logic circuit to the auxiliary logic circuit, the proportion of the time duration of the open-circuited state of the coil at the time of non-current-conduction in the motor coil and that of the short-circuited state thereof may be adjusted in accordance with desired mechanical characteristics.

As a consequence, it is possible to resolve simultaneously the problem of torque loss and torque fluctuations, caused by loss of current, more precisely, the electrical charges, supplied to the motor coil, at a timing of the open circuiting of the motor coil, and by cogging, respectively, and the problem of elimination of compliance (mechanical passiveness) under the effect of braking caused in turn by short-circuiting of the coil during the non-current-conducting time.

It is also possible to control dynamically the viscous resistance of the motor by the duty ratio of the BRAKE_PWM control signal. The control relationship is shown in FIG. 18, in which the viscous resistance is expressed by the product of the viscous resistance [mN–m·s/rad] and the rotational angular velocity at the time of the movement [rad/s].

Figure 18:
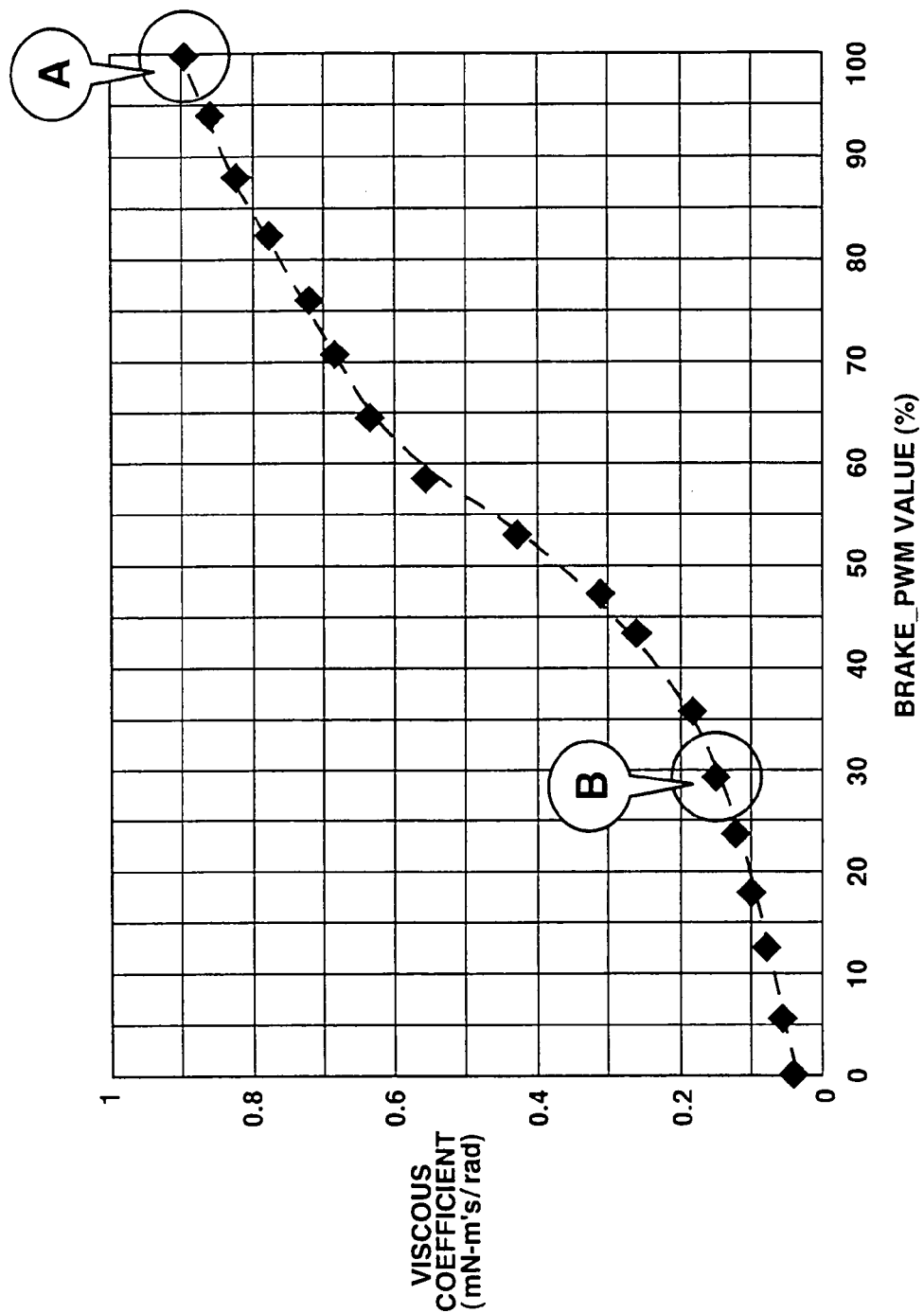
FIG. 18 shows control areas for dynamically controlling the viscous resistance of a motor by the duty ratio of the BRAKE_PWM control signal.

In FIG. 18, an area indicated by A represents the viscous coefficient which becomes maximum in terms of motor characteristics. In the illustrated example, this maximum viscous coefficient is 0.9 mN–m·s/rad. If the actuator characteristics are set in this area, the viscosity of the joint is increased and, as a result, compliance cannot be achieved. However, robust control characteristics may be achieved against disturbances, such as oscillations, exerted from outside.

In FIG. 18, an area indicated by B represents the viscous coefficient which is one-third or less of the maximum value in terms of motor characteristics. In the illustrated example, this viscous coefficient is 0.15 mN-m·s/rad. If the actuator characteristics are set in this area, the viscosity of the joint becomes small. As a result, mechanical passiveness (compliance) can be achieved, even though control characteristics become weaker against disturbances.

As for the area B for achieving the compliance, it is basically sufficient that the viscous coefficient is less than the maximum value in terms of motor characteristics. However, as shown, in an area with a steep gradient from 0.3 to 0.8 mN-m·s/rad, the viscous coefficient is susceptible to environmental changes, such as temperature changes, and hence is difficult to control. It is therefore felt that an area of the viscous coefficient which is less than one-third of the maximum value of the viscous coefficient in terms of motor characteristics, and which presents a moderate gradient, is desirable, as is also evidenced by experiments conducted by the present inventors.

In the foregoing explanation, a DC motor is taken as an example. This is merely illustrative and, in case of a motor of the type in which the rotational torque is generated by controlling the current supplied to a coil to produce a predetermined magnetic flux distribution to generate the rotational torque, such as a three-phase motor, it is similarly possible to produce a desired viscous coefficient of the motor by intermittently switching the state of the motor coil during the non-current-conducting time from the open-circuited state to the short-circuited state and vice versa.

D. Application to the Legged Mobile Robot

A legged mobile robot, walking on two legs, in which the control mechanism of characteristics of a servo controller of an actuator of the present embodiment and the control mechanism of the actuator itself are applied to respective joint sites, is hereinafter explained.

As described in the foregoing, the positioning accuracy, mechanical passiveness (compliance) or the operating speed, as required in the respective joint sites of the robot, can be optionally set by adjusting the proportional gain and the phase compensation element in the servo controller of the actuator. Moreover, the viscous coefficient of the motor can be adjusted to change the robustness against disturbances, such as oscillations, by switching the motor coil intermittently from the open-circuited state to the short-circuited state and vice versa during the non-current-conducting time to the coil of the actuator motor.

Additionally, the frequency response of the actuator that can be applied to an area where the positioning accuracy is crucial, as well as the frequency response of the actuator that can be applied to an area where the high-speed response and compliance are crucial, may be obtained by combining the gain/phase compensation control in the actuator servo controller and the viscous resistance of the actuator motor.

The frequency response of the actuator, that can be applied to the area where the positioning accuracy is crucial, are as shown in FIG. 12. In this case, the proportional gain of the servo controller is selected to a larger value and the gain of the entire system is increased such as to achieve the gain up to the low frequency range. The frequency response is selected as shown in FIG. 12, that is, so that the quantity of phase lead is smaller in a high frequency range, such that contribution to the high speed response characteristics is not marked but stability is assured. Additionally, the viscous coefficient of the motor is to be increased to achieve robustness against disturbances, such as oscillations. In sum, the characteristics shown represent characteristics in which emphasis is placed on positioning accuracy and which are robust against disturbances.

The frequency response of the actuator, that can be applied to the area where the high-speed response and compliance are crucial, are as shown in FIG. 13. In this case, the proportional gain is selected to a smaller value and the gain of the low frequency range is decreased such that the mechanical passiveness (compliance) may readily be obtained. The frequency response is selected as shown in FIG. 13, that is, so that the quantity of phase lead is larger in a mid to high frequency range, such that high-speed response characteristics may be achieved. Moreover, the viscous resistance of the motor is to be reduced such that the mechanical passiveness (compliance) may readily be achieved. In sum, the characteristics shown place emphasis on mechanical passiveness (compliance) and on high-speed response characteristics.

The degrees of freedom of the legged mobile robot, shown in FIGS. 1 to 3, may be implemented by an actuator having the aforementioned servo controller. That is, the robot is a humanoid robot having two legs and two arms. The present robot has the four limbs mounted to the robot body, and is made up by a head unit having four degrees of freedom, namely a neck roll axis, first and second neck pitch axes, and a neck yaw axis, left and right arm units, having at least four degrees of freedom, namely a shoulder joint pitch axis, a shoulder joint roll axis, a shoulder joint yaw axis and an elbow joint pitch axis, a body trunk unit having two degrees of freedom, namely a body trunk roll axis and a body trunk pitch axis, and left and right leg units, having at least six degrees of freedom, namely a hip joint yaw axis, a hip joint roll axis, a hip joint pitch axis, a knee joint pitch axis, an ankle pitch axis and an ankle roll axis.

These degrees of freedom of the joints may be implemented by the actuators each having the aforementioned servo controller. A control example for controlling the gain and phase compensation characteristics of the actuator, used in the respective joint sites, is now explained in detail.

(1) Characteristics of an Actuator Applied to a Neck Portion

In the neck portion, emphasis is placed on the positioning accuracy, so that the proportional gain is set to a high value. Moreover, the quantity of phase lead is set to a smaller value, so that, as the operating speed is kept, stability is not lost in an amount corresponding to the increased proportional gain. Additionally, the viscous resistance of the joint is set to a larger value in order to obtain robustness against oscillatory disturbances produced during movement of the robot body portion below the trunk unit.

(2) Characteristics of an Actuator Applied to Shoulder and Elbow Portions

For carrying out continuous movements, such as walking or dancing, such characteristics are imparted to the actuator in which more emphasis is placed on the mechanical passiveness than on the positioning accuracy. The viscous resistance of the joints is decreased in order to impart passiveness to the movements. The proportional gain is set to a lower value in order to impart passiveness to the movements and in order to decrease energy consumption. The frequency range in which to effect phase lead compensation is set to a higher range, while the quantity of phase lead is set to a larger value, in order to increase the operating speed. There may be such a movement which is merely an oscillatory movement, as in a pendulum. In such case, the viscous resistance of the joints and the proportional gain are minimized to realize mechanical passiveness (compliance) so that the mechanical energy will be used more readily for carrying out the movements.

In carrying out the movements of employing the force for pushing or pulling an object, control is performed so that characteristics placing more emphasis on positioning accuracy and those placing more emphasis on mechanical passiveness will be dynamically interchanged depending on the load torque value. If desired to generate more force against load torque values, the positioning accuracy is set to a higher value, while the viscous resistance of the joint is increased. If desired to effect a profiling operation in order to provide a constant load against load torque values, the proportional gain is lowered depending on the load torque as detected by a torque sensor within the actuator, while the viscous resistance of the joints is lowered to develop mechanical passiveness, in addition to carrying out adjustments responsive to a position command value from an upper order system.

(3) Characteristics of an Actuator Applied to a Trunk Portion

In order to develop robustness against oscillatory disturbances, caused by the robot's own movements, the viscous resistance of the joints is increased. Alternatively, the proportional gain is set to a higher value for placing emphasis on positioning accuracy. Still alternatively, the quantity of phase lead is set to a smaller value, in order not to detract from stability corresponding to the increase in the proportional gain, as the operational speed is maintained.

(4) Characteristics of an Actuator Applied to a Hip Joint Portion

In order to develop robustness against oscillatory disturbances caused by the robot's own movements, the viscous resistance of the joints is increased. Alternatively, the proportional gain is set to a higher value for placing emphasis on positioning accuracy. Still alternatively, the quantity of phase lead is set to a smaller value, in order not to detract from stability corresponding to the increase in the proportional gain, as the operational speed is maintained.

(5) Characteristics of an Actuator Applied to a Knee Portion

During the time the leg is in flight, and at an instant the foot unit touches the floor, control is performed to such characteristics in which more emphasis is placed on mechanical passiveness than on positioning accuracy. In order to impart passiveness to the movements, the viscous resistance of the joints is decreased. In order to impart passiveness to the movements and in order to decrease the energy consumption, the proportional gain is set to a lower value. Moreover, in order to increase the operating speed, the frequency range, in which to effect phase lead compensation, is set to a higher value, while the quantity of phase lead is set to a larger value.

During the time the leg is in the stance, control is performed to such characteristics in which more emphasis is placed on positioning accuracy than on mechanical passiveness. In order to develop robustness against oscillatory disturbances caused by the robot's own movements, the viscous resistance of the joints is increased. Alternatively, the proportional gain is set to a higher value for placing emphasis on positioning accuracy. Still alternatively, the quantity of phase lead is set to a smaller value in order not to detract from stability corresponding to the increase in the proportional gain as the operational speed is maintained.

(6) Characteristics of an Actuator Applied to an Ankle Portion

During the time the leg is in flight, and at an instant the foot unit touches the floor, control is performed to obtain such characteristics in which more emphasis is placed on mechanical passiveness than on positioning accuracy. In order to buffer the impact caused by the ankle portion touching the floor, the viscous resistance of the joints is set to a smaller value to develop mechanical passiveness (compliance). Additionally, in order to buffer the impact caused by the ankle portion touching the floor, the proportional gain is set to a lower value, such as to develop mechanical passiveness (compliance). Moreover, in order to increase the operating speed, the frequency range, in which to effect phase compensation, is set to a higher value, while the quantity of phase lead is set to a larger value.

On the other hand, during the time the leg is in the stance state, the viscous resistance of the joint is set to a larger value, for increasing the torque generated in the ankle part and to develop robustness against oscillatory disturbances ascribable to the robot's own movements. Moreover, the proportional gain is set to a higher value for improving positioning accuracy of the ankle portion. In addition, the quantity of phase lead is set to a smaller value for not detracting from stability in an amount corresponding to the increase in the proportional gain as the operating speed is maintained.

E. Instance of Allocation of Actuator Characteristics for Respective Robot Joint Sites During Walking By controlling characteristics owned by the servo controllers of the respective joint actuators and characteristics of the actuators themselves, as described in the foregoing, the following results may be achieved.

That is, by "increasing the low range gain" and by "decreasing the quantity of phase lead in the high frequency range", as in actuator characteristics, shown in FIG. 12, and by "increasing the viscous resistance of the joint" as shown in FIG. 18A, positioning control may be achieved to high accuracy, thereby improving orientation stability. Moreover, by "decreasing the low range gain" and by "increasing the quantity of phase lead", as in actuator characteristics shown in FIG. 13, and by "decreasing the viscous resistance of the joint" as shown in FIG. 18B, mechanical passiveness and fast response characteristics may be afforded to the robot, so that follow-up control may be achieved for a higher frequency range, as the force of impact on floor touchdown is buffered.

For example, by applying actuator characteristics, shown in FIG. 13, to the leg in the stance position, the mechanical passiveness may be imparted to the leg, so that the potential energy when the leg is uplifted during walking movements may be exploited more readily as the supplementary energy for assisting the next following leg swing-down movement. This decreases the energy consumption to decrease the consumption of the battery used for driving the robot body.

Figure 19:
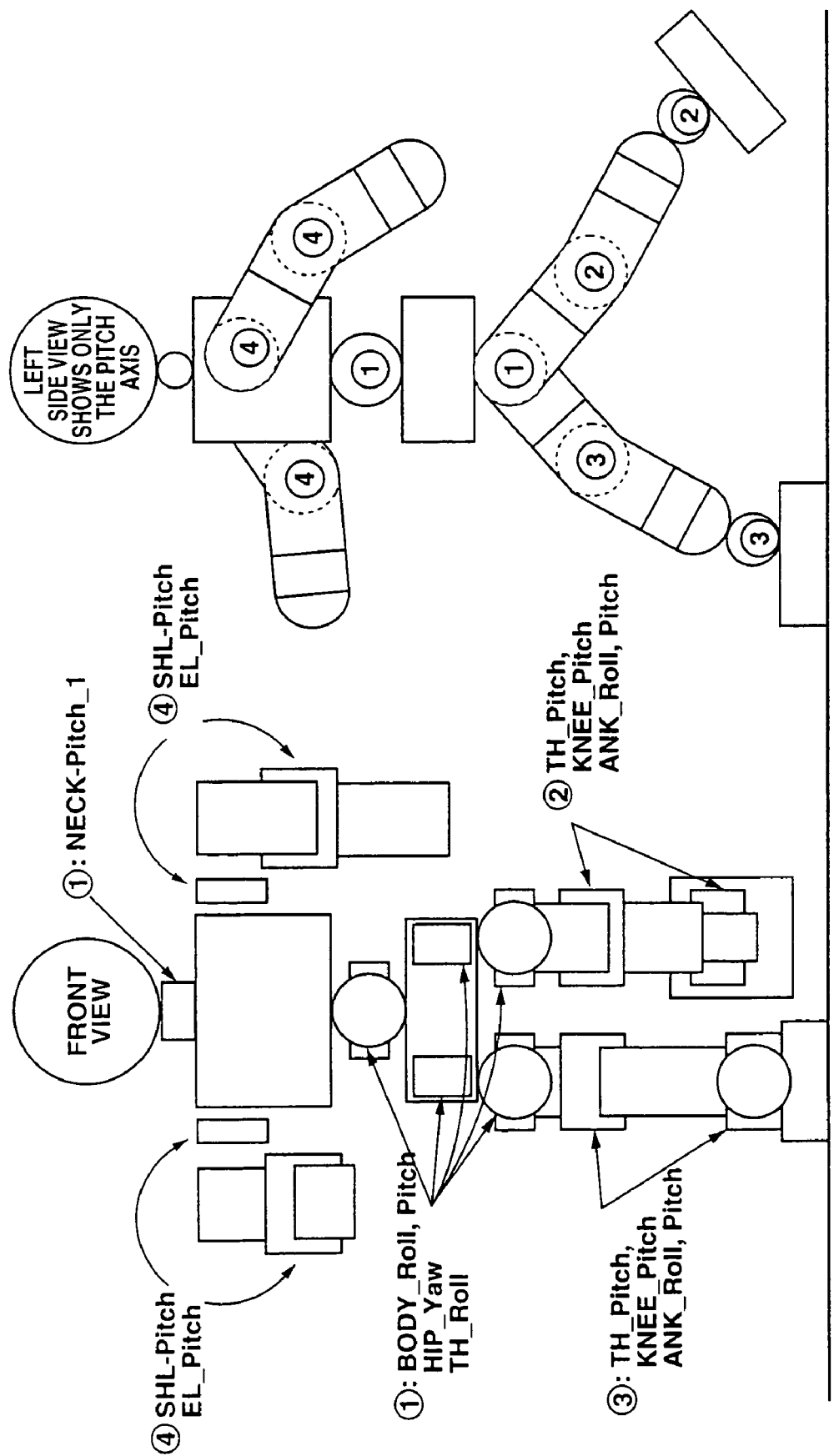
FIG. 19 illustrates the allocation of characteristics of the actuator controllers and the actuators themselves in the respective joint sites when the robot performs walking movements.

Referring to FIG. 19, the characteristics of the actuator controller and the actuator itself in the respective joints when the robot performs walking movement are hereinafter explained.

When the robot performs walking movements, a high positioning accuracy is needed in the respective joint sites of the neck pitch axis, body trunk roll axis, body trunk pitch axis, body trunk yaw axis, hip joint roll and pitch axes and, on the legs in the stance positions, in the respective joint sites of the knee pitch axis and ankle roll and pitch axes.

Thus, in the actuators of these joint sites, the proportional gain of the servo controller is set to a larger value to increase the gain of the entire system so that the gain may be obtained up to the low frequency range. The frequency response is selected as shown in FIG. 12, that is, so that the quantity of phase lead is smaller in a high frequency range, such that contribution to the high speed response characteristics is not marked but stability is assured. Additionally, the viscous coefficient of the motor is increased, as shown in FIG. 18A, to achieve robustness against disturbances, such as oscillations.

On the other hand, fast response characteristics and compliance are crucial in the joint sites of the shoulder pitch axis or elbow pitch axis, and also in the joint sites of the knee pitch axis or ankle roll and pitch axes, which are on the side of the legs in flight state during the walking movement of the robot.

Thus, in the actuators of these joint sites, the proportional gain is decreased to decrease the gain of the overall system to lower the gain in the low frequency range such as to enable the mechanical passiveness (compliance) to be achieved extremely readily. The frequency response (phase compensation characteristics) are also selected so that the quantity of phase lead will be larger in the mid to high frequency range, as shown in FIG. 13, to produce fast response characteristics. Moreover, the viscous resistance of the motor is decreased, as shown in FIG. 18B, such as to enable the mechanical passiveness (compliance) to be achieved more readily.

By applying the characteristics of the actuator controller and the characteristics of the actuator itself, shown in FIG. 13, to the shoulder to the legs in the flight state, the mechanical passiveness (compliance) can be developed in the arms and in the legs. In this case, the potential energy of the arm uplifted during walking may readily be used as the motion assisting energy at the time of the next arm swing-down movement. As a consequence, the energy consumption and the consumption of the battery power as a power supply for actuating the robot body may be diminished.

Figure 20:
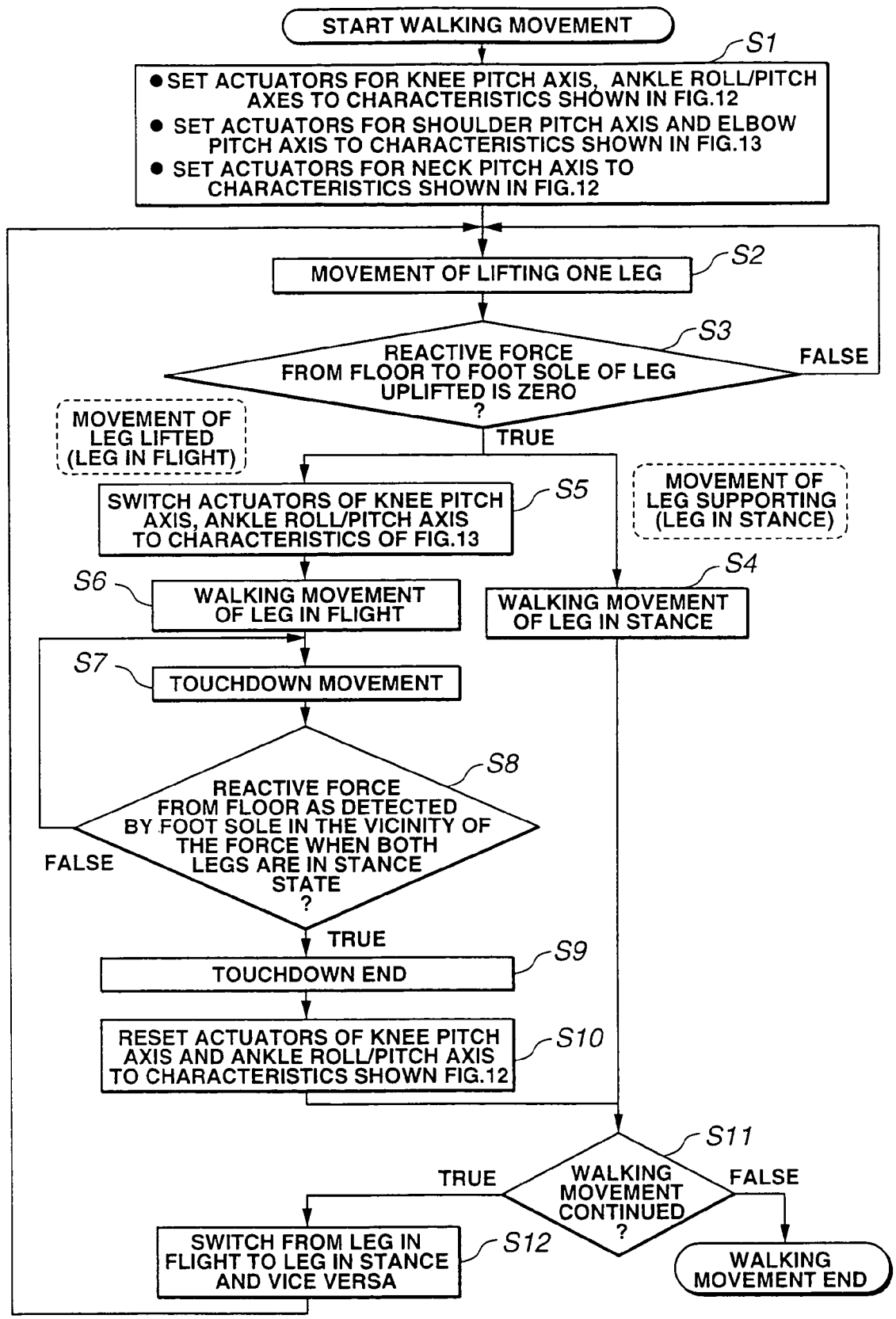
FIG. 20 is a flowchart showing the sequence of processing operations for switching the actuator characteristics in the respective joint sites when the robot performs walking movements.

FIG. 20 shows, as a flowchart, the processing sequence in switching the characteristics of the actuators at the respective joint sites when the robot performsites walking movements.

First, the actuators of the joint sites forming respective joint sites of the knee pitch axis and the ankle roll and pitch axes are set such as to increase the low range gain and to decrease the quantity of phase lead in the high frequency range, as shown in FIG. 12, and to increase the viscous resistance of the joints, as shown in FIG. 18A. On the other hand, the actuators of the joint sites, forming the joint sites of the shoulder pitch axes and the elbow pitch axes, are set such as to decrease the proportional gain, as shown in FIG. 13, in order to lower the gain of the entire system and hence the gain in the low frequency range and in order to realize the mechanical passiveness (compliance). Additionally, the actuators of the joint sites forming respective joint sites of the body trunk roll, pitch and yaw axes, hip joint roll and pitch axes, and the first neck pitch axis are set such as to increase the low range gain and to decrease the quantity of phase lead in the high frequency range, as shown in FIG. 12, and to increase the viscous resistance of the joints, as shown in FIG. 18A (step S1).

The movement of uplifting one of the legs is then executed (step S2).

When the reactive force from the floor, received by the foot sole of the leg, being uplifted, has become zero (step S3), the leg in the stance state carries the leg in flight state, to perform walking movements (step S4).

As for the leg in the flight state, the actuators of the knee joint pitch axis, ankle roll axis and the ankle pitch axis are set such as to decrease the low range gain and to increase the quantity of phase lead, as shown in FIG. 13, as well as to decrease the viscous resistance of the joint, as shown in FIG. 18B (step S5).

The walking movement, as the leg in flight state, is then carried out (step S6) and further the touchdown movement is carried out (step S7).

When the magnitude of the reactive force from the floor, as detected by the foot sole, is in the vicinity of that at the time when both legs are in the stance positions (step S8), the floor touchdown movement of the leg in the stance state comes to a close (step S9).

The actuators of the knee joint pitch axis, ankle roll axis and the ankle pitch axis of the leg in the flight state are then set such as to increase the low range gain and to decrease the quantity of the phase lead in the high frequency range, as shown in FIG. 12, and also such as to increase the viscous resistance of the joints, as shown in FIG. 18A (step S10).

If the walking movement is to be continued further (step S11), the leg in flight state is changed over to the leg in the stance state and vice versa (step S12). Then, processing transfers to the step S2 to repeat the processing in the manner described above.

If conversely the walking movement is to be terminated (step S11), the present processing routine in its entirety is terminated.

Figure 21:
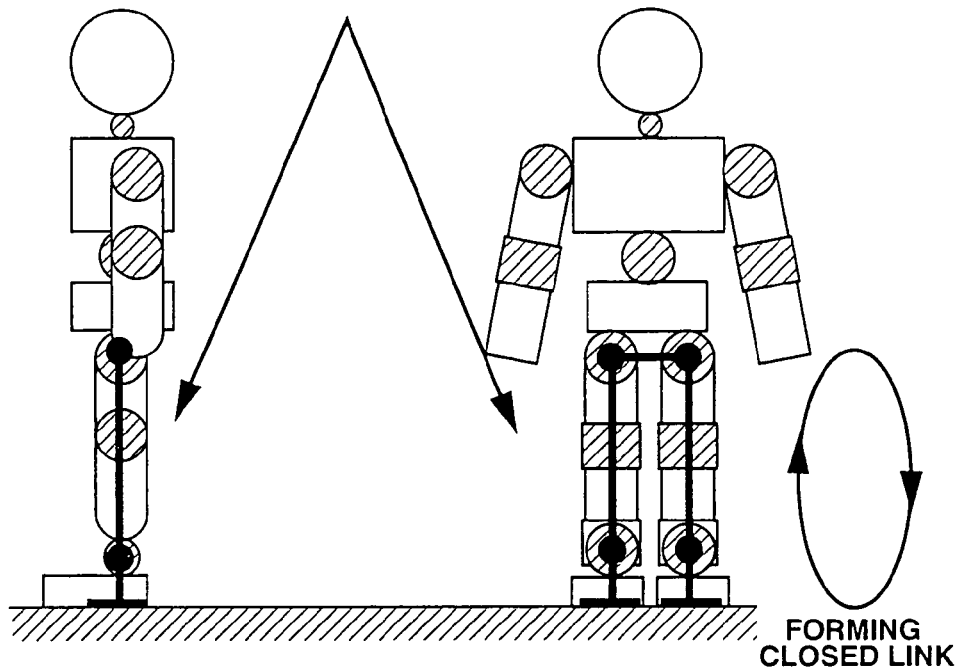
FIG. 21 shows how a closed link system is formed by both legs and the floor surface with the two legs being in the stance state in the upstanding posture of the robot.
Figure 22:
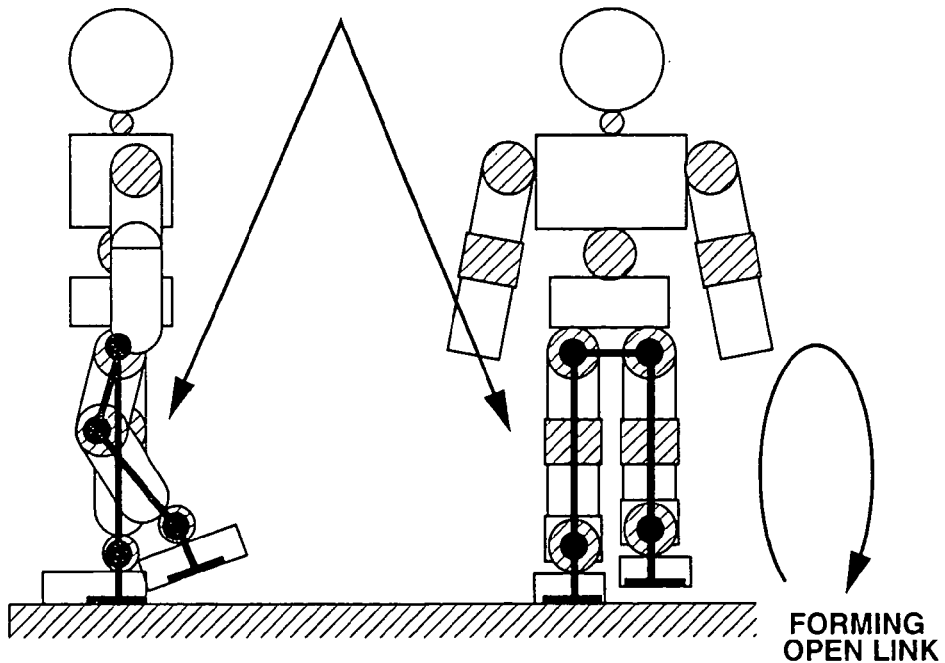
FIG. 22 shows how an open link system is formed by both legs and the floor surface by one of the two legs being in the stance state in the upstanding posture of the robot.

The robot body of the legged mobile robot is formed by a multi-link structure comprised of plural joint axes, having substantially parallel degrees of freedom of the joints, and which are interconnected in the lengthwise direction. During the walking movement, the link state which the touchdown site of the multi-link structure forms with the floor surface is switched between the open link state and the closed link state. FIG. 21 shows the state in the upstanding posture of the robot in which both legs and the floor surface form a closed link system, as a result of both legs being in the stance positions, whilst FIG. 22 shows the state in the upstanding posture of the robot in which both legs and the floor surface form an open link system as a result of one of the legs being in the stance position.

In the present embodiment, the characteristics of relevant joint actuators are changed over between stiff, soft and intermediate joint characteristics, in each stage of the walking movement, responsive to the switching between the link states, thereby realizing adaptive falldown movements. Meanwhile, the stiff joint characteristics are defined as such characteristics in which the gain is high for the entire frequency range and the quantity of phase lead in the high frequency range is small, as shown in FIG. 12, and in which the viscosity of the motor is set to the maximum value of the motor characteristics shown in FIG. 18A. The intermediate joint characteristics are defined as such characteristics in which the gain is low for the low frequency range, the quantity of phase lead is large in the high frequency range, as shown in FIG. 13, and in which the viscosity of the motor is set to the maximum value of the motor characteristics shown in FIG. 18A. The soft joint characteristics are defined as such characteristics in which the gain is low for the low frequency range, the quantity of phase lead is large in the high frequency range, as shown in FIG. 13, and in which the viscosity of the motor is set to one-third the maximum value of the motor characteristics shown in FIG. 18B.

FIGS. 23 to 28 show the manner in which the robot performs walking movements. In each of these figures, the state of the movements may be grasped in six stages of from A to F.

(A) Time Period When Both Legs are in the Stance State

When both legs are in the stance state, the lower limbs and the floor surface define a closed link system (see FIG. 23). This state of both legs being in the stance state can be confirmed, from the robot's own orientation, touchdown state and the state of the movement (velocity and acceleration of each axis), using the robot's own joint angle information, foot sensor (or a contact sensor) at the foot sole and an orientation sensor.

At this time, the actuators of the totality of the joint sites of the left and right legs are set to the aforementioned intermediate joint characteristics, that is, to such characteristics in which the gain is low for the low frequency range and the quantity of phase lead is large in the high frequency range, as shown in FIG. 13, and in which the viscosity of the motor is set to the maximum value of the motor characteristics shown in FIG. 18A. As a result, the left and right legs in the stance state are capable of high speed response, and compliance may be realized, while the motor viscosity is increased.

The left and right shoulder joints, elbow joints and other joint sites are set to stiff characteristics, that is to such characteristics in which the gain is high for the entire frequency range and the quantity of phase lead is small in the high frequency range, as shown in FIG. 12, and in which the viscosity of the motor is set to the maximum value of the motor characteristics shown in FIG. 18A. As a result, emphasis is placed not on the compliance but on the positioning accuracy, thus achieving robustness against disturbances, such as oscillations.

(B) Instant When the Leg Clears the Floor

Next to the time point when the robot has set its left leg forward, with the both legs then being in the stance state, the robot kicks the floor surface with its rear right leg, which right leg then commences to clear the floor surface. The instant when the right leg has cleared the floor surface can be confirmed from the robot's own orientation, touchdown state and the kinematic state (velocity and acceleration of each axis), using the robot's own joint angle information, foot sensor (or a contact sensor) at the foot sole and the orientation sensor. In this state, the open link system is made up by the robot body (legs, body trunk and arms) and the floor surface (see FIG. 24).

At this time, the actuators of the totality of the joint sites of the left and right legs are set to the aforementioned intermediate joint characteristics, that is, to such characteristics in which the gain is low for the low frequency range and the quantity of phase lead is large in the high frequency range, as shown in FIG. 13, and in which the viscosity of the motor is set to the maximum value of the motor characteristics shown in FIG. 18A. As a result, the left and right legs in the stance state are capable of high speed response, and compliance may be realized, while the motor viscosity is increased.

The left and right shoulder joints, elbow joints and other joint sites are set to stiff characteristics, that is to such characteristics in which the gain is high for the entire frequency range and the quantity of phase lead is small in the high frequency range, as shown in FIG. 12, and in which the viscosity of the motor is set to the maximum value of the motor characteristics shown in FIG. 18A. As a result, emphasis is placed not on the compliance but on the positioning accuracy, thus achieving robustness against disturbances, such as oscillations.

(C) Time Period When One of the Legs is in the Stance State (Uplifting)

Next to the time the rear leg clears the floor surface, the leg is uplifted, by way of performing the movement corresponding to the former half of the time when one of the legs is in the stance state. The state of transition to the state one of the legs is in the stance position can be confirmed from the robot's own orientation, touchdown state and the kinematic state (velocity and acceleration of each axis), using the robot's own joint angle information, foot sensor (or a contact sensor) at the foot sole and the orientation sensor. In this state, the open link system is made up by the robot body (legs, body trunk and arms) and the floor surface (see FIG. 25).

The joint actuators of the left leg, as a leg in the stance state, are set to stiff actuator characteristics, that is to such characteristics in which the gain is high for the entire frequency range and the quantity of phase lead is small in the high frequency range, as shown in FIG. 12, and in which the viscosity of the motor is set to the maximum value of the motor characteristics shown in FIG. 18A. As a result, emphasis is placed not on the compliance but on the positioning accuracy, thus achieving robustness against disturbances, such as oscillations.

The joint actuators for the thigh roll and pitch axes of the right leg, as a leg in flight state, are also set to stiff actuator characteristics, in order to enable the swing-down movement of the leg in the flight state.

The joint actuators for the upper limbs, such as left and right shoulder pitch axes or the elbow pitch axis, are set to soft actuator characteristics, that is to such characteristics in which the gain is low for the low frequency range and the quantity of phase lead is large in the high frequency range, as shown in FIG. 13, and in which the viscosity of the motor is set to one-third the maximum value of the motor characteristics shown in FIG. 18B, in order to impart compliance as well as to increase fast response characteristics to enable concerted movements for orientation stabilization.

The actuators for the ankle roll and ankle pitch axes for the right leg, as the leg in flight, are also set to soft actuator characteristics, in order to be in readiness for impact on touchdown.

The other joint sites are set to stiff characteristics in which emphasis is placed on positioning accuracy, rather than on compliance, for achieving robustness against disturbances, such as oscillations.

(D) Time Period When One of the Legs is in the Stance State (Swing-down)

Next to the former half period of the time when one of the legs is in the stance state, that is, to the period the rear leg is uplifted, the leg uplifted is swung forward and then swung downward, by way of performing the movement of the latter half of the time period when one of the legs is in the stance state. This state of transfer to the latter half period can be confirmed, from the robot's own orientation, touchdown state and the state of the movement (velocity and acceleration of each axis), using the robot's own joint angle information, foot sensor (or a contact sensor) at the foot sole and an orientation sensor. In this state, an open link system is formed by the robot body (legs, body trunk and arm units) and the floor surface (see FIG. 26).

All of the joint actuators of the left leg, as the leg in the stance state, are maintained in the stiff actuator characteristics in which the gain is high for the entire frequency range and the quantity of phase lead is small in the high frequency range, as shown in FIG. 12, and in which the viscosity of the motor is set to the maximum value of the motor characteristics shown in FIG. 18A. As a result, emphasis is placed not on the compliance but on the positioning accuracy, thus achieving robustness against disturbances, such as oscillations.

The joint actuators for the thigh roll axis and the thigh pitch axis of the right leg, as the leg in the flight state, are also set to stiff actuator characteristics in order to enable a swing-down movement of the leg in the flight state.

The joint actuators for the knee pitch axis, ankle roll axis and the ankle pitch axis, taking part in touchdown, of the right leg, as the leg in the flight state, are also set to soft actuator characteristics. That is, the servo characteristics of the actuator motors are set so that the gain is low for the low frequency range and the quantity of phase lead is large in the high frequency range, as shown in FIG. 13, and in which the viscosity of the motor is set to one-third the maximum value of the motor characteristics shown in FIG. 18B, in order to impart compliance and in order for the robot to ready itself to the impact at the time of touchdown.

The joint actuators for the left and right shoulder pitch axes or the elbow pitch axis are also set to soft actuator characteristics. That is, the servo characteristics of the actuator motors are set so that the gain is low for the low frequency range and the quantity of phase lead is large in the high frequency range, as shown in FIG. 13, and in which the viscosity of the motor is set to one-third the maximum value of the motor characteristics shown in FIG. 18B, in order to impart compliance, to improve fast response characteristics and to enable concerted movements for orientation stabilization.

The other joint sites are set to stiff joint characteristics in which emphasis is placed on the positioning accuracy rather than on the compliance, in order to achieve robustness against disturbances, such as oscillations.

(E) Instant of Touchdown

Next to the time period when one of the legs is in the stance state, the leg in the flight state, which has been swung down, touches the floor. The instant of touchdown can be confirmed from the robot's own orientation, touchdown state and the kinematic state (velocity and acceleration of the respective axes), using the robot's own joint angle information, force sensor at the foot sole (or contact sensor) or the orientation sensor. The lower limbs form a closed link system against the floor surface (see FIG. 27).

All of the joint actuators of the left leg, as a leg in the stance state, are maintained at the stiff actuator characteristics in which the gain is high for the entire frequency range and the quantity of phase lead is small in the high frequency range, as shown in FIG. 12, and in which the viscosity of the motor is set to the maximum value of the motor characteristics shown in FIG. 18A. As a result, emphasis is placed not on the compliance but on the positioning accuracy, thus achieving robustness against disturbances, such as oscillations.

The joint actuators for the thigh roll axis and the thigh pitch axis of the right leg, as the leg in the flight state, are also set to stiff actuator characteristics in order to enable swing-down movement of the leg in the flight state.

The joint actuators for the knee pitch axis, ankle roll axis and the ankle pitch axis of the right leg, as the leg in the flight state, are also set to soft actuator characteristics. That is, the servo characteristics of the actuator motors are set so that the gain is low for the low frequency range and the quantity of phase lead is large in the high frequency range, as shown in FIG. 13, and in which the viscosity of the motor is set to one-third the maximum value of the motor characteristics shown in FIG. 18B, in order to impart compliance and in order to be in readiness for impact at the time of touchdown.

The joint actuators for the left and right shoulder pitch axes or the elbow pitch axis are also set to soft actuator characteristics. That is, the servo characteristics of the actuator motors are set so that the gain is low for the low frequency range and the quantity of phase lead is large in the high frequency range, as shown in FIG. 13, and in which the viscosity of the motor is set to one-third the maximum value of the motor characteristics shown in FIG. 18B, in order to impart compliance and in order to improve fast response characteristics such as to enable concerted movements for orientation stabilization.

The other joint sites are set to stiff joint characteristics in which emphasis is placed on positioning accuracy rather than on compliance to achieve robustness against disturbances, such as oscillations.

(F) Both Legs Being in the Stance State

When the leg in flight state has touched the floor, the state is the same as the state when both legs are in the stance state, except that the left and right legs have been interchanged. In this state, the lower limbs and the floor surface form a closed link system (see FIG. 28). This state of both legs being in the stance state can be confirmed, from the robot's own orientation, touchdown state and the state of the movement (velocity and acceleration of each axis), using the robot's own joint angle information, foot sensor (or a contact sensor) at the foot sole, and an orientation sensor.

At this time, the actuators of the totality of the joint sites of the left and right legs are set to the aforementioned intermediate joint characteristics, that is, to such characteristics in which the gain is low for the low frequency range and the quantity of phase lead is large in the high frequency range, as shown in FIG. 13, and in which the viscosity of the motor is set to the maximum value of the motor characteristics shown in FIG. 18A. As a result, the left and right legs in the stance state are capable of high speed response, and compliance may be realized, while the motor viscosity is increased.

The left and right shoulder joints, elbow joints and other joint sites are set to stiff joint characteristics, that is to such characteristics in which the gain is high for the entire frequency range and the quantity of phase lead is small in the high frequency range, as shown in FIG. 12, and in which the viscosity of the motor is set to the maximum value of the motor characteristics shown in FIG. 18A. As a result, emphasis is placed not on the compliance but on the positioning accuracy, thus achieving robustness against disturbances, such as oscillations.

If the walking movement is to be continued, the orientations of (A) to (F) is repeated.

F. Example of Actuator Characteristics of Respective Joint Sites of the Robot During Going Up and Down the Staircase In this paragraph, the method for controlling actuator characteristics of respective joint sites of the robot going up and down the staircase is explained.

The robot body of the legged mobile robot is formed by a structure in which plural joint axes having substantially parallel degrees of the joint freedom are interconnected along the lengthwise direction. During the time the robot is going up and down the staircase, the linking state which the floor-touchdown site of the multi-link structure makes with the floor surface is changed over from the open-link state to the closed-link state and vice versa.

In the present embodiment, the actuators for driving the respective joints are suitably changed over between the stiff joint characteristics, soft joint characteristics and intermediate joint characteristics, responsive to the switching of the linking states, in order to realize adaptive falldown movements.

F-1. Movement Going Up the Stairs

First, the allocation of characteristics of the actuator controllers and the actuators at the respective joint sites when the robot goes up and down the staircase, is explained with reference to FIGS. 29 to 34. In the embodiments, shown in these figures, the states of movements may be comprehended in six stages of from A to F.

(A) Time Period When Both Legs are in the Stance State

In the state where both legs are in the stance position, the lower limbs and the floor surface make up a closed link system (see FIG. 29). This state of both legs being in the stance state can be confirmed, from the robot's own orientation, touchdown state and the kinematic state (velocity and acceleration of each axis), using the robot's own joint angle information, a force sensor (or a contact sensor) at the foot sole and an orientation sensor.

At this time, the actuators of all of the joint sites of the left and right legs are set to the aforementioned intermediate joint characteristics, that is, to such characteristics in which the gain is low for the low frequency range and the quantity of phase lead is large in the high frequency range, as shown in FIG. 13, and in which the viscosity of the motor is set to the maximum value of the motor characteristics shown in FIG. 18A. As a result, the left and right legs in the stance state are capable of high speed response, and compliance may be realized, while the motor viscosity is increased.

The other joint sites are set to stiff characteristics, that is to such characteristics in which the gain is high for the entire frequency range and the quantity of phase lead is small in the high frequency range, as shown in FIG. 12, and in which the viscosity of the motor is set to the maximum value of the motor characteristics shown in FIG. 18A. As a result, emphasis is placed not on the compliance but on the positioning accuracy, thus achieving robustness against disturbances, such as oscillations.

(B) Instant of Clearing the Floor

Next to the time period when both legs are in the stance state, with the right leg lying on the stead one step above, the rear leg or the left leg commences to clear the floor of the tread one step below. The instant of clearing the floor can be confirmed, from the robot's own orientation, touchdown state and the kinematic state (velocity and acceleration of each axis), using the robot's own joint angle information, a force sensor (or a contact sensor) at the foot sole and an orientation sensor. In the state, the robot body in its entirety transfers from the closed link system to the open link system, and the robot body (legs, body trunk and the arm units) and the floor surface make up an open link system (see FIG. 30).

All of the joint actuators of the left and right legs are set to intermediate characteristics, that is to such characteristics in which the gain is low for the entire frequency range and the quantity of phase lead is large in the high frequency range, as shown in FIG. 13, and in which the viscosity of the motor is set to the maximum value of the motor characteristics shown in FIG. 18A. As a result, the left and right legs in the stance state are capable of fast response, while compliance is achieved and the viscosity of the motor is increased.

The other joint sites are set to stiff joint characteristics, that is, the servo characteristics of the actuator motor are set so that the gain is high for the entire range and the quantity of phase lead is large in the high frequency range, as shown in FIG. 12, and in which the viscosity of the motor is set to the maximum value of the motor characteristics shown in FIG. 18A. As a result, emphasis is placed not on the compliance but on the positioning accuracy, thus achieving robustness against disturbances, such as oscillations.

(C) Time Period When One of the Legs is in the Stance State (Uplift Time)

Next to the rear left leg clearing the floor surface, the movement for the former half of the time period when one of the legs is in the stance state, that is, the movement of uplifting the leg, is carried out. This state of transition to one of the legs being in the stance state can be confirmed, from the robot's own orientation, touchdown state and the kinematic state (velocity and acceleration of each axis), using the robot's own joint angle information, a force sensor (or a contact sensor) at the foot sole and an orientation sensor. In the state, the robot body (legs, body trunk and the arm units) and the floor surface make up a closed link system (see FIG. 31).

All of the joint actuators of the right leg, as a leg in the stance state, are set to stiff actuator characteristics, that is to such characteristics in which the gain is high for the entire frequency range, the quantity of phase lead is small in the high frequency range, as shown in FIG. 12, and in which the viscosity of the motor is set to the maximum value of the motor characteristics shown in FIG. 18A. As a result, emphasis is placed not on the compliance but on the positioning accuracy, thus achieving robustness against disturbances, such as oscillations.

The joint actuators of the thigh roll, thigh pitch and the knee pitch of the left leg as the leg in the flight state are maintained at intermediate actuator characteristics to allow the execution of the uplift movement of the leg in the flight state.

The actuators of the ankle roll axis and the ankle pitch axis for the left leg as a leg in the stance state are set to soft actuator characteristics. That is, the servo characteristics of the actuator motors are set so that the gain is low for the low frequency range and the quantity of phase lead is large in the high frequency range, as shown in FIG. 13, and in which the viscosity of the motor is set to one-third the maximum value of the motor characteristics shown in FIG. 18B, in order to impart compliance and in order to be in readiness for impact at the time of touchdown.

The other joint sites are set to hard joint characteristics, in which more emphasis is placed on positioning accuracy than on compliance to provide for robustness against disturbances, such as oscillations.

(D) Time Period When One of the Legs is in the Stance State (Time Period of Swing-down)

Next to the former half period of uplifting the rear left leg, in the time period when one of the legs is in the stance state, the movement of the latter half period of swinging out the uplifted left leg and causing it to descend on the tread one step above is carried out. The state of transition to the latter half period of the time period when one of the legs is in the stance position can be confirmed from the robot's own orientation, touchdown state and the kinematic state (velocity and acceleration of each axis), using the robot's own joint angle information, foot sensor (or a contact sensor) at the foot sole and the orientation sensor. In this state, the open link system is made up by the robot body (legs, body trunk and arms) and the floor surface (see FIG. 32).

All of the joint actuators of the right leg, as a leg in the stance state, are set to stiff actuator characteristics, that is to such characteristics in which the gain is high for the entire frequency range and the quantity of phase lead is small in the high frequency range, as shown in FIG. 12, and in which the viscosity of the motor is set to the maximum value of the motor characteristics shown in FIG. 18A. As a result, emphasis is placed not on the compliance but on the positioning accuracy, thus achieving robustness against disturbances, such as oscillations, to support the robot body.

The joint actuators of the thigh roll axis and the thigh pitch axis of the left leg as the leg in the flight state are maintained at intermediate actuator characteristics to allow the execution of the swingdown movement of the leg in the flight state.

The actuators of the knee pitch axis, ankle roll axis and the ankle pitch axis for the left leg as a leg in the flight state are set to soft actuator characteristics. That is, the servo characteristics of the actuator motors are set so that the gain is low for the low frequency range and the quantity of phase lead is large in the high frequency range, as shown in FIG. 13, and in which the viscosity of the motor is set to one-third the maximum value of the motor characteristics shown in FIG. 18B, in order to impart compliance and in order to be in readiness for impact at the time of touchdown.

The other joint sites are set to stiff joint characteristics, in which more emphasis is placed on positioning accuracy than on compliance to provide for robustness against disturbances, such as oscillations.

(E) Instant of Touchdown

Next to the time period when one of the legs is in the stance state, the leg in the flight state, which has been swung down, touches the floor surface of the tread one step higher. The instant of touchdown can be confirmed from the robot's own orientation, touchdown state and the kinematic state (velocity and acceleration of the respective axes), using the robot's own joint angle information, force sensor at the foot sole (or contact sensor) or the orientation sensor. The lower limbs form a closed link system against the floor surface (see FIG. 33).

All of the joint actuators of the right leg, as a leg in the stance state, are maintained at the stiff actuator characteristics in which the gain is high for the entire frequency range and the quantity of phase lead is small in the high frequency range, as shown in FIG. 12, and in which the viscosity of the motor is set to the maximum value of the motor characteristics shown in FIG. 18A. As a result, emphasis is placed not on the compliance but on the positioning accuracy, thus achieving robustness against disturbances, such as oscillations.

The joint actuators for the thigh roll axis and the thigh pitch axis of the left leg, as the leg in the flight state, are set to intermediate actuator characteristics in order to enable the swing-down movement of the leg in the flight state.

The joint actuators for the knee pitch axis, ankle roll axis and the ankle pitch axis of the left leg, as the leg in the flight state, are set to soft actuator characteristics. That is, the servo characteristics of the actuator motors are set so that the gain is low for the low frequency range and the quantity of phase lead is large in the high frequency range, as shown in FIG. 13, and in which the viscosity of the motor is set to one-third the maximum value of the motor characteristics shown in FIG. 18B, in order to impart compliance, increase fast response characteristics and to be in readiness for impact at the time of touchdown.

The other joint sites are set to stiff joint characteristics in which emphasis is placed on positioning accuracy rather than on compliance to achieve robustness against disturbances, such as oscillations.

(F) Both Legs Being in the Stance State

When the leg in flight state has touched the floor, reversion to the state when both legs are in the stance state occurs. However, the left and right legs have been interchanged. In this state, the lower limbs and the floor surface form a closed link system (see FIG. 34). This state of both legs being in the stance state can be confirmed, from the robot's own orientation, touchdown state and the state of the movement (velocity and acceleration of each axis), using the robot's own joint angle information, a force sensor (or a contact sensor) at the foot sole, and an orientation sensor.

At this time, the actuators of all of the joint sites of the left and right legs are set to the aforementioned intermediate joint characteristics, that is, to such characteristics in which the gain is low for the low frequency range and the quantity of phase lead is large in the high frequency range, as shown in FIG. 13, and in which the viscosity of the motor is set to the maximum value of the motor characteristics shown in FIG. 18A. As a result, the left and right legs in the stance state are capable of high speed response, and compliance may be realized, while the motor viscosity is increased.

The other joint sites are set to stiff actuator characteristics, that is to such characteristics in which the gain is high for the entire frequency range and the quantity of phase lead is small in the high frequency range, as shown in FIG. 12, and in which the viscosity of the motor is set to the maximum value of the motor characteristics shown in FIG. 18A. As a result, more emphasis is placed on positioning accuracy than on compliance to provide for robustness against disturbances, such as oscillations.

If the movement of going up and down the staircase is to be continued, the orientations of from (A) to (F) is repeated.

Figure 35:
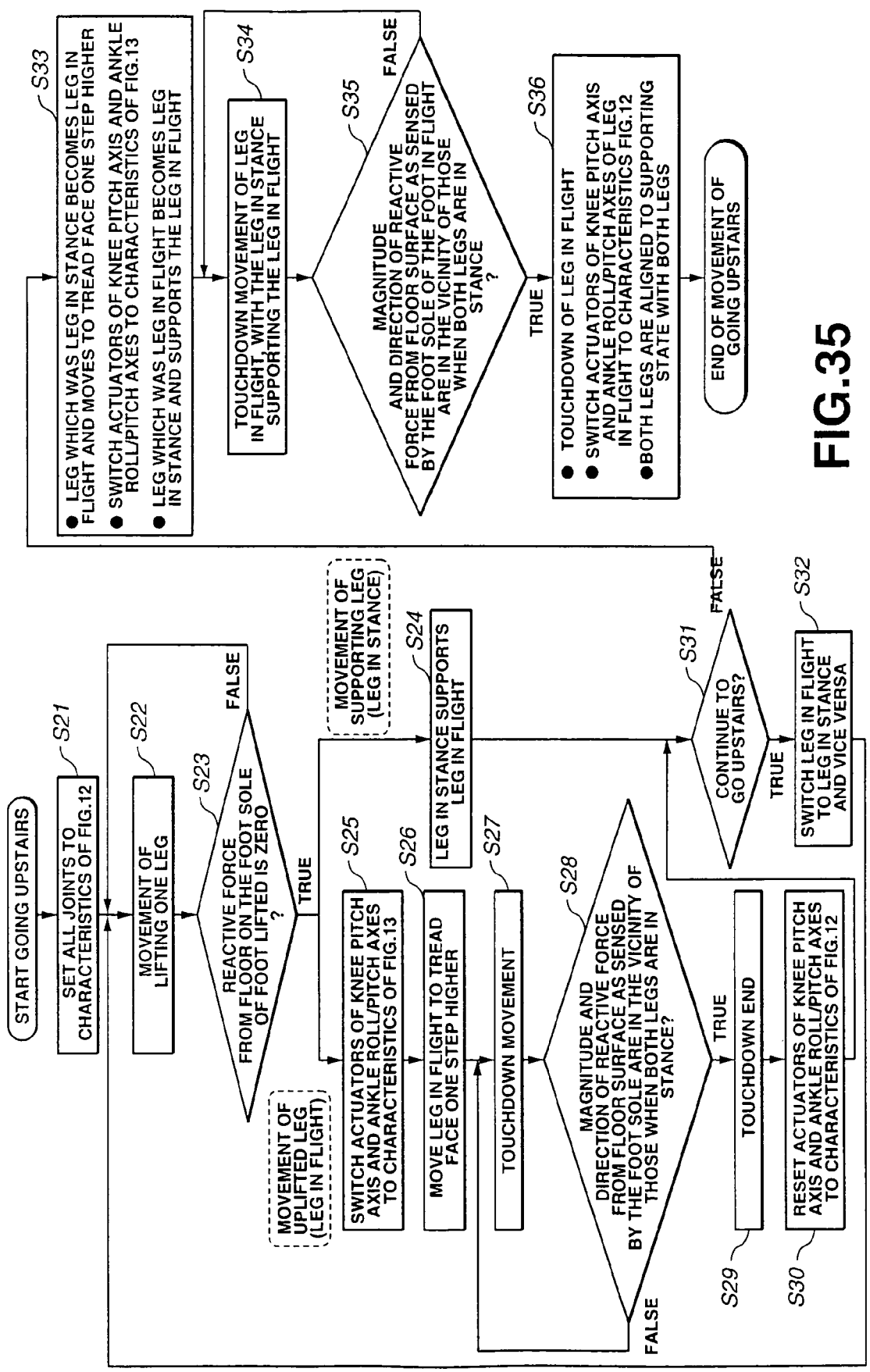
FIG. 35 depicts a flowchart showing the sequence of processing operations for switching the actuator characteristics of the actuators of the respective joint sites of the robot going up the stairs.

FIG. 35 shows, in the form of a flowchart, the processing sequence of switching the actuator characteristics of respective joint sites of the robot going up and down the stairs.

First, the actuators of all of the joint sites making up the robot body are set so that the low range gain is increased and the quantity of phase lead in the high frequency range is decreased, as shown in FIG. 12, while the viscous resistance of the joints will be increased, as shown in FIG. 18A (step S21).

Next, the movement of uplifting one of the legs is executed (step S22).

If the force of reaction from the floor, received by the foot sole of the leg being uplifted, is equal to zero (step S23), the leg in the stance state performs the movement of supporting the leg in the flight state (step S24).

As for the leg in the flight state, the actuators for the knee joint pitch axis, ankle roll axis and the ankle pitch axis are set so that the low range gain is decreased and the quantity of phase lead is increased, as shown in FIG. 13, while the viscous resistance of the joints is decreased, as shown in FIG. 18B (step S25).

The movement of moving the leg in the flight state to the floor surface of a tread one step higher (step S26) and the touchdown movement (step S27) are carried out.

When the magnitude and the direction of the reactive force from the floor, as detected by the foot sole, are proximate to those for the time period when the two legs are in the stance state (step S28), the touchdown movement of the leg in the flight state comes to a close (step S29). The respective actuators of the knee joint pitch axis and the ankle roll and pitch axes of the leg in flight are set such as to increase the low range gain as well as to decrease the phase lead in the high frequency range, as shown in FIG. 12, and to increase the viscous resistance of the joint, as shown in FIG. 18A (step S30).

When the movement of going up the stairs is to be continued (step S31), the leg in flight is switched to the leg in the stance state and vice versa (step S32). Then, processing reverts to the step S22 to repeat the processing similar to that described above.

In case the movement of going up the stairs is to come to a close (step S31), the leg which was the leg in the stance becomes a leg in flight and moves to a tread one step higher (step S33). At this time, the actuators of the ankle roll/pitch axes of the leg in flight are set such as to increase the low range gain as well as to decrease the quantity of phase lead in the high frequency range, as shown in FIG. 12, and to increase the viscous resistance of the joint, as shown in FIG. 18A. The leg which was a leg in flight now becomes a leg in the stance state to support the leg in flight.

The touchdown movement for the leg in flight is then carried out (step S34). At this time, the leg in the stance state operates to command the leg in flight.

When the magnitude and the direction of the reactive force from the floor, as detected by the foot sole of the leg in flight, are then in the vicinity of those during the time when both legs are in the stance (step S35), the touchdown movement of the leg in flight comes to a close (step S36). At this time, the actuators of the knee joint pitch axis and the ankle roll/pitch axes are set such as to increase the low range gain and to decrease the quantity of phase lead in the high frequency range, as shown in FIG. 12, as well as to increase the viscous resistance of the joint, as shown in FIG. 18A. As a consequence, both legs are in the stance state in alignment with each other to complete the movement of going up the stairs.

F-2. Movement of Going Down the Stairs

Referring now to FIGS. 36 to 41, the allocation of the characteristics of the controllers of the actuators in the respective joint sites and the actuators themselves when the robot goes down the stairs is explained. In each of these figures, the state of the movements may be grasped in six stages of from A to F.

(A) Time When Both Legs are in the Stance State

When both legs are in the stance state, the lower limbs and the floor surface define a closed link system (see FIG. 36). This state of both legs being in the stance state can be confirmed, from the robot's own orientation, touchdown state and the kinematic state (velocity and acceleration of each axis), using the robot's own joint angle information, foot sensor (or a contact sensor) at the foot sole and an orientation sensor.

At this time, the actuators of the totality of the joint sites of the left and right legs are set to intermediate joint characteristics, that is, the servo characteristics of the actuator motors are set such that the gain for the low frequency range is low and the quantity of phase lead in the high frequency range is large, as shown in FIG. 13, and so that the viscosity of the motor is of the maximum value of motor characteristics shown in FIG. 18A. The result is that both the left and right legs in the stance state are able to make fast response, while compliance is also achieved and, additionally, the viscosity of the motor is increased.

The other joint sites are set to stiff joint characteristics, that is, the servo characteristics of the actuator motors are set such that the gain is high for the entire frequency range and the quantity of phase lead in the high frequency range is small, as shown in FIG. 12, and so that the viscosity of the motor is of the maximum value of motor characteristics shown in FIG. 18A. The result is that more emphasis is placed on the positioning accuracy than on compliance, whilst robustness against disturbances, such as oscillations, may also be developed.

(B) Instant of Clearing the Floor

Following the time period when the left leg touches the tread face one step lower, with both legs being in the stance position, the rear right leg commences to clear the tread face lying above the first-stated tread face. The instant of clearing the tread face may be confirmed from the robot's own orientation, touchdown state and the kinematic state (velocity and acceleration of each axis), using the robot's own joint angle information, force sensor on the foot sole or contact sensor, and the orientation sensor. In this state, the robot body in its entirety transfers from the closed link system to the open link system, such that the robot body (legs, body trunk and the arm units) forms the open link system (see FIG. 37).

At this time, the actuators of all of the joint sites of the left and right legs are set to intermediate joint characteristics, that is, the servo characteristics of the actuator motors are set such that the gain for the low frequency range is low and the quantity of phase lead in the high frequency range is large, as shown in FIG. 13, and so that the viscosity of the motor is of the maximum value of motor characteristics shown in FIG. 18A. The result is that both the left and right legs in the stance state are able to make fast response, while compliance is also achieved and, additionally, the viscosity of the motor is increased.

The other joint sites are set to stiff joint characteristics, that is, the servo characteristics of the actuator motors are set such that the gain is high for the entire frequency range and the quantity of phase lead in the high frequency range is large, as shown in FIG. 12, and so that the viscosity of the motor is of the maximum value of motor characteristics shown in FIG. 18A. The result is that more emphasis is placed on the positioning accuracy than on compliance, whilst robustness against disturbances, such as oscillations, may also be developed.

(C) Time Period When a Sole Leg is in the Stance State (Another Leg is Uplifted)

Following the right rear leg clearing the tread face, the movement of the former half of the time period when a sole leg is in the stance state is executed. The state of transition to the time period when a sole leg is in the stance state may be confirmed from the robot's own orientation, touchdown state and the kinematic state (velocity and acceleration of each axis), using the robot's own joint angle information, force sensor on the foot sole or contact sensor, and the orientation sensor. In this state, the open link system is formed by the robot body (legs, body trunk and arm units) and the floor surface (see FIG. 38).

All of the joint actuators of the left leg, as the leg in the stance position, are set to stiff actuator characteristics, that is, the servo characteristics are set to stiff joint characteristics, viz., the servo characteristics of the actuator motors are set such that the gain is high for the entire frequency range and the quantity of phase lead in the high frequency range is large, as shown in FIG. 12, and so that the viscosity of the motor is of the maximum value of motor characteristics shown in FIG. 18A. As a consequence, more emphasis is placed on the positioning accuracy, whilst robustness may be achieved against disturbances, such as oscillations, such as to support the robot body positively.

On the other hand, the thigh roll axis and the thigh pitch axis of the right leg, as the leg in a flight state, are set to stiff characteristics, in order to enable the uplifting of the leg in the flight state. The knee pitch of the right leg is maintained in the intermediate actuator characteristics.

The actuators of the ankle roll and the ankle pitch of the right leg, as the leg in the flight state, are set to soft characteristics in which the gain is low for the low frequency range and the quantity of phase lead is large in the high frequency range, as shown in FIG. 13, and in which the viscosity of the motor is set to one-third the maximum value of the motor characteristics shown in FIG. 18B, in order to impart compliance as well as to increase fast response characteristics, so that the robot body may ready itself for impact applied on touchdown.

The other joint sites are set to stiff joint characteristics to place more emphasis on positioning accuracy than on compliance to impart robustness against disturbances, such as oscillations.

(D) Time Period When a Sole Leg is in the Stance State (Swing-down)

Following the former half period of the time period when a sole leg is in the stance state, in which former half period the rear right leg is uplifted, the movement of the latter half period, when the right leg, once uplifted, is caused to descend to a tread face one step below, is carried out. This transfer to the latter half period of the time period when a sole leg is in the stance state can be confirmed, from the robot's own orientation, touchdown state and the state of the movement (velocity and acceleration of each axis), using the robot's own joint angle information, foot sensor (or a contact sensor) at the foot sole and the orientation sensor. In this state, the robot body (legs, body trunk and the arm units) forms an open link system along with the floor surface (see FIG. 39).

All of the joint actuators of the left leg, as the leg in the stance state, are maintained in the stiff actuator characteristics in which the gain is high for the entire frequency range, the quantity of phase lead is small in the high frequency range, as shown in FIG. 12, and in which the viscosity of the motor is set to the maximum value of motor characteristics shown in FIG. 18A. As a result, more emphasis is placed no on the positioning accuracy than on compliance, thus achieving robustness against disturbances, such as oscillations to enable the robot body to be supported positively.

The joint actuators for the thigh roll axis and the thigh pitch axis of the right leg, as the leg in the flight state, are also set to stiff actuator characteristics in order to enable the swing-down movement of the leg in the flight state.

The joint actuators for the knee pitch, ankle roll and the ankle pitch of the right leg, as the leg in the flight state, are also set to soft actuator characteristics. That is, the servo characteristics of the actuator motors are set so that the gain is low for the low frequency range and the quantity of phase lead is large in the high frequency range, as shown in FIG. 13, and in which the viscosity of the motor is set to one-third the maximum value of the motor characteristics shown in FIG. 18B, in order to impart compliance, and in order to increase fast response characteristics, so that the robot may ready itself to the impact at the time of touchdown.

The other joint sites are set to stiff joint characteristics to place more emphasis on positioning accuracy than on compliance to impart robustness against disturbances, such as oscillations.

(E) Instant of Touchdown

Following the time period when the sole leg is in the stance state, the leg in flight, which has been swung down, touches the tread face one step below. The instant of touchdown can be confirmed, from the robot's own orientation, touchdown state and the kinematic state (velocity and acceleration of each axis), using the robot's own joint angle information, a force sensor (or a contact sensor) at the foot sole and an orientation sensor. The lower limbs form a closed link system along with the tread surface (see FIG. 40).

All of the joint actuators of the left leg, as the leg in the stance state, are maintained in the stiff actuator characteristics in which the gain is high for the entire frequency range and the quantity of phase lead is small in the high frequency range, as shown in FIG. 12, and in which the viscosity of the motor is set to the maximum value of the motor characteristics shown in FIG. 18A. As a result, emphasis is placed not on the compliance but on the positioning accuracy, thus achieving robustness against disturbances, such as oscillations.

For the thigh roll axis and the thigh pitch axis of the right leg, as the leg in flight, stiff actuator characteristics are set in order to enable the floor touchdown movement of the leg in flight to be executed.

The joint actuators for the knee pitch, ankle roll and the ankle pitch of the right leg, as the leg in the flight state, are also set to soft actuator characteristics. That is, the servo characteristics of the actuator motors are set so that the gain is low for the low frequency range, the quantity of phase lead is large in the high frequency range, as shown in FIG. 13, and in which the viscosity of the motor is set to one-third the maximum value of the motor characteristics shown in FIG. 18B, in order to impart compliance and in order for the robot to ready itself to the impact at the time of touchdown.

The other joint sites are set to stiff joint characteristics to place more emphasis on positioning accuracy than on compliance to render the robot body more robust against disturbances, such as oscillations.

(F) Time Period When Both Legs are in the Stance State

When the leg in flight has touched the floor, reversion is made to the time period when the two legs are in the stance state. However, at this time, the left and right legs are interchanged. In this state, the lower limbs and the floor surface form a closed link system (see FIG. 41). This state of both legs being in the stance state can be confirmed, from the robot's own orientation, touchdown state and the state of the movement (velocity and acceleration of each axis), using the robot's own joint angle information, foot sensor (or a contact sensor) at the foot sole, and an orientation sensor.

At this time, the actuators of the totality of the joint sites of the left and right legs are set to the aforementioned intermediate joint characteristics, that is, to such characteristics in which the gain is low for the low frequency range and the quantity of phase lead is large in the high frequency range, as shown in FIG. 13, and in which the viscosity of the motor is set to the maximum value of the motor characteristics shown in FIG. 18A. As a result, the left and right legs in the stance state are capable of high speed response, and compliance may be realized, while the motor viscosity is increased.

The other joint sites are set to stiff joint characteristics, that is to such characteristics in which the gain is high for the entire frequency range and the quantity of phase lead is small in the high frequency range, as shown in FIG. 12, and in which the viscosity of the motor is set to the maximum value of the motor characteristics shown in FIG. 18A. As a result, emphasis is placed not on the compliance but on the positioning accuracy, thus achieving robustness against disturbances, such as oscillations.

If the movement of going down the stairs is to be continued, the orientations of (A) to (F) are repeatedly carried out.

Figure 42:
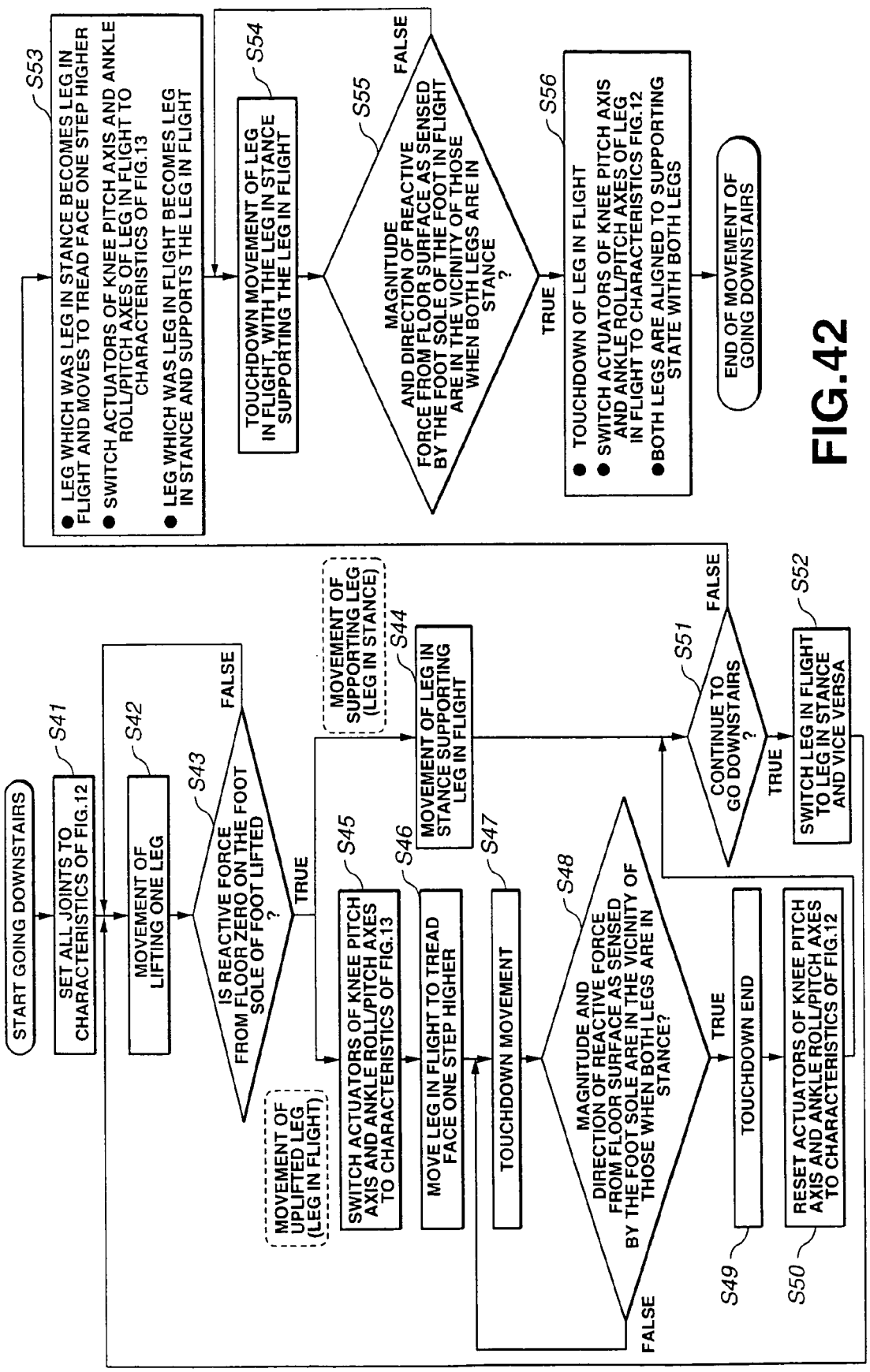
FIG. 42 depicts a flowchart showing the sequence of processing operations for switching the actuator characteristics of the actuators of the respective joint sites of the robot going down the stairs.

FIG. 42 shows, in the form of a flowchart, the sequence of processing operations for switching the actuator characteristics of respective joint sites of the robot going up the stairs.

First, the actuators of all of the joint sites making up the robot body are set for increasing the low range gain and decreasing the quantity of phase lead for the high frequency range, as shown in FIG. 12, and for increasing the viscous resistance of the joints, as shown in FIG. 18A (step S41).

The movement of uplifting one of the legs is then carried out (step S42).

When the reactive force from the floor, received by the foot sole of the leg, being uplifted, has become zero (step S43), the leg in the stance state supports the leg in flight state (step S44).

As for the leg in the flight state, the actuators of the knee joint pitch axis, ankle roll axis and the ankle pitch axis are set such as to decrease the low range gain and to increase the quantity of phase lead, as shown in FIG. 13, as well as to decrease the viscous resistance of the joint, as shown in FIG. 18B (step S45).

The movement for moving the leg in flight to a tread face one step lower (step S46) and the movement for touchdown are then carried out (step S47).

When the magnitude and the direction of the reactive force from the floor, as detected by the foot sole, are proximate to those for the time period when the two legs are in the stance state (step S48), the touchdown movement of the leg in the flight state comes to a close (step S49). The respective actuators of the knee joint pitch axis and the ankle roll and pitch axes of the leg in flight are set such as to increase the low range gain as well as to decrease the phase lead in the high frequency range, as shown in FIG. 12, and to increase the viscous resistance of the joint, as shown in FIG. 18A (step S50).

When the movement of going down the stairs is to be continued (step S51), the leg in flight is switched to the leg in the stance and vice versa (step S52). Then, processing reverts to the step S42 to repeat the processing similar to that described above.

In case the movement of going down the stairs is to come to a close (step S51), the leg which was the leg in the stance position becomes a leg in flight and moves to a tread one step higher (step S53). At this time, the actuators of the ankle roll/pitch axes of the leg in flight are set such as to increase the low range gain as well as to decrease the quantity of phase lead in the high frequency range, as shown in FIG. 12, and to increase the viscous resistance of the joint, as shown in FIG. 18A. The leg which was a leg in flight now becomes a leg in the stance position to support the leg in flight.

The touchdown movement for the leg in flight is then carried out (step S54). At this time, the leg in the stance position operates to command the leg in flight.

When the magnitude and the direction of the reactive force from the floor, as detected by the foot sole of the leg in flight, are then in the vicinity of those during the time when both legs are in the stance position (step S55), the touchdown movement of the leg in flight comes to a close (step S56). At this time, the actuators of the knee joint pitch axis and the ankle roll/pitch axes are set such as to increase the low range gain and to decrease the quantity of phase lead in the high frequency range, as shown in FIG. 12, as well as to increase the viscous resistance of the joint, as shown in FIG. 18A. As a consequence, both legs are in the stance state in alignment with each other, to complete the movement of going up the stairs.

G. Example of Allocation of Actuator Characteristics of Respective Joint Sites of the Robot During Turning In this item, the method for controlling the actuator characteristics of the respective joint sites of the robot during turning of the robot body is explained.

The robot body of the legged mobile robot is formed by a multi-link structure comprised of plural joint axes, having substantially parallel degrees of freedom of the joints, and which are interconnected in the lengthwise direction. During the movement of going up and down the stairs, the link state which the touchdown site of the multi-link structure forms with the floor surface is switched between the open link state and the closed link state.

In the present embodiment, the characteristics of the actuators for driving the respective joints are changed over between stiff, soft and intermediate joint characteristics, in each stage of the turning movement, responsive to the switching between the link states, thereby realizing adaptive falldown movements.

Figure 43:
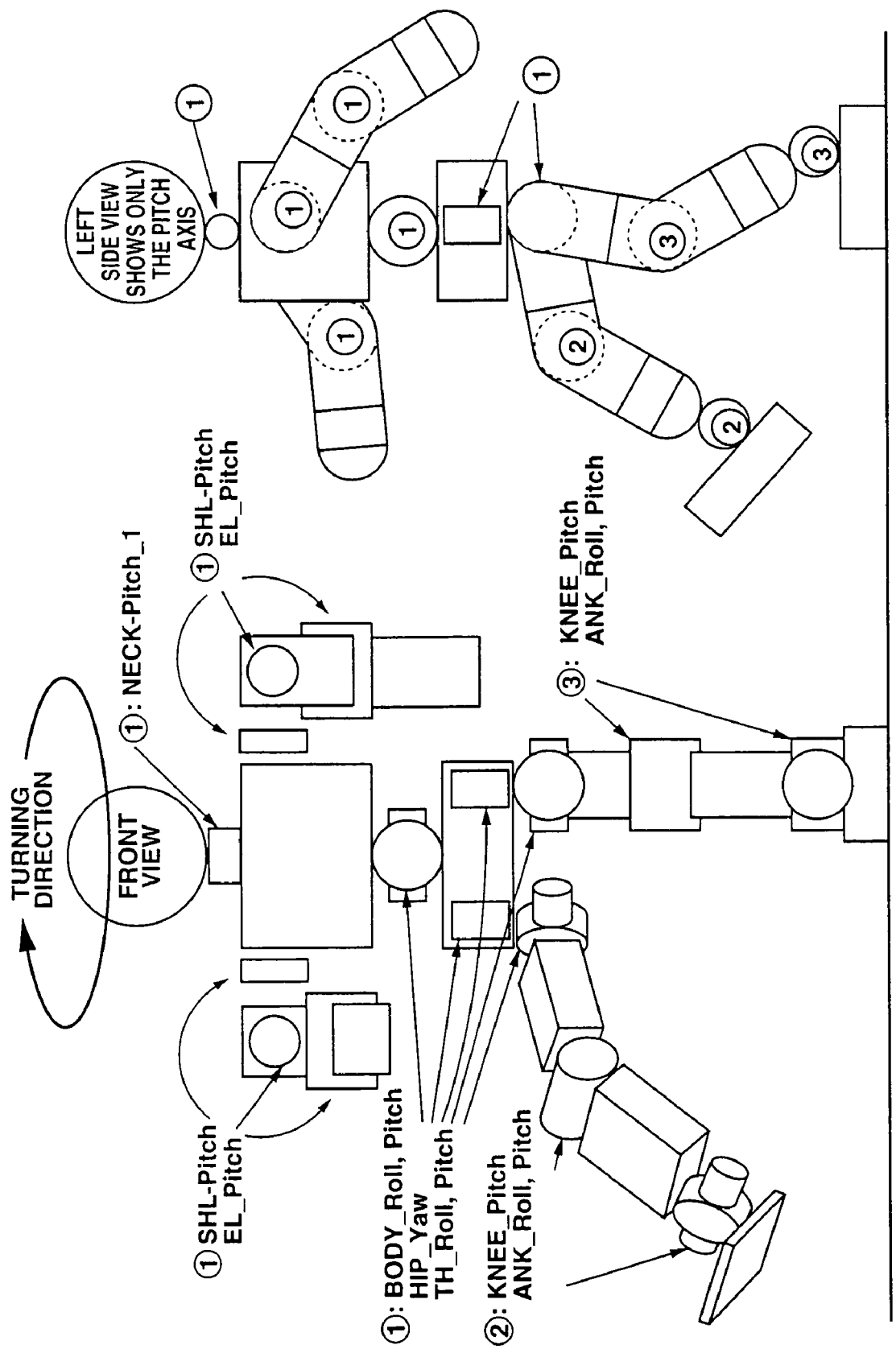
FIG. 43 illustrates the allocation of characteristics of the controllers of the actuators and the actuators themselves in the respective joint sites of the robot when the robot body performs a turning movement.

Referring to FIG. 43, the allocation of characteristics of the controllers of the actuators, and the actuators themselves, in the respective joint sites of the robot, when the robot body performs a turning movement, is explained by referring to FIG. 43.

During the turning movement of the robot body, a high positioning accuracy is required of respective joint sites of the neck pitch axis, shoulder pitch axis, elbow pitch axis, body trunk roll axis, body trunk pitch axis, body trunk yaw axis and the hip joint roll and pitch axes, as well as respective joint sites of the knee pitch axis, ankle roll axis and the ankle pitch axis of the leg in the stance state.

Thus, in the actuators of these joint sites, the proportional gain of the servo controller is set to a larger value to increase the gain of the overall system to permit the gain to be taken up to the low frequency range. The frequency response is selected so that the quantity of phase lead is smaller in a high frequency range, such that contribution to the high speed response characteristics is not marked but stability is assured, as shown in FIG. 12. Additionally, the viscous coefficient of the motor is to be increased to achieve robustness against disturbances, such as oscillations, as shown in FIG. 18A.

On the other hand, fast response characteristics and compliance are crucial in the respective joint sites of the knee pitch axis and the ankle roll and pitch axes of the leg in flight.

Thus, in the actuators of these joint sites, the proportional gain is decreased to decrease the gain of the entire system to decrease the gain for the low frequency range such as to enable the mechanical passiveness (compliance) to be obtained readily. The frequency response (phase compensation characteristics) are set so that the quantity of phase lead is larger in the mid to high frequency range, as shown in FIG. 13, in order to produce fast response characteristics. Moreover, the viscous resistance of the motor is decreased, as shown in FIG. 18B, such as to enable the mechanical passiveness (compliance) to be obtained readily.

The mechanical passiveness (compliance) may be obtained for the arms or legs by applying the characteristics owned by the actuator controllers and the controllers themselves, shown in FIG. 13, to the leg in the flight state. In this manner, the potential energy, generated when the leg has been swung up during the turning movement, may readily be used as the energy assisting in the next following movement of swinging down the leg. This diminishes the energy consumption and the consumption of the battery as a power supply for driving the robot body.

The allocation of the characteristics owned by the actuator controllers and the controllers themselves in the respective joint sites when the robot performs a turning movement is now explained by referring to FIGS. 44 to 51. In the embodiment, shown in these figures, the operating states can be comprehended in eight stages of from A to H.

(A) Time Period When Both Legs are in the Stance State

When both legs are in the stance state, the lower limbs and the floor surface form a closed link system (see FIG. 44). This state of both legs being in the stance state can be confirmed, from the robot's own orientation, touchdown state and the state of the movement (velocity and acceleration of each axis), using the robot's own joint angle information, foot sensor (or a contact sensor) at the foot sole, and an orientation sensor.

At this time, the actuators of all of the joint sites of the left and right legs are set to the aforementioned intermediate joint characteristics, that is, to such characteristics in which the gain is low for the low frequency range and the quantity of phase lead is large in the high frequency range, as shown in FIG. 13, and in which the viscosity of the motor is set to the maximum value of the motor characteristics shown in FIG. 18A. As a result, the left and right legs in the stance state are capable of high speed response, and compliance may be realized, while the motor viscosity is increased.

The other joint sites are set to stiff joint characteristics, that is to such characteristics in which the gain is high for the entire frequency range and the quantity of phase lead is small in the high frequency range, as shown in FIG. 12, and in which the viscosity of the motor is set to the maximum value of the motor characteristics shown in FIG. 18A. As a result, emphasis is placed not on the compliance but on the positioning accuracy, thus achieving robustness against disturbances, such as oscillations.

(B) Time When One of the Legs is in the Stance State (Uplifting)

The movement corresponding to the former half of the time period when one of the legs is in the stance state, that is the movement of uplifting the right leg, is then carried out. The state of transition to the state in which one of the legs is in the stance position can be confirmed from the robot's own orientation, touchdown state and the kinematic state (velocity and acceleration of each axis), using the robot's own joint angle information, a foot sensor (or a contact sensor) at the foot sole and the orientation sensor. In this state, the open link system is made up by the robot body (legs, body trunk and arms) and the floor surface (see FIG. 45).

The joint actuators of the left leg, as a leg in the stance state, are set to stiff actuator characteristics, that is to such characteristics in which the gain is high for the entire frequency range and the quantity of phase lead is small in the high frequency range, as shown in FIG. 12, and in which the viscosity of the motor is set to the maximum value of the motor characteristics shown in FIG. 18A. The result is that, as for the left leg, as the leg in the stance state, emphasis is placed on the positioning accuracy, so that the left leg is robust against disturbances, such as oscillations, and is able to operate as a rotary axis during turning to support the robot body.

The joint actuators for the thigh yaw axis, thigh roll axis and thigh pitch axis of the right leg, as a leg in the flight state, are also set to stiff actuator characteristics, in order to enable the movement of uplifting the leg in flight.

Moreover, the actuators for the knee pitch, ankle roll and the ankle pitch of the right leg, as the leg in the flight position, are set to soft actuator characteristics, that is, the servo characteristics of the actuator motor are set so that the gain for the low frequency range is low and the quantity of phase lead in the high frequency range is increased for the high range, as shown in FIG. 13, and so that the motor viscosity is set to one-third of the maximum value of the motor characteristics shown in FIG. 18B, such as to impart compliance and to increase fast response characteristics for adaptation to the turning movement about the left leg.

The other joint sites are set to stiff joint characteristics so that more emphasis is placed on positioning accuracy than on compliance to render the robot more robust against disturbances, such as oscillations.

(C) Time Period When a Sole Leg is in the Stance Position

Next to the period of uplifting the right leg, as the former half of the time period when one of the legs is in the stance state, the movement corresponding to the latter half of the time when one of the legs is in the stance state, that is the movement of turning the uplifted right leg, is turned. The state of transition to the latter half of the state in which one of the legs is in the stance position can be confirmed from the robot's own orientation, touchdown state and the kinematic state (velocity and acceleration of each axis), using the robot's own joint angle information, foot sensor (or a contact sensor) at the foot sole and the orientation sensor. In this state, the open link system is made up by the robot body (legs, body trunk and arms) and the floor surface (see FIG. 46).

The joint actuators of the left leg, as a leg in the stance state, are set to stiff actuator characteristics, that is to such characteristics in which the gain is high for the entire frequency range and the quantity of phase lead is small in the high frequency range, as shown in FIG. 12, and in which the viscosity of the motor is set to the maximum value of the motor characteristics shown in FIG. 18A. Thus, more emphasis may be placed on the positioning accuracy of the left leg, as the axis of rotation of the turning movement, to render the robot more robust against disturbances, such as oscillations, such as to support the robot body.

The thigh yaw, thigh roll and thigh pitch of the right leg, as the leg in the flight position, are set to stiff actuator characteristics to enable the turning movement of the leg in the flight position about the left leg as the axis of rotation.

Moreover, the actuators for the knee pitch, ankle roll and the ankle pitch of the right leg, as the leg in the flight position, are set to soft actuator characteristics, that is, the servo characteristics of the actuator motor are set so that the gain for the low frequency range is low and the quantity of phase lead in the high frequency range is increased for the high range, as shown in FIG. 13, and so that the motor viscosity is set to one-third of the maximum value of the motor characteristics shown in FIG. 18B, such as to impart compliance and to increase fast response characteristics for adaptation to the turning movement about the left leg.

The other joint sites are set to stiff joint characteristics so that more emphasis is placed on positioning accuracy than on compliance to render the robot more robust against disturbances, such as oscillations.

(D) Time Period When Both Legs are in the Stance State

When the turning movement has come to a close, and the right leg, as the leg in the flight state, has touched the floor, reversion is made to the time period when the two legs are in the stance state. However, at this time, the left and right legs are interchanged. In this state, the lower limbs and the floor surface form a closed link system (see FIG. 47). This state of both legs being in the stance state can be confirmed, from the robot's own orientation, touchdown state and the state of the movement (velocity and acceleration of each axis), using the robot's own joint angle information, foot sensor (or a contact sensor) at the foot sole, and an orientation sensor.

At this time, the actuators of the totality of the joint sites of the left and right legs are set to the aforementioned intermediate joint characteristics, that is, to such characteristics in which the gain is low for the low frequency range and the quantity of phase lead is large in the high frequency range, as shown in FIG. 13, and in which the viscosity of the motor is set to the maximum value of the motor characteristics shown in FIG. 18A. As a result, the left and right legs in the stance state are capable of high speed response, and compliance may be realized, while the motor viscosity is increased.

The other joint sites are set to stiff joint characteristics, that is to such characteristics in which the gain is high for the entire frequency range and the quantity of phase lead is small in the high frequency range, as shown in FIG. 12, and in which the viscosity of the motor is set to the maximum value of the motor characteristics shown in FIG. 18A. As a result, emphasis is placed not on the compliance but on the positioning accuracy, thus achieving robustness against disturbances, such as oscillations.

(E) Time Period When a Sole Leg is in the Stance Position

The movement for the former half of the time period when one of the legs is in the stance state, that is the movement of uplifting the left leg, is carried out. The state of transition to the latter half of the state in which one of the legs is in the stance position can be confirmed from the robot's own orientation, touchdown state and the kinematic state (velocity and acceleration of each axis), using the robot's own joint angle information, foot sensor (or a contact sensor) at the foot sole and the orientation sensor. In this state, the open link system is made up by the robot body (legs, body trunk and arms) and the floor surface (see FIG. 48).

The joint actuators of the right leg, as a leg in the stance state, are set to stiff actuator characteristics, that is to such characteristics in which the gain is high for the entire frequency range and the quantity of phase lead is small in the high frequency range, as shown in FIG. 12, and in which the viscosity of the motor is set to the maximum value of the motor characteristics shown in FIG. 18A. Thus, more emphasis may be placed on the positioning accuracy of the left leg, as the axis of rotation of the turning movement, to render the robot more robust against disturbances, e.g. oscillations, such as to support the robot body.

The thigh yaw, thigh roll and thigh pitch of the left leg, as the leg in the flight position, are set to stiff actuator characteristics to enable the lifting movement of the leg in the flight position, thereby enabling the lifting movement of the leg in the flight position.

Moreover, the actuators for the knee pitch, ankle roll and the ankle pitch of the left leg, as the leg in the flight position, are set to soft actuator characteristics, that is, the servo characteristics of the actuator motor are set so that the gain for the low frequency range is low and the quantity of phase lead in the high frequency range is increased for the high range, as shown in FIG. 13, and so that the motor viscosity is set to one-third of the maximum value of the motor characteristics shown in FIG. 18B, such as to impart compliance and to increase fast response characteristics for adaptation to the turning movement about the right leg.

The other joint sites are set to stiff joint characteristics so that more emphasis is placed on positioning accuracy than on compliance to render the robot more robust against disturbances, such as oscillations.

(F) Time Period When One of the Legs is in the Stance State

Next to the movement of uplifting the left leg, corresponding to the movement for the former half of the time period when one of the legs is in the stance state, the uplifted left leg is turned about the right leg as the leg in the stance position. The state of transition to the latter half of the state in which one of the legs is in the stance position can be confirmed from the robot's own orientation, touchdown state and the kinematic state (velocity and acceleration of each axis), using the robot's own joint angle information, foot sensor (or a contact sensor) at the foot sole and the orientation sensor. In this state, the open link system is made up by the robot body (legs, body trunk and arms) and the floor surface (see FIG. 49).

The joint actuators of the right leg, as a leg in the stance state, are set to stiff actuator characteristics, that is to such characteristics in which the gain is high for the entire frequency range and the quantity of phase lead is small in the high frequency range, as shown in FIG. 12, and in which the viscosity of the motor is set to the maximum value of the motor characteristics shown in FIG. 18A. Thus, more emphasis may be placed on the positioning accuracy of the left leg, as the axis of rotation of the turning movement, to render the robot more robust against disturbances, such as oscillations, such as to support the robot body.

The thigh yaw, thigh roll and thigh pitch of the right leg, as the leg in the flight position, are set to stiff actuator characteristics to enable the turning movement of the leg in the flight position about the left leg as the axis of rotation.

Moreover, the actuators for the knee pitch, ankle roll and the ankle pitch of the left leg, as the leg in the flight position, are set to soft actuator characteristics, that is, the servo characteristics of the actuator motor are set so that the gain for the low frequency range is low and the quantity of phase lead is increased for the high frequency range, as shown in FIG. 13, and so that the motor viscosity is set to one-third of the maximum value of the motor characteristics shown in FIG. 18B, such as to impart compliance and to increase fast response characteristics for adaptation to the turning movement about the right leg.

The other joint sites are set to stiff joint characteristics so that more emphasis is placed on positioning accuracy than on compliance to render the robot more robust against disturbances, such as oscillations.

(G) Time Period When One of the Legs is in the Stance Position

The movement of turning the uplifted left leg, about the right leg, as the supporting leg, as center, is continued by way of performing the movement of the latter half of the time period when one of the legs is in the stance position. The state of transition to the latter half of the state in which one of the legs is in the stance position can be confirmed from the robot's own orientation, touchdown state and the kinematic state (velocity and acceleration of each axis), using the robot's own joint angle information, foot sensor (or a contact sensor) at the foot sole and the orientation sensor. In this state, the open link system is made up by the robot body (legs, body trunk and arms) and the floor surface (see FIG. 50).

The joint actuators of the right leg, as a leg in the stance state, are all set to stiff actuator characteristics, that is to such characteristics in which the gain is high for the entire frequency range and the quantity of phase lead is small in the high frequency range, as shown in FIG. 12, and in which the viscosity of the motor is set to the maximum value of the motor characteristics shown in FIG. 18A. Thus, more emphasis may be placed on the positioning accuracy of the right leg, as the axis of rotation of the turning movement, to render the robot more robust against disturbances, e.g. oscillations, such as to support the robot body.

The thigh yaw, thigh roll and thigh pitch of the left leg, as the leg in the flight position, are set to stiff actuator characteristics to allow continuation of the turning movement of the leg in the flight position about the right leg.

Moreover, the actuators for the knee pitch, ankle roll and the ankle pitch of the left leg, as the leg in the flight position, are set to soft actuator characteristics, that is, the servo characteristics of the actuator motor are set so that the gain for the low frequency range is low and the quantity of phase lead in the high frequency range is increased for the high range, as shown in FIG. 13, and so that the motor viscosity is set to one-third of the maximum value of the motor characteristics shown in FIG. 18B, such as to impart compliance and to increase fast response characteristics for adaptation to the turning movement about the right leg.

The other joint sites are set to stiff joint characteristics so that more emphasis is placed on positioning accuracy than on compliance to render the robot more robust against disturbances, such as oscillations.

(H) Time Period When Both Legs are in the Stance State

When the turning movement has come to a close, and the right leg, as the leg in the flight state, has touched the floor, reversion is made to the time period when the two legs are in the stance state. In this state, the lower limbs and the floor surface form a closed link system (see FIG. 51). This state of both legs being in the stance state can be confirmed, from the robot's own orientation, touchdown state and the state of the movement (velocity and acceleration of each axis), using the robot's own joint angle information, foot sensor (or a contact sensor) at the foot sole, and an orientation sensor.

At this time, the actuators of the totality of the joint sites of the left and right legs are set to the aforementioned intermediate joint characteristics, that is, to such characteristics in which the gain is low for the low frequency range and the quantity of phase lead is large in the high frequency range, as shown in FIG. 13, and in which the viscosity of the motor is set to the maximum value of the motor characteristics shown in FIG. 18A. As a result, the left and right legs in the stance state are capable of high speed response, and compliance may be realized, while the motor viscosity is increased.

The other joint sites are set to stiff characteristics, that is to such characteristics in which the gain is high for the entire frequency range and the quantity of phase lead is small in the high frequency range, as shown in FIG. 12, and in which the viscosity of the motor is set to the maximum value of the motor characteristics shown in FIG. 18A. As a result, emphasis is placed not on the compliance but on the positioning accuracy, thus achieving robustness against disturbances, such as oscillations.

Figure 52:
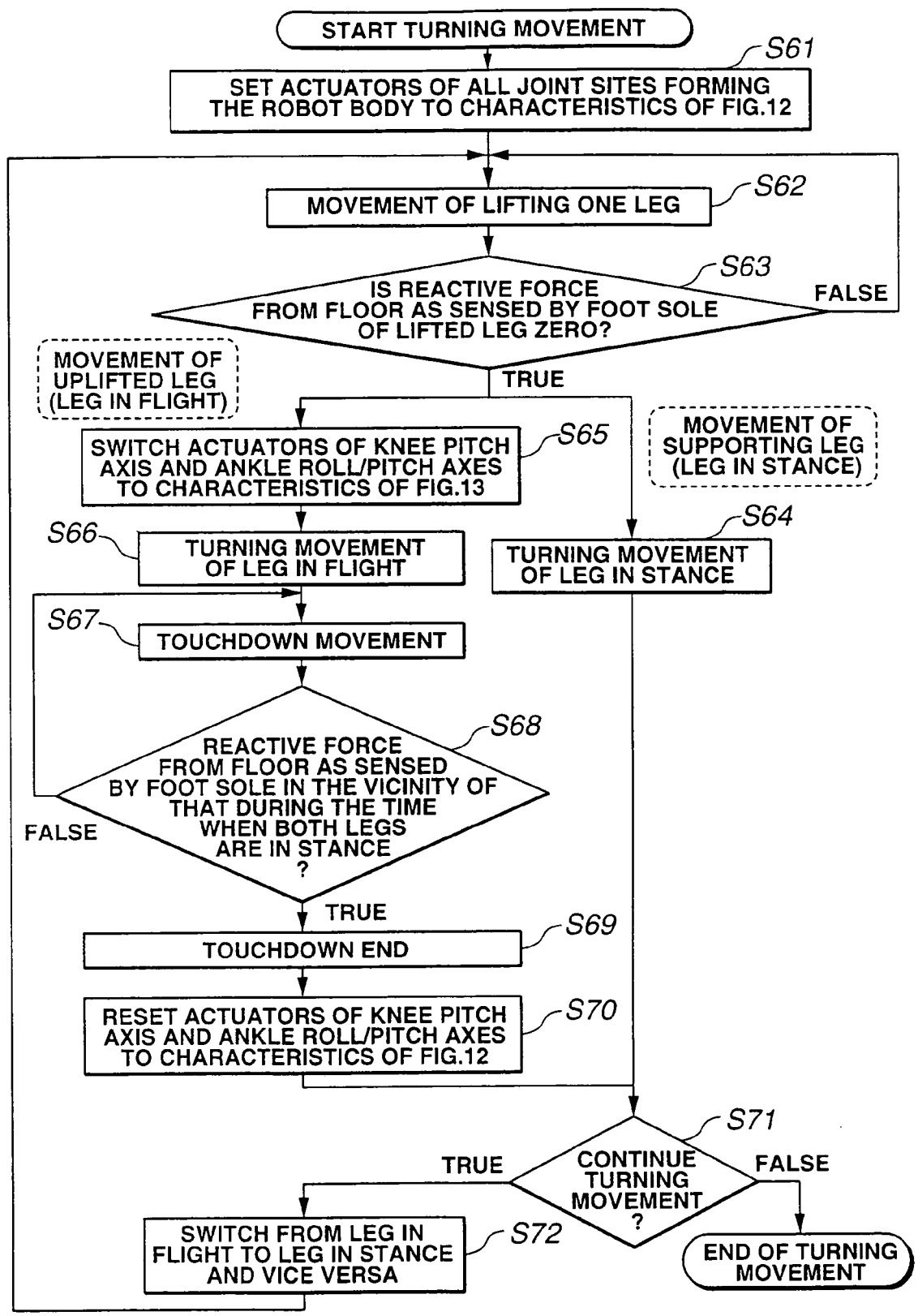
FIG. 52 depicts a flowchart for illustrating the sequence of the processing operations for switching actuator characteristics in the respective joint sites of the robot when the robot body performs the turning movement.

FIG. 52 shows, in the form of a flowchart, the sequence of operations for switching actuator characteristics of respective joint sites of the robot when the robot body performs the turning movement.

First, the actuators of all of the joint sites forming the robot body are set such as to increase the low range gain and to decrease the quantity of phase lead in the high frequency range, as shown in FIG. 12, as well as to increase the viscous resistance of the joints, as shown in FIG. 18A (step S61).

The movement of uplifting one of the legs is then executed (step S62).

When the reactive force from the floor, received by the foot sole of the leg, being uplifted, has become zero (step S63), the leg in the stance state carries the leg in flight state to perform turning movements (step S64).

As for the leg in the flight state, the actuators of the knee joint pitch axis, ankle roll axis and the ankle pitch axis are set such as to decrease the low range gain and to increase the quantity of phase lead, as shown in FIG. 13, as well as to decrease the viscous resistance of the joint, as shown in FIG. 18B (step S65).

The turning movement as the leg in flight state is then carried out (step S66) and further the touchdown movement is carried out (step S67).

When the magnitude of the reactive force from the floor, as detected by the foot sole, is in the vicinity of that at the time when both legs are in the stance positions (step S68), the floor touchdown movement of the leg in the stance state comes to a close (step S69).

The actuators of the knee joint pitch axis, ankle roll axis and the ankle pitch axis of the leg in the flight state are then set such as to increase the low range gain and to decrease the quantity of the phase lead in the high frequency range, as shown in FIG. 12, and also such as to increase the viscous resistance of the joints, as shown in FIG. 18A (step S70).

If the walking movement is to be continued further (step S71), the leg in flight state is changed over to the leg in the stance state and vice versa (step S72). Then, processing transfers to the step S62 to repeat the processing in the manner described above.

If conversely the walking movement is to be terminated (step S71), the present processing routine in its entirety is completed.

The present invention has so far been explained by referring to specified embodiments. However, the present invention is not limited to the specified embodiments, which may be modified or subjected to substitution by those skilled in the art without departing from the purport of the invention.

The purport of the present invention is not limited to a product termed a "robot". That is, the present invention may similarly be applied to products belonging to the other industrial fields, such as toys, provided that such product is a mechanical device performing movements simulating the movements of the human being using electrical or magnetic operations.

The description of the present specification has been centered about a motor actuator as an actuator for driving the joints of a robot. The purport of the present invention is, however, not limited thereto. The effect of the invention may be realized in similar manner for an actuator other than a motor actuator having a rotary shaft directly actuating the angle of the joint, e.g. for an actuator of the type driving the joint by expansion and contraction of the distance between the links interconnecting the joints, such as muscle, by controlling the servo gain and the viscosity. The latter joint-driving actuator may be enumerated by e.g. a shape memory alloy actuator, a fluid actuator or a high molecular actuator.

In the present specification, description has been made of a circuit, composed of a switching device, comprised of a bipolar transistor, for switching control of the coil current to a coil of the motor actuator. It is however obvious to those skilled in the art that this sort of the control circuit can be implemented using a MOS-FET or similar semiconductor devices.

In sum, the present invention has been elucidated by way of illustration such that the contents of description of the present specification should not be construed in a limiting fashion. For judging the purport of the invention, reference should be made to the appended claims.

What is claimed is:

1. A legged mobile robot including a plurality of joint sites and a plurality of mobile legs, comprising:
   a controlling unit configured to control characteristics of an actuator at one of said plurality of joint sites for controlling, in combination, of a gain and a phase compensation of a servo controller belonging to said actuator and for controlling a viscous resistance of an actuator motor.

2. The legged mobile robot according to claim 1, wherein said controlling unit sets, when the actuator is in need of high precision positioning control and/or orientation stability, a low range gain to a large value, a quantity of phase lead in the high frequency range to a small value, and the viscous resistance of the actuator motor to a large value.

3. The legged mobile robot according to claim 1, wherein said controlling unit sets, when the actuator is in need of mechanical passiveness and fast response characteristics, a low range gain to a small value, a quantity of phase lead to a large value, and the viscous resistance of the actuator motor to a small value.

4. The legged mobile robot according to claim 1, wherein said controlling unit sets, when the actuator is in need of buffering a force of impact and performing followup control of a high frequency range, a low range gain to a small value, a quantity of phase lead to a large value, and the viscous resistance of the actuator motor to a small value.

5. The legged mobile robot according to claim 1, wherein said controlling unit switches between first actuator characteristics of setting the actuator to a large value of a low range gain, a small quantity of a phase lead, and a large value of the viscous resistance of the actuator motor and second actuator characteristics of setting the actuator to a small value of the low range gain, a large quantity of the phase lead, and a small value of the viscous resistance of the actuator motor, at each step of a shifting operation on legs.

6. The legged mobile robot according to claim 5, wherein said controlling unit switches between first actuator characteristics of setting the actuator to a large value of the low range gain, a small quantity of the phase lead, and a large value of the viscous resistance of the actuator motor and second actuator characteristics of setting the actuator to a small value of the low range gain, a large quantity of the phase lead, and a small value of the viscous resistance of the actuator motor, at each step of a walking movement on legs.

7. The legged mobile robot according to claim 6, wherein said controlling unit sets, at a stage of commencing the walking movement, characteristics of actuators for joint sites of a knee joint pitch axis, ankle roll and pitch axes, body trunk roll, pitch, and yaw axes, hip joint roll and pitch axes, and a neck pitch axis to a large value of the low range gain, a small quantity of phase lead in a high frequency range, and a large value of the viscous resistance of the actuator motor, and said controlling unit sets the characteristics of actuators for joints of a shoulder pitch axis and an elbow pitch axis to a small value of the low range gain, a large quantity of the phase lead, and a small value of the viscous resistance of the actuator motor.

8. The legged mobile robot according to claim 6, wherein said controlling unit sets, at a stage when a leg in a flight state is uplifted and a reactive force from a floor received by a foot sole is equal to zero, for characteristics of actuators for a knee joint pitch axis, ankle roll axis and an ankle pitch axis of the leg in the flight state, a small value of the low range gain, a large quantity of the phase lead, and a small value of the viscous resistance of the actuator motor.

9. The legged mobile robot according to claim 6, wherein said controlling unit sets, at a stage when the walking movement of a leg in a flight state proceeds and the leg touches a floor, with a reactive force from the floor received by a foot sole approximately equal to that when both legs are in a stance position, characteristics of actuators for a knee joint pitch axis, ankle roll axis, and an ankle pitch axis of the leg previously in the flight state to a large value of the low range gain, a small quantity of the phase lead in a high frequency range, and a large value of the viscous resistance of the actuator motor.

10. The legged mobile robot according to claim 6, wherein, in each stage of the walking movement, said controlling unit sets, for characteristics of actuators for driving joints in which emphasis is placed on a positioning accuracy, first characteristics in which the low range gain is of a large value, the quantity of phase lead is of a small value, and the viscous resistance of the actuator motor is of a large value.

11. The legged mobile robot according to claim 6, wherein, in each stage of the walking movement, said controlling unit sets, for characteristics of actuators for driving joints in which emphasis is placed on a mechanical passiveness or on fast response characteristics, second actuator characteristics in which the low range gain is of a small value, the quantity of phase lead is of a large value, and the viscous resistance of the actuator motor is of a small value.

12. The legged mobile robot according to claim 6, wherein, in each stage when a link state formed by a floor touchdown site of the body of the legged mobile robot and a floor surface is changed between an open link state and a closed link state, said controlling unit switches, during the walking movement, the characteristics of the actuators driving respective joints between first actuator characteristics and second actuator characteristics.

13. The legged mobile robot according to claim 5, wherein, in each stage of the legged mobile robot going up or down stairs, said controlling unit switches characteristics of actuators of respective joint sites between first actuator characteristics in which the low range gain is of a large value, the quantity of the phase lead is of a small value, and the viscous resistance of the actuator motor is of a large value and second actuator characteristics in which the low range gain is of a small value, the quantity of the phase lead is of a large value, and the viscous resistance of the actuator motor is of a small value.

14. The legged mobile robot according to claim 13, wherein, in a stage when both legs are in a stance position prior to going up or down the stairs, in an operation of going up or down the stairs, said controlling unit sets characteristics of the actuator at each joint site to the first actuator characteristics in which the low range gain is of a large value, the quantity of the phase lead in a high frequency range is of a small value, and the viscous resistance of the actuator motor is of a large value.

15. The legged mobile robot according to claim 13, wherein, in a stage when a first step is made for going up or down the stairs, in an operation of going up or down the stairs, said controlling unit sets the characteristics of the actuators of a knee joint pitch axis and an ankle roll and pitch axes of a leg in a flight condition to second actuator characteristics in which the low range gain is of a small value, the quantity of the phase lead is of a large value, and the viscous resistance of the actuator motor is of a small value.

16. The legged mobile robot according to claim 13, wherein, in a stage when a leg of a first step has touched a tread face one step higher or lower, in going up or down the stairs, said controlling unit sets the characteristics of the actuator at each joint site to first actuator characteristics in which the low range gain is of a large value, the quantity of the phase lead in a high frequency range is of a small value, and the viscous resistance of the actuator motor is of a large value.

17. The legged mobile robot according to claim 13, wherein, in a stage when a leg which touches a tread one step higher or lower reaches a stance state, and another leg in a stance position is uplifted, in going up or down stairs, said controlling unit sets the characteristics of the actuators of an ankle roll axis and an ankle pitch axis of the uplifted leg to second actuator characteristics in which the low frequency range gain is of a small value, the quantity of the phase lead is of a large value, and the viscous resistance of the actuator motor is of a small value.

18. The legged mobile robot according to claim 13, wherein, in a stage when a second step has touched a tread two steps higher in going up or down stairs, said controlling unit sets characteristics of the actuator at each joint site to first actuator characteristics in which the low range gain is of a large value, the quantity of the phase lead in a high frequency range is of a small value, and the viscous resistance of the actuator motor is of a large value.

19. The legged mobile robot according to claim 13, wherein, in each stage of going up or down the stairs, said controlling unit sets the characteristics of the actuators for driving respective joints for which emphasis is placed on positioning accuracy, to first actuator characteristics in which the low range gain is of a large value the quantity of the phase lead is of a small value, and the viscous resistance of the actuator motor is of a large value.

20. The legged mobile robot according to claim 13, wherein, in each stage of going up or down stairs, said controlling unit sets the characteristics of the actuators for driving respective joints for which emphasis is placed on mechanical passiveness or fast response characteristics to second actuator characteristics in which the low range gain is of a small value, the quantity of the phase lead is of a large value, and the viscous resistance of the actuator motor is of a small value.

21. The legged mobile robot according to claim 13, wherein, in each stage of switching a link state defined by a floor touching site of the body of the legged mobile robot and a floor surface, in going up or down the stairs, between an open link state and a closed link state, said controlling unit switches the characteristics of the actuators driving respective joints between the first actuator characteristics and the second actuator characteristics.

22. The legged mobile robot according to claim 5, wherein, in each stage of a turning movement of the body of the legged mobile robot, said controlling unit switches actuators of the respective joint sites between first actuator characteristics in which the low range gain is of a large value, the quantity of the phase lead is of a small value, and the viscous resistance of the actuator motor is of a large value and second actuator characteristics in which the low range gain is of a small value, the quantity of the phase lead is of a large value, and the viscous resistance of the actuator motor is of a small value.

23. The legged mobile robot according to claim 22, wherein, in a stage of commencing a turning movement of the body of the legged mobile robot, said controlling unit sets characteristics of the actuator at each joint site forming the body of the legged mobile robot to a large value of low range gain, a small quantity of phase lead in a high frequency range, and a large value of viscous resistance of the actuator motor.

24. The legged mobile robot according to claim 22, wherein, in a stage when a leg in a flight state is uplifted and a reactive force from a floor received by a foot sole is zero, said controlling unit sets characteristics of the actuators of a, knee joint pitch axis and ankle roll and pitch axes of the leg in the flight state to a small value of low range gain, a large quantity of phase lead, and a small value of viscous resistance of the actuator motor.

25. The legged mobile robot according to claim 22, wherein, in a stage when the turning movement of the body of the legged mobile robot progresses such that a leg in a flight state touches a floor and a reactive force from the floor received by a foot sole is approximately equal to a reactive force when both legs are in the flight state, said controlling unit sets characteristics of the actuators of a knee joint pitch axis and ankle roll and pitch axes of a leg in a stance state to a large low range gain, a small quantity of phase lead in the high frequency range, and a large viscous resistance of the actuator motor.

26. The legged mobile robot according to claim 22, wherein, in each stage of the turning movement, said controlling unit sets characteristics of the actuators for driving joints for which emphasis is placed on positioning accuracy to first actuator characteristics in which the low range gain is of a large value, the quantity of the phase lead is of a small value, and the viscous resistance of the actuator motor is of a large value.

27. The legged mobile robot according to claim 22, wherein, in each stage of the turning movement, said controlling unit sets characteristics of the actuators for driving joints for which emphasis is placed on mechanical passiveness or fast response characteristics to second actuator characteristics in which the low range gain is of a small value, the quantity of the phase lead is of a large value, and the viscous resistance of the actuator motor is of a small value.

28. The legged mobile robot according to claim 22, wherein, in each stage in which a link state defined by a floor touch site of the body of the legged mobile robot and a floor surface of the turning movement is switched between an open link state and a closed link state, said controlling unit switches characteristics of the actuators for driving respective joints between first actuator characteristics and second actuator characteristics.

* * * * *